(12) United States Patent
Asano et al.

(10) Patent No.: US 7,093,128 B2
(45) Date of Patent: Aug. 15, 2006

(54) INFORMATION RECORDING/REPRODUCING APPARATUS AND METHOD

(75) Inventors: Tomoyuki Asano, Kanagawa (JP); Yoshitomo Osawa, Kanagawa (JP); Ryuji Ishiguro, Tokyo (JP); Atsushi Mitsuzawa, Tokyo (JP); Tateo Oishi, Saitama (JP); Ryuta Taki, Kanagawa (JP)

(73) Assignee: Sony Corporation (JP)

( * ) Notice: Subject to any disclaimer, the term of this patent is extended or adjusted under 35 U.S.C. 154(b) by 812 days.

(21) Appl. No.: 09/980,340

(22) PCT Filed: Apr. 6, 2001

(86) PCT No.: PCT/JP01/03004

§ 371 (c)(1),
(2), (4) Date: Mar. 6, 2002

(87) PCT Pub. No.: WO01/78301

PCT Pub. Date: Oct. 18, 2001

(65) Prior Publication Data

US 2003/0016827 A1    Jan. 23, 2003

(30) Foreign Application Priority Data

| Apr. 6, 2000 | (JP) | ............................. 2000-105328 |
| Apr. 7, 2000 | (JP) | ............................. 2000-106039 |
| Jun. 7, 2000 | (JP) | ............................. 2000-170604 |
| Dec. 25, 2000 | (JP) | ............................. 2000-391976 |

(51) Int. Cl.
*G06F 1/24* (2006.01)

(52) U.S. Cl. ...................... 713/171; 713/189; 713/193; 713/200; 713/201

(58) Field of Classification Search ................ 713/171, 713/189, 193, 200, 201
See application file for complete search history.

(56) References Cited

FOREIGN PATENT DOCUMENTS

JP          10-3256 A       1/1998

(Continued)

OTHER PUBLICATIONS

Waldvogel, M., et al., "The VersaKey Framework: Versatile Group Key Management", IEEE Journal on Selected Areas in Communications, Sep. 1999, vol. 17, No. 9, pp. 1614 to 1631, especially pp. 1616 to 1621.

(Continued)

*Primary Examiner*—Thomas R. Peeso
(74) *Attorney, Agent, or Firm*—Lerner, David, Littenberg, Krumholz & Mentlik, LLP

(57) ABSTRACT

When a player cannot play back data because a master key held by the player has a generation older than the generation of a master key having been used for recording the data, or when a recorder cannot record data because a master key held by the recorder has a generation older than the generation of a master key necessary for recording to a recording medium, the user is prompted to renew the master key for acquisition of the necessary master key, thereby enabling the data playback or data recording. The renewed master key is distributed in such a form that can be processed by a specific device via a transmission medium such as a recording medium, network, IC card, telephone line, for example, via a tree-structured distribution system.

100 Claims, 37 Drawing Sheets

FOREIGN PATENT DOCUMENTS

| | | | |
|---|---|---|---|
| JP | 10-293726 | A | 11/1998 |
| JP | 11-39795 | A | 2/1999 |
| JP | 11-126425 | A | 5/1999 |
| JP | 11-187013 | A | 7/1999 |
| JP | 11-250570 | A | 9/1999 |
| JP | 11-250571 | A | 9/1999 |

OTHER PUBLICATIONS

Wong, C. K. et al., Secure Group Communications Using Key Graphs. In: Proceedings of ACM SIGCOMM'98, (1998), pp. 68 to 79 especially, 3.4 Leaving a tree key graph (http://www.acm.org/sigcomm/sigcomm98/tp/technical.html).

5C Digital Transmission Content Protection White paper Revision 1.0, (1998), pp. 3, 11, 12, (http://www.dtcp.com).

Makoto Tatebayashi, et al., "Kiroku Media no Contents Hogo System", 2000 nen Denshi Joho Tsushin Gakkai Kiso Kyoukai Society Taikai Koen Ronbunshuu, Sep. 07, 2000, pp. 367 to 368.

Patent Abstracts of Japan, abstract of JP 11-224461, (Sony Corporation), Aug. 17, 1999.

| GENERATION #n ||
|---|---|
| DEVICE UNIQUE IDENTIFICATION NUMBER (DEVICE ID) | ENCRYPTED MASTER KEY |
| 1 | Enc(DUK_1, MK_n) |
| 2 | Enc(DUK_2, MK_n) |
| : | : |
| L | Enc(DUK_L, MK_n) |

FIG.28

| GENERATION : t | |
|---|---|
| INDEX | ENCRYPTION KEY |
| 0 | Enc(K(t)0, K(t)R) |
| 00 | Enc(K(t)00, K(t)0) |
| 000 | Enc(K000, K(t)00) |
| 001 | Enc(K(t)001, K(t)00) |
| 0010 | Enc(K0010, K(t)001) |

FIG.33A

| GENERATION : t | |
|---|---|
| INDEX | ENCRYPTION KEY |
| 000 | Enc(K000, K(t)00) |
| 001 | Enc(K(t)001, K(t)00) |
| 0010 | Enc(K0010, K(t)001) |

FIG.33B

INFORMATION RECORDING/REPRODUCING APPARATUS AND METHOD

TECHNICAL FIELD

The present invention relates generally to an information recorder, information player, information recording method, information playback method, key renewing terminal, generation-managed key renewing method, information recording medium, and a program serving medium, and more particularly to an information recorder, information player, information recording method, information playback method, key renewing terminal, generation-managed key renewing method, information recording medium, and a program serving medium, capable of preventing data write to a recording medium to and from which data can be recorded and played back and also unauthorized copying of data in playback of data.

BACKGROUND ART

With the recent advancement and development of the digital signal processing technology, digital recorders and recording media have been prevailing. With such a digital recorder and recording medium, an image or sound, for example, can be repeatedly recorded and played back without any degradation thereof. Since digital data can be repeatedly copied many times with no degradation of the image and sound qualities, so recording media having digital data illegally recorded therein, if put on the market, will cause the copyrighters of various contents such as music, movie, etc. or appropriate or authorized distributors of the contents to be deprived of profits which would come to the latter if such unauthorized copying is not possible. To prevent such unauthorized copying of digital data, various unauthorized copy preventing systems have recently been introduced in digital recorders and recording media.

As an example of the above unauthorized-copy preventing systems, SCMS (Serial Copy Management System) is adopted in the MD (mini disc) drive (MD is a trademark). The SCMS is such that at a data player side, audio data is outputted along with SCMS signal from a digital interface (DIF) while at a data recorder side, recording of the audio data from the data player side is controlled based on the SCMS signal from the data player side, thereby preventing the audio data from being illegally copied.

More particularly, the above SCMS signal indicates that an audio data is a "copy-free" data which is allowed to freely be copied many times, a "copy-once-allowed" data which is allowed to be copied only once or a "copy-prohibited" data which is prohibited from being copied. At the data recorder side, when receiving an audio data from the DIF, SCMS signal transmitted along with the audio data is detected. If the SCMS signal indicates that the audio data is a "copy-free" data, the audio data is recorded along with the SCMS signal to the mini disc. If the SCMS signal indicates that the audio data is a "copy-once-allowed" data, the audio data is converted to a "copy-prohibited" data and the SCMS signal is recorded along with the audio data to the mini disc. Further, if the SCMS signal indicates that the audio data is a copy-prohibited data, the audio data is not recorded to the mini disc. Under a control with the SCMS signal, a copyrighted audio data is prevented from being illegally copied in the mini disc drive unit.

However, the SCMS is valid only when the data recorder itself is constructed to control recording of audio data from the data player side based on the SCMS signal. Therefore, it is difficult for the SCMS to support a mini disc drive not constructed to perform the SCMS control. To apply the SCMS, a DVD player for example adopts a content scrambling system to prevent a copyrighted data from being illegally copied.

The content scrambling system is such that encrypted video data, audio data and the like are recorded in a DVD-ROM (read-only memory) and a decryption key for use to decrypt the encrypted data is granted to each licensed DVD player. The license is granted to a DVD player designed in conformity with a predetermined operation rule against unauthorized copying etc. Therefore, using the granted decryption key, a licensed DVD player can decrypt encrypted data recorded in a DVD-ROM to thereby play back the video and audio data from the DVD-ROM.

On the other hand, an unlicensed DVD player cannot decrypt encrypted data recorded in a DVD-ROM because it has no decryption key for the encrypted data. In short, the content scrambling system prevents a DVD player not meeting the licensing requirements from playing a DVD-ROM having digital data recorded therein in order to prevent unauthorized copying.

However, the content scrambling system adopted in the DVD-ROM is directed to a recording medium to which the user cannot write data (will be referred to as "ROM medium" hereunder wherever appropriate), but not to any recording medium to which the user can write data (will be referred to as "RAM medium" hereunder wherever appropriate).

That is to say, copying all encrypted data recorded in a ROM medium as they are to a RAM medium will produce a so-called pirated edition of the data which can be played back by a licensed DVD player.

To solve the above problem, the Applicant of the present invention proposed, as disclosed in the Japanese Published Unexamined Application No. 224461 of 1999 (Japanese Patent Application No. 25310 of 1998), a method in which information to identify each recording medium (will be referred to as "medium ID information" hereunder) is recorded with other data in a recording medium to allow access to the medium ID information in the recording medium only when a player going to play the recording medium has been licensed for the medium ID information.

The above method encrypts data in the recording medium with a private key (master key) acquired through licensing of the medium ID information so that any unlicensed player cannot acquire any meaningful data even if it can read the encrypted data. Note that a player licensed for the medium ID information has the operation thereof restricted against unauthorized copying.

No unlicensed player can access the medium ID information. The medium ID information is unique to each recording medium. Even if an unlicensed player could copy all encrypted data recorded in such a recording medium to a new recording medium, the data thus recorded in the new recording medium cannot correctly be decrypted by the unlicensed player as well as by a licensed player. Thus, it is substantially possible to prevent data from being illegally copied.

Now it should be reminded that in the above conventional system, a private key (master key) acquired through licensing as having been proposed in the Japanese Patent Application should be common to all the devices included in a system, which is required for playing a recording medium having data recorded therein by any other device in the system (to secure the interoperability).

However, if an attacker has attacked any one of devices included in a system and succeeded in uncovering the private key held in the device, it will be the same as when private keys of all the devices have been uncovered, so that data recorded in the device before the private key is uncovered as well as data recorded after the private key was uncovered, will be cryptanalyzed by the attacker with the private key thus uncovered.

To avoid the above, the Applicant of the present invention proposed, as in the Japanese Patent Application No. 294928 of 1999, a method for managing the generation of the master key. The method is such that a master key common to all devices in a system is used starting with the first generation of the master key and a private key unique to each of device groups is used, thereby acquiring, from a recording medium, a master key which the newest when the recording medium has been produced. Namely, to a group having the master key thereof uncovered as in the above, there is not granted any master key of the next generation for recording media which are produced after the master key was uncovered. Thus, the devices which are appropriate or authorized, namely, have their master key not uncovered, can acquire a master key of a younger generation while the devices whose master key has been uncovered cannot acquire any master key of a younger generation than a one at which the master key has been uncovered last.

The recorder can record data to a recording medium only with a master key of a generation as young as or younger than the generation of a master key stored in the recording medium. A recorder having a master key meeting the above requirement encrypts data with its latest master key for recording. Thus, even for recording to an old recording medium, data is encrypted for the recording with a nearly latest master key by a device (recorder/player) which is appropriate, that is, whose master key has not been uncovered. So, the data recorded in the old recording medium can be prevented from being read by any inappropriate or unauthorized device which cannot acquire the latest master key.

In a system in which the above-mentioned generation-managed master key is used, the recorder encrypts data with its own latest-generation master key for recording of the data to a recording medium. For playing of the recording medium by a player other than the recorder/player having recorded data to the recorder medium, the master key of the generation having been used for recording the data has to be known to the player going to play the recording medium. However, a latest-generation master key cannot be acquired unless access is made to a latest-generation recording medium. Namely, since the master key of the generation on which the data has been recorded cannot be known, even an appropriate or authorized player cannot play back data recorded in the recording medium as the case may be.

Also, a recorder going to record data to a recording medium has to have a master key of a generation younger than allowed by the recording medium. However, since there is a likelihood that an encrypted master key common to a group of devices has been removed from a master key table in the recording medium because the master key for the group has been uncovered, even an appropriate or authorized recorder going to record data to a recording medium cannot record the data to the recording medium as the case may be.

DISCLOSURE OF THE INVENTION

Accordingly, the present invention has an object to overcome the above-mentioned drawbacks of the prior art by providing an information recorder, information player, information recording method, information playback method, key renewal terminal, generation-managed key renewing method, information recording medium and a program serving medium, capable of assuring a wider interoperability while maintaining the function of preventing data from illegally being copied.

According to the first aspect of the present invention, there can be provided an information recorder for recording information to a recording medium, the apparatus including: a cryptography means for encrypting information to be recorded to the recording medium by a cryptography with a generation-managed encryption key which is renewed to a different key for each generation; and a user interface for making a comparison between generation information on a device-stored generation-managed encryption key stored in a storage means of the information recorder and prerecording generation information which is recording-medium generation information prestored in the recording medium, and outputting a warning when the comparison result is that the prerecording generation information is newer than the generation information on the device-stored generation-managed encryption key.

Also in the above information recorder according to the present invention, the device-stored generation-managed encryption key is a master key stored in common to a plurality of information recorders.

Further in the above information recorder according to the present invention, the cryptography means includes means for renewing, when the prerecording generation information is newer than the generation information on the device-stored generation-managed encryption key, a generation-managed encryption key of a generation as young as or younger than that indicated by the prerecording generation information.

Further in the above information recorder according to the present invention, the cryptography means includes a key creating means for creating, based on the device-stored generation-managed encryption key, a generation-managed encryption key whose generation information is older than the generation information on the device-stored generation-managed encryption key.

Further in the above information recorder according to the present invention, the cryptography means includes means for renewing, when the prerecording generation information is newer than the generation information on the device-stored generation-managed encryption key, a generation-managed encryption key of a generation as young as or younger than that indicated by the prerecording generation information, and the key renewing means decrypts an encrypted to-be-renewed generation-managed encryption key with a device key stored in the information recorder to create an renewed generation-managed encryption key.

Further in the above information recorder according to the present invention, the cryptography means acquires a key table in which the encrypted to-be-renewed generation-managed encryption key and a decrypting device key identifier are correlated with each other to decrypt the encrypted to-be-renewed generation-managed encryption key with a device key identified based on the device key identifier in the key table.

Further in the above information recorder according to the present invention, the device key is a key common to information recorders grouped by categorization into a common category.

Further in the above information recorder according to the present invention, the device key is a key common to information recorders enclosed in the same group by grouping based on serial numbers assigned to the information recorders.

Further in the above information recorder according to the present invention, there are provided a node key unique to each of nodes included in a hierarchical tree structure including a plurality of different information recorders each as a leaf and a leaf key unique to each of the information recorders, and the generation-managed encryption key is a key which can be renewed with at least either the node key or leaf key.

Further in the above information recorder according to the present invention, the generation-managed encryption key is a master key common to the plurality of information recorders.

Further in the above information recorder according to the present invention, the node key can be renewed, there is distributed, when a node key is to be renewed, a key renewal block (KRB) derived from encryption of the renewed node key with at least either a node key or leaf key on a lower stage of the tree structure to an information recorder at a leaf where the node key has to be renewed, and the cryptography means in the information recorder receives renewal data for the generation-managed encryption key encrypted with the renewed node key, encrypts the key renewal block (KRB) to acquire the renewed node key, and acquires renewal data for the generation-managed encryption key based on the thus-acquired renewed node key.

Further in the above information recorder according to the present invention, the key renewal block (KRB) is stored in a recording medium and the cryptography means encrypts the key renewal block (KRB) read from the recording medium.

Further in the above information recorder according to the present invention, the generation-managed encryption key has a generation number as renewal information correlated therewith, and the cryptography means stores, as a recording generation number into the recording medium, a generation number of the generation-managed encryption key having been used for storing encrypted data into the recording medium.

According to the second aspect of the present invention, there can be provided an information recorder for recording information to a recording medium, the apparatus including: a cryptography means for encrypting information to be recorded to the recording medium by a cryptography with a generation-managed encryption key which is renewed to a different key for each generation; and a key acquiring means for making a comparison between generation information on a device-stored generation-managed encryption key stored in a storage means of the information recorder and prerecording generation information which is recording-medium generation information prestored in the recording medium, and acquiring a generation-managed encryption key of a generation as young as or younger than that indicated by the prerecording generation information when the comparison result is that the prerecording generation information is newer than the generation information on the device-stored generation-managed encryption key.

Also in the above information recorder according to the present invention, the key acquiring means includes a communication interface capable of receiving data via a network.

Further in the above information recorder according to the present invention, the key acquiring means includes a communication modem capable of receiving data via a telephone line.

Further in the above information recorder according to the present invention, the key acquiring means includes an I/C card interface capable of receiving data via an IC card.

Further in the above information recorder according to the present invention, the cryptography means makes a mutual authentication with a key serving means when the key acquiring means is going to acquire the generation-managed encryption key, and the key acquiring means effects the acquisition of the generation-managed key only when the mutual authentication with the key serving means has successfully been made.

Further in the above information recorder according to the present invention, the device-stored generation-managed encryption key is a master key common to a plurality of information recorders.

Further in the above information recorder according to the present invention, the cryptography means includes means for renewing, when the prerecording generation information is newer than the generation information on the device-stored generation-managed encryption key, a generation-managed encryption key of a generation as young as or younger than that indicated by the prerecording generation information.

Further in the above information recorder according to the present invention, the cryptography means includes a key creating means for creating, based on the device-stored generation-managed encryption key, a generation-managed encryption key whose generation information is older than the generation information on the device-stored generation-managed encryption key.

Further in the above information recorder according to the present invention, the cryptography means includes means for renewing, when the prerecording generation information is newer than the generation information on the device-stored generation-managed encryption key, a generation-managed encryption key of a generation as young as or younger than that indicated by the prerecording generation information, and the key renewing means decrypts an encrypted to-be-renewed generation-managed encryption key with a device key stored in the information recorder to create an renewed generation-managed encryption key.

Further in the above information recorder according to the present invention, the cryptography means acquires a key table in which the encrypted to-be-renewed generation-managed encryption key and a decrypting device key identifier are correlated with each other to decrypt the encrypted to-be-renewed generation-managed encryption key with a device key identified based on the device key identifier in the key table.

Further in the above information recorder according to the present invention, the device key is a key common to information recorders grouped by categorization into a common category.

Further in the above information recorder according to the present invention, the device key is a key common to information recorders enclosed in the same group by grouping based on serial numbers assigned to the information recorders.

Further in the above information recorder according to the present invention, there are provided a node key unique to each of nodes included in a hierarchical tree structure including a plurality of different information recorders each as a leaf and a leaf key unique to each of the information recorders, and the generation-managed encryption key is a key which can be renewed with at least either the node key or leaf key.

Further in the above information recorder according to the present invention, the generation-managed encryption key is a master key common to the plurality of information recorders.

Further in the above information recorder according to the present invention, the node key can be renewed, there is distributed, when a node key is to be renewed, a key renewal block (KRB) derived from encryption of the renewed node key with at least either a node key or leaf key on a lower stage of the tree structure to an information recorder at a leaf where the node key has to be renewed, and the cryptography means in the information recorder receives renewal data for the generation-managed encryption key encrypted with the renewed node key, encrypts the key renewal block (KRB) to acquire the renewed node key, and acquires renewal data for the generation-managed encryption key based on the thus-acquired renewed node key.

Further in the above information recorder according to the present invention, the key renewal block (KRB) is stored in a recording medium and the cryptography means encrypts the key renewal block (KRB) read from the recording medium.

Further in the above information recorder according to the present invention, the generation-managed encryption key has a generation number as renewal information correlated therewith, and the cryptography means stores, as a recording generation number into the recording medium, a generation number of the generation-managed encryption key having been used for storing encrypted data into the recording medium.

According to the third aspect of the present invention, there can be provided an information recorder for recording information to a recording medium, the apparatus including: a cryptography means for encrypting information to be recorded to the recording medium by a cryptography with a generation-managed encryption key which is renewed to a different key for each generation; and a key renewing terminal connecting interface for connection of a key renewing terminal which makes a comparison between generation information on a device-stored generation-managed encryption key stored in a storage means of the information recorder and prerecording generation information which is recording-medium generation information prestored in the recording medium, and acquires a generation-managed encryption key of a generation as young as or younger than that indicated by the prerecording generation information when the comparison result is that the prerecording generation information is newer than the generation information on the device-stored generation-managed encryption key.

Further in the above information recorder according to the present invention, a mutual authentication with the key renewing terminal is effected for acquiring the generation-managed encryption key from the key renewing terminal, and the generation-managed encryption key is acquired only when the mutual authentication with the key renewing terminal has successfully been made.

Further in the above information recorder according to the present invention, there are provided a node key unique to each of nodes included in a hierarchical tree structure including a plurality of different information recorders each as a leaf and a leaf key unique to each of the information recorders, and the generation-managed encryption key is a key which can be renewed with at least either the node key or leaf key.

Further in the above information recorder according to the present invention, the generation-managed encryption key is a master key common to the plurality of information recorders.

Further in the above information recorder according to the present invention, the node key can be renewed, there is distributed, when a node key is to be renewed, a key renewal block (KRB) derived from encryption of the renewed node key with at least either a node key or leaf key on a lower stage of the tree structure to an information recorder at a leaf where the node key has to be renewed, and the cryptography means in the information recorder receives renewal data for the generation-managed encryption key encrypted with the renewed node key, encrypts the key renewal block (KRB) to acquire the renewed node key, and acquires renewal data for the generation-managed encryption key based on the thus-acquired renewed node key.

Further in the above information recorder according to the present invention, the key renewal block (KRB) is stored in a recording medium and the cryptography means encrypts the key renewal block (KRB) read from the recording medium.

Further in the above information recorder according to the present invention, the generation-managed encryption key has a generation number as renewal information correlated therewith, and the cryptography means stores, as a recording generation number into the recording medium, a generation number of the generation-managed encryption key having been used for storing encrypted data into the recording medium.

According to the fourth aspect of the present invention, there can be provided an information player for playing back information from a recording medium, the apparatus including: a cryptography means for decrypting information read from the recording medium by a cryptography with a generation-managed encryption key which is renewed to a different key for each generation; and a user interface for making a comparison between generation information on a device-stored generation-managed decryption key stored in a storage means of the information player and recording generation information which is generation information having been used for recording the information to the recording medium, and outputting a warning when the comparison result is that the recording generation information is newer than the generation information on the device-stored generation-managed decryption key.

Also in the above information player according to the present invention, the cryptography means does not make any information decryption when a comparison made between the recording generation information which is generation information having been used for recording the information to the recording medium and prerecording generation information which is recording medium generation information prestored in the recording medium shows that the prerecording generation information is newer than the recording generation information.

Further in the above information player according to the present invention, the device-stored generation-managed decryption key is a master key stored in common to a plurality of information players.

Further in the above information player according to the present invention, the cryptography means includes means for renewing, when the prerecording generation information is newer than the generation information on the device-stored generation-managed decryption key, a generation-managed decryption key of a generation as young as or younger than that indicated by the prerecording generation information.

Further in the above information player according to the present invention, the cryptography means includes a key creating means for creating, based on the device-stored generation-managed decryption key, a generation-managed decryption key whose generation information is older than the generation information on the device-stored generation-managed decryption key.

Further in the above information player according to the present invention, the cryptography means includes means for renewing, when the recording generation information is newer than the generation information on the device-stored generation-managed encryption key, a generation-managed encryption key of a generation as young as or younger than that indicated by the prerecording generation information, and the key renewing means decrypts an encrypted to-be-renewed generation-managed encryption key with a device key stored in the information player to create an renewed generation-managed encryption key.

Further in the above information player according to the present invention, the cryptography means acquires a key table in which the encrypted generation-managed encryption key to ne renewed and a decrypting device key identifier are correlated with each other to decrypt the encrypted to-be-renewed generation-managed encryption key with a device key identified based on the device key identifier in the key table.

Further in the above information player according to the present invention, the device key is a key common to information players grouped by categorization into a common category.

Further in the above information recorder according to the present invention, the device key is a key common to information players enclosed in the same group by grouping based on serial numbers assigned to the information players.

Further in the above information player according to the present invention, there are provided a node key unique to each of nodes included in a hierarchical tree structure including a plurality of different information players each as a leaf and a leaf key unique to each of the information players, and the generation-managed encryption key is a key which can be renewed with at least either the node key or leaf key.

Further in the above information player according to the present invention, the generation-managed encryption key is a master key common to the plurality of information players.

Further in the above information player according to the present invention, the node key can be renewed, there is distributed, when a node key is to be renewed, a key renewal block (KRB) derived from encryption of the renewed node key with at least either a node key or leaf key on a lower stage of the tree structure to an information player at a leaf where the node key has to be renewed, and the cryptography means receives renewal data for the generation-managed decryption key encrypted with the renewed node key, encrypts the key renewal block (KRB) to acquire the renewed node key, and acquires renewal data for the generation-managed decryption key based on the thus-acquired renewed node key.

Further in the above information player according to the present invention, the key renewal block (KRB) is stored in a recording medium and the cryptography means encrypts the key renewal block (KRB) read from the recording medium.

Further in the above information player according to the present invention, the generation-managed decryption key has a generation number as renewal information correlated therewith, and for decryption of encrypted data read from the recording medium, the cryptography means reads, from the recording medium, a generation number of the generation-managed encryption key having been used for encrypting the data and decrypts the encrypted data with a generation-managed decryption key corresponding to the thus-read generation number.

According to the fifth aspect of the present invention, there can be provided an information player for playing back information from a recording medium, the apparatus including: a cryptography means for decrypting information read from the recording medium by a cryptography with a generation-managed decryption key which is renewed to a different key for each generation; and a key acquiring means for making a comparison between generation information on a device-stored generation-managed decryption key stored in a storage means of the information player and recording generation information which is generation information having been used for recording the information, and acquiring a generation-managed decryption key of a generation as young as or younger than that indicated by the recording generation information when the comparison result is that the recording generation information is newer than the generation information on the device-stored generation-managed decryption key.

Also in the above information player according to the present invention, the cryptography means does not make any information decryption when a comparison made between the recording generation information which is generation information having been used for recording the information to the recording medium and prerecording generation information which is recording medium generation information prestored in the recording medium shows that the prerecording generation information is newer than the recording generation information.

Also in the above information player according to the present invention, the key acquiring means includes a communication interface capable of receiving data via a network.

Further in the above information player according to the present invention, the key acquiring means includes a communication modem capable of receiving data via a telephone line.

Further in the above information player according to the present invention, the key acquiring means includes an I/C card interface capable of receiving data via an IC card.

Further in the above information player according to the present invention, the cryptography means makes a mutual authentication with a key serving means when the key acquiring means is going to acquire the generation-managed decryption key, and the key acquiring means effects the acquisition of the generation-managed key only when the mutual authentication with the key serving means has successfully been made.

Further in the above information player according to the present invention, the device-stored generation-managed decryption key is a master key common to a plurality of information players.

Further in the above information player according to the present invention, the cryptography means includes means for renewing, when the recording generation information is newer than the generation information on the device-stored generation-managed decryption key, a generation-managed decryption key of a generation as young as or younger than that indicated by the recording generation information.

Further in the above information player according to the present invention, the cryptography means includes a key creating means for creating, based on the device-stored generation-managed encryption key, a generation-managed decryption key whose generation information is older than the generation information on the device-stored generation-managed decryption key.

Further in the above information player according to the present invention, the cryptography means includes means for renewing, when the recording generation information is newer than the generation information on the device-stored generation-managed decryption key, a generation-managed encryption key of a generation as young as or younger than that indicated by the recording generation information, and the key renewing means decrypts an encrypted to-be-renewed generation-managed decryption key with a device key stored in the information player to create an renewed generation-managed encryption key.

Further in the above information player according to the present invention, the cryptography means acquires a key table in which the encrypted to-be-renewed generation-managed encryption key and a decrypting device key identifier are correlated with each other to decrypt the encrypted to-be-renewed generation-managed encryption key with a device key identified based on the device key identifier in the key table.

Further in the above information player according to the present invention, the device key is a key common to information players grouped by categorization into a common category.

Further in the above information player according to the present invention, the device key is a key common to information players enclosed in the same group by grouping based on serial numbers assigned to the information players Further in the above information player according to the present invention, there are provided a node key unique to each of nodes included in a hierarchical tree structure including a plurality of different information players each as a leaf and a leaf key unique to each of the information players, and the generation-managed decryption key is a key which can be renewed with at least either the node key or leaf key.

Further in the above information player according to the present invention, the generation-managed decryption key is a master key common to the plurality of information players.

Further in the above information player according to the present invention, the node key can be renewed, there is distributed, when a node key is to be renewed, a key renewal block (KRB) derived from decryption of the renewed node key with at least either a node key or leaf key on a lower stage of the tree structure to an information player at a leaf where the node key has to be renewed, and the cryptography means receives renewal data for the generation-managed decryption key encrypted with the renewed node key, encrypts the key renewal block (KRB) to acquire the renewed node key, and acquires renewal data for the generation-managed decryption key based on the thus-acquired renewed node key.

Further in the above information player according to the present invention, the key renewal block (KRB) is stored in a recording medium and the cryptography means encrypts the key renewal block (KRB) read from the recording medium.

Further in the above information player according to the present invention, the generation-managed decryption key has a generation number as renewal information correlated therewith, and for decryption of encrypted data read from the recording medium, the cryptography means reads, from the recording medium, a generation number of the generation-managed encryption key having been used for encrypting the data and decrypts the encrypted data with a generation-managed decryption key corresponding to the thus-read generation number.

According to the sixth aspect of the present invention, there can be provided an information player for playing back information from a recording medium, the apparatus including: a cryptography means for decrypting information read from the recording medium by a cryptography with a generation-managed decryption key which is renewed to a different key for each generation; and a key renewing terminal connecting interface for connection of a key renewing terminal which makes a comparison between generation information on a device-stored generation-managed encryption key stored in a storage means of the information player and recording generation information which is generation information having been used for recording the information to the recording medium and acquires a generation-managed decryption key of a generation as young as or younger than that indicated by the generation information on the device-stored generation-managed decryption key when the comparison result is that the recording generation information is newer than the generation information on the device-stored generation-managed decryption key.

Further in the above information player according to the present invention, a mutual authentication with a key serving means is effected when the key acquiring means is going to acquire the generation-managed decryption key, and the acquisition of the generation-managed key is effected only when the mutual authentication with the key serving means has successfully been made.

Further in the above information player according to the present invention, there are provided a node key unique to each of nodes included in a hierarchical tree structure including a plurality of different information players each as a leaf and a leaf key unique to each of the information players, and the generation-managed decryption key is a key which can be renewed with at least either the node key or leaf key.

Further in the above information player according to the present invention, the generation-managed decryption key is a master key common to the plurality of information players.

Further in the above information player according to the present invention, the node key can be renewed, there is distributed, when a node key is to be renewed, a key renewal block (KRB) derived from decryption of the renewed node key with at least either a node key or leaf key on a lower stage of the tree structure to an information player at a leaf where the node key has to be renewed, and the cryptography means in the information player receives renewal data for the generation-managed decryption key encrypted with the renewed node key, encrypts the key renewal block (KRB) to acquire the renewed node key, and acquires renewal data for the generation-managed decryption key based on the thus-acquired renewed node key.

Further in the above information player according to the present invention, the key renewal block (KRB) is stored in a recording medium and the cryptography means encrypts the key renewal block (KRB) read from the recording medium.

Further in the above information player according to the present invention, the generation-managed decryption key has a generation number as renewal information correlated therewith, and for decryption of encrypted data read from the recording medium, the cryptography means reads, from the recording medium, a generation number of the generation-managed encryption key having been used for encrypting the data and decrypts the encrypted data with a generation-managed decryption key corresponding to the thus-read generation number.

According to the seventh aspect of the present invention, there can be provided an information recording method for recording information to a recording medium, the method including the steps of: encrypting information to be recorded to the recording medium by a cryptography with a generation-managed encryption key which is renewed to a different key for each generation; making a comparison between generation information on a device-stored generation-managed encryption key stored in a storage means of an information recorder and prerecording generation information which is recording-medium generation information prestored in the recording medium; and outputting a warning when the comparison result is that the prerecording generation information is newer than the generation information on the device-stored generation-managed encryption key.

According to the eighth aspect of the present invention, there can be provided an information recording method for recording information to a recording medium, the method including the steps of: encrypting information to be recorded to the recording medium by a cryptography with a generation-managed encryption key which is renewed to a different key for each generation; and making a comparison between generation information on a device-stored generation-managed encryption key stored in a storage means of the information recorder and prerecording generation information which is recording-medium generation information prestored in the recording medium; and acquiring a generation-managed encryption key of a generation as young as or younger than that indicated by the prerecording generation information when the comparison result is that the prerecording generation information is newer than the generation information on the device-stored generation-managed encryption key.

Further in the above information recording method according to the present invention, the key acquiring step further includes the steps of: renewing the generation-managed encryption key with at least either a node key unique to each of nodes included in a hierarchical tree structure including a plurality of different information recorders each as a leaf or a leaf key unique to each of the information recorders; and encrypting data to be recorded into the recording medium with the generation-managed encryption key renewed in the renewing step.

Further in the above information recording method according to the present invention, the generation-managed encryption key is a master key common to the plurality of information recorders.

Further in the above information recording method according to the present invention, the node key can be renewed; there is distributed, when a node key is to be renewed, a key renewal block (KRB) derived from encryption of the renewed node key with at least either a node key or leaf key on a lower stage of the tree structure to an information recorder at a leaf where the node key has to be renewed; and the renewing step further including the steps of: acquiring a renewed node key by encryption of the key renewal block (KRB); and calculating renewal data for the generation-managed encryption key based on the thus-acquired renewed node key.

Further in the above information recording method according to the present invention, the generation-managed encryption key has a generation number as renewal information correlated therewith; and the encrypting step further includes the step of: storing, as a recording generation number into the recording medium, a generation number of the generation-managed encryption key having been used for storing encrypted data into the recording medium.

According to the ninth aspect of the present invention, there can be provided an information playback method for playing back information from a recording medium, the method including the steps of: decrypting information read from the recording medium by a cryptography with a generation-managed encryption key which is renewed to a different key for each generation; making a comparison between generation information on a device-stored generation-managed decryption key stored in a storage means of the information player and recording generation information which is generation information having been used for recording the information to the recording medium; and outputting a warning when the comparison result is that the recording generation information is newer than the generation information on the device-stored generation-managed decryption key.

According to the tenth aspect of the present invention, there can be provided an information playback method for playing back information from a recording medium, the method including: decrypting information read from the recording medium by a cryptography with a generation-managed decryption key which is renewed to a different key for each generation; making a comparison between generation information on a device-stored generation-managed decryption key stored in a storage means of the information recorder/player and recording generation information which is generation information having been used for recording the information; and acquiring a generation-managed decryption key of a generation as young as or younger than that indicated by the recording generation information when the comparison result is that the recording generation information is newer than the generation information on the device-stored generation-managed decryption key.

Further in the above information playback method according to the present invention, the key acquiring step further includes the steps of: renewing the generation-managed decryption key with at least either a node key unique to each of nodes included in a hierarchical tree structure including a plurality of different information players each as a leaf or a leaf key unique to each of the information players; and decrypting data to be recorded into the recording medium with the generation-managed decryption key renewed in the renewing step.

Further in the above information playback method according to the present invention, the generation-managed decryption key is a master key common to the plurality of information players.

Further in the above information playback method according to the present invention, the node key can be renewed; there is distributed, when a node key is to be renewed, a key renewal block (KRB) derived from encryption of the renewed node key with at least either a node key or leaf key on a lower stage of the tree structure to an information player at a leaf where the node key has to be renewed; and the renewing step further including the steps of: acquiring a renewed node key by encryption of the key renewal block (KRB); and calculating renewal data for the generation-managed decryption key based on the thus-acquired renewed node key.

Further in the above information playback method according to the present invention, the generation-managed decryption key has a generation number as renewal information correlated therewith; and the decrypting step further includes the step of: reading a generation number of the generation-managed encryption key having been used for encrypting the data from the recording medium; and decrypting the encrypted data read from the recording medium with a generation-managed decryption key corresponding to the thus-read generation number.

According to the eleventh aspect of the present invention, there can be provided an information recording medium to which information can be recorded, the medium having stored therein: prerecording generation information as generation information on a key allowed as an encryption key usable for writing encrypted data to the information recording medium or a decryption key usable for decrypting data read from the information recording medium.

Also in the above information recording medium according to the present invention, the prerecording generation information is recorded in a non-writable area thereof.

According to the twelfth aspect of the present invention, there can be provided a key renewing terminal for serving a renewed generation-managed key to an information recorder or player having a cryptography means for encrypting information to be recorded to a recording medium or an information recorder or player having a cryptography means for decrypting information read from a recording medium, each by a cryptography with a generation-managed key which can be renewed to a different key for each generation, the apparatus including: an interface connectable to the information recorder or player; means for communications with outside; and means for controlling each of acquisition of a device-unique identifier from the information recorder or player via the interface, transmission of the device-unique identifier via the communications means, and transfer of the renewed generation-managed key to the information recorder or player via the interface.

According to the thirteenth aspect of the present invention, there can be provided a key renewing terminal for serving a renewed generation-managed key to an information recorder or player having a cryptography means for encrypting information to be recorded to a recording medium or an information recorder or player having a cryptography means for decrypting information read from a recording medium, each by a cryptography with a generation-managed key which can be renewed to a different key for each generation, the apparatus including: an interface connectable to the information recorder or player; a storage means having stored therein a key table in which a generation-managed key encrypted with a device-unique encryption key is correlated with an identifier unique to the information recorder or player; and means for controlling each of acquisition of the device-unique identifier from the information recorder or player via the interface, acquisition, based on the device-unique identifier, of an encrypted generation-managed key corresponding to the device-unique identifier from the storage means, and transfer of the renewed generation-managed key to the information recorder or player via the interface.

Also in the above key renewing terminal according to the present invention, a mutual authentication is effected with the information recorder or player; and the generation-managed key is served to the information recorder or player only when the mutual authentication has successfully be made.

According to the fourteenth aspect of the present invention, there can be provided a generation-managed key renewing method for serving a renewed generation-managed key to an information recorder or player having a cryptography means for encrypting information to be recorded to a recording medium or an information recorder or player having a cryptography means for decrypting information read from a recording medium, each by a cryptography with a generation-managed key which can be renewed to a different key for each generation, the method including the steps of: connecting a key renewing terminal including an interface connectable to the information recorder or player and means for communications with outside to the information recorder or player; acquiring a device-unique identifier from the information recorder or player via the interface; transmitting the device-unique identifier via the communications means; receiving the renewed generation-managed key via the communications means; and transferring the renewed generation-managed key to the information recorder or player via the interface.

According to the fifteenth aspect of the present invention, there can be provided a generation-managed key renewing method for serving a renewed generation-managed key to an information recorder or player having a cryptography means for encrypting information to be recorded to a recording medium or an information recorder having a cryptography means for decrypting information read from a recording medium, each by a cryptography with a generation-managed key which can be renewed to a different key for each generation, the method including the steps of: connecting a key renewing terminal including an interface connectable to the information recorder or player and a storage means having stored therein a key table in which a generation-managed key encrypted with an encryption key unique to a device-unique key is correlated with a device-unique identifier of the information recorder or player to the information recorder or player; acquiring the device-unique identifier from the information recorder or player via the interface; acquiring, based on the device-unique identifier, an encrypted generation-managed key corresponding to the device-unique key from the storage means; and transferring a renewed generation-managed key to the information recorder or player via the interface.

Also in the above generation-managed key renewing method according to the present invention, a mutual authentication is effected with the information recorder or player; and the renewed generation-managed key is served to the information recorder or player only when the mutual authentication has successfully be made.

According to the sixteenth aspect of the present invention, there can be provided a program serving medium for serving a computer program under which information is recorded to a recording medium in a computer system, the computer program including the steps of: making a comparison between generation information on a device-stored generation-managed encryption key stored in a storage means of an information recorder and prerecording generation information which is recording-medium generation information prestored in the recording medium; encrypting information to be stored into the recording medium by a cryptography with a generation-managed encryption key which can be renewed to a different key for each generation; and effecting at least either outputting of a warning or acquisition of a generation-managed encryption key of a generation as young as or younger than that indicated by the generation information on the device-stored generation-managed encryption key when the comparison result is that the prerecording generation information is newer than the generation information on the device-stored generation-managed encryption key.

Further in the above program serving medium according to the present invention, the computer program further including the step of renewing the generation-managed encryption key by encryption of encrypted data read from the recording medium with at least either a node key unique to each of nodes included in a hierarchical tree structure including a plurality of different information recorders each as a leaf or a leaf key unique to each of the information recorders.

According to the seventeenth aspect of the present invention, there can be provided a program serving medium for serving a computer program under which information is recorded to a recording medium in a computer system, the computer program including the steps of: making a comparison between generation information on a device-stored generation-managed encryption key stored in a storage means of an information player and recording generation information which is generation information having been used for recording the information to the recording medium; decrypting information read from the recording medium by a cryptography with a generation-managed decryption key which can be renewed to a different key for each generation; and effecting at least either outputting of a warning or acquisition of a generation-managed encryption key of a generation as young as or younger than that indicated by the generation information on the device-stored generation-managed decryption key when the comparison result is that the recording generation information is newer than the generation information on the device-stored generation-managed decryption key.

Further in the above program serving medium according to the present invention, the computer program further including the step of renewing the generation-managed decryption key by decryption of encrypted data read from the recording medium with at least either a node key unique to each of nodes included in a hierarchical tree structure including a plurality of different information players each as a leaf or a leaf key unique to each of the information players.

According to the present invention, when the generation of a master key held in a player is older than the generation at which data has been recorded so that the data cannot be played back, the user is prompted to renew the master key and acquire a necessary master key for playback of the data. The master key is acquired using a transmission medium such as a medium other than a recording medium having the data recorded therein, network or the like, and the data is played back with the thus-acquired master key.

Also according to the present invention, when the generation of a master key held in a recorder is older than a generation of a master key necessary for recording data to a recording medium so that the data cannot be recorded, the user is prompted to renew the master key and acquire a necessary master key for recording the data. The master key is acquired using a transmission medium such as a medium other than the recording medium to which the data is to be recorded, network or the like, and the data is recorded with the thus-acquired master key.

Note that the program serving media according to the sixteenth and seventeenth aspects of the present invention are for example a medium which serves a computer program in a computer-readable form to a general-purpose computer system capable of executing various program codes. The medium is not limited to any special form but it may be any of recording media such as CD, FD, MO, etc. and transmission media such as a network.

The above program serving media define a structural or functional collaboration between a computer program and medium to perform functions of a predetermined computer program in a computer system. In other words, when the computer program is installed in a computer system via the program serving medium, it will work collaboratively in the computer system to provide the similar effects to those in the other aspects of the present invention.

These objects and other objects, features and advantages of the present invention will become more apparent from the following detailed description of the preferred embodiments of the present invention when taken in conjunction with the accompanying drawings.

BRIEF DESCRIPTION OF THE DRAWINGS

FIG. 28 shows an example of the key table held in a key issuing institute, used in the key acquisition by the key renewing terminal in the information recorder/player according to the present invention.

FIGS. 33A and 33B show examples of the key renewal block (KRB) used in distribution of keys such as a master key, medium key and the like is a block diagram (1) explaining the key renewal with the key renewing terminal in the information recorder/player according to the present invention.

BEST MODE FOR CARRYING OUT THE INVENTION

[1. Basic System Configuration for Master Key Generation Management]

Figure 1:
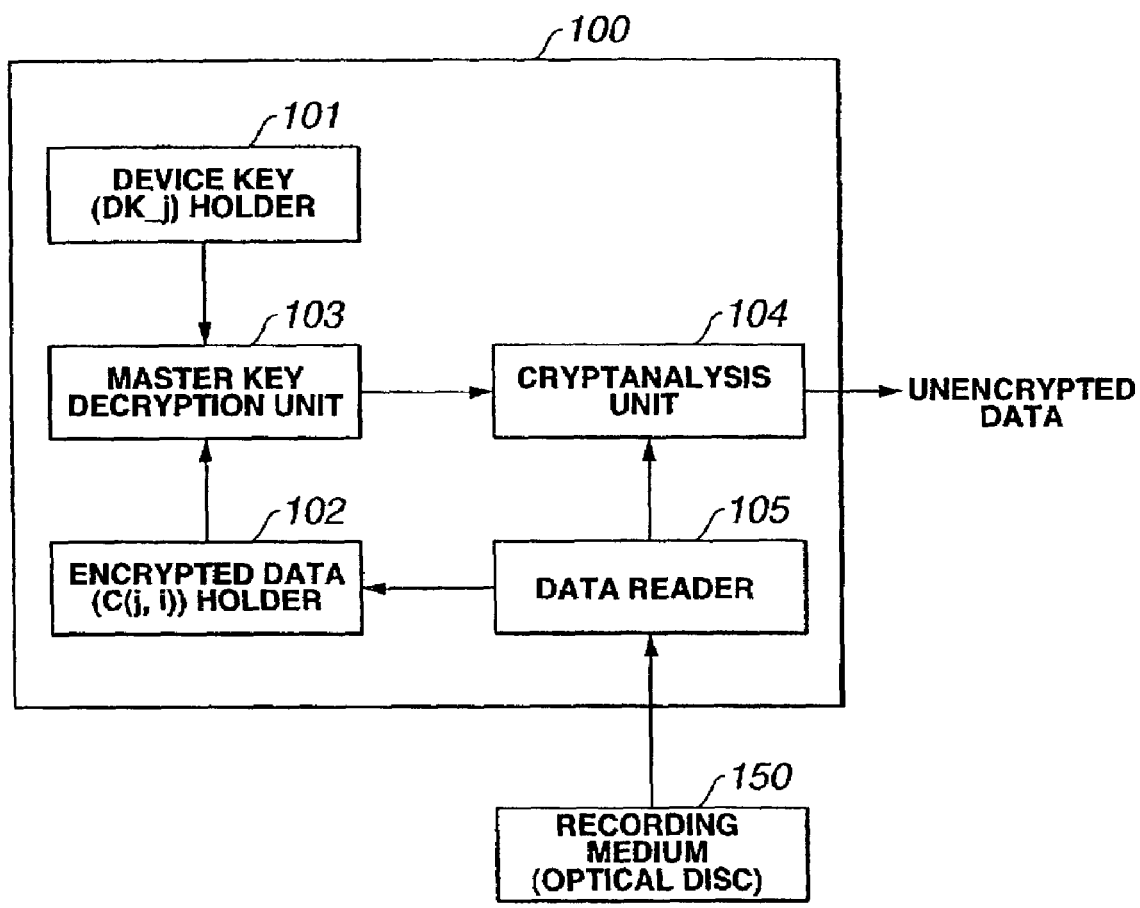
FIG. 1 is a block diagram showing the construction of the cryptography unit included in the information recorder/player of the present invention.

Referring now to FIG. 1, there is schematically illustrated in the form of a block diagram one embodiment of the information player according to the present invention, showing mainly the cryptography unit. The information player is generally indicated with a reference 100. The information player 100 includes a device key holder 101 which holds a device key DK_j assigned to the information player 100. The information recorder/player 100 includes also an encrypted data holder 102 which holds an encrypted master key C(j, i) (master key MK_i encrypted with the device key DK). The relation between the device key DK_j, master key MK_i and encrypted master key C(j, i) is expressed by C(j, i)=Enc(DK_j, MK_i).

Note that the "i" indicates a generation number of the master key, "j" indicates a category number. The category number is a number assigned to a device such as an information player or the like. It is assigned to each predetermined unit such as a device, device manufacturer, device model, device lot or a predetermined number of the devices, for example, a serial number appended to a device. The device key DK_j will be referred to simply as "device key DK" hereunder wherever the device key DK_j has not to be identified with a category number j. Similarly, the masker key MK will be referred to simply as "master key MK" hereunder wherever it has not to be identified with the generation number i. Correspondingly, the encrypted master key C(j, i) will be referred to simply as "encrypted master key C" hereunder.

The device key DK and encrypted master key C are granted to a device from a key issuing institute, and prestored. The key issuing institute stores the encrypted master key MK while confidentially storing the device key DK in correlation with the category number j.

The information player 100 further includes a master key decryption unit 103 which uses the device key DK held in the device key holder 101 to decrypt the encrypted master key C stored in the encrypted data holder 102, thereby acquiring the master key MK. That is, on the assumption that a function by which encrypted data X is decrypted with a key Y is DEC(X, Y), the master key decryption unit 103 calculates an equation MK_i=DEC(DK_j, C(j,i)). The master key MK thus acquired is supplied to a cryptanalysis unit 104 also included in the information player 100.

The cryptanalysis unit 104 uses the master key MK supplied from the master key decryption unit 103 to cryptanalyze data encrypted with the master key MK, read by the data reader 105 from a recording medium (optical disc) 150 or the like. More particularly, the recording medium 150 has recorded therein data having been encrypted with the master key MK, and the cryptanalysis unit 104 cryptanalyzes (decrypts) the encrypted data with the master key MK. When the cryptanalyzed data is image data for example, it will be outputted to a display device and displayed thereon. Also a data reader 105 is included in the information player 100. For renewing the master key MK as will be described later, the data reader 105 will read, from the recording medium (optical disc) 150 having recorded therein data to be renewed, the encrypted master key C derived from encryption of the master key MK with the device key DK, and outputs it to the encrypted data holder 102.

Next, the renewal of the master key MK in the information player 100 will be described. The master key MK is renewed irregularly, for example, when the master key MK_i having a generation number i has been uncovered by an attacker or the like, or regularly at predetermined intervals. In the following, it is assumed that for renewal of the master key MK_i, an optical disc having recorded therein a master key MK_i having been encrypted with the device keys DK_j of all the devices (encrypted master key C(j, i)) is distributed from the key issuing institute to the information player 100. Note that the encrypted master key C(j, i) may of course be distributed via a recording medium other than an optical disc or via a network such as the Internet. Also, the recording medium (optical disc) 150 has not to be a one dedicated for renewal of the master key MK_i but may be a one having recorded therein a content such as video data, audio data or the like or a one to which a content can be recorded in future.

Figure 2:
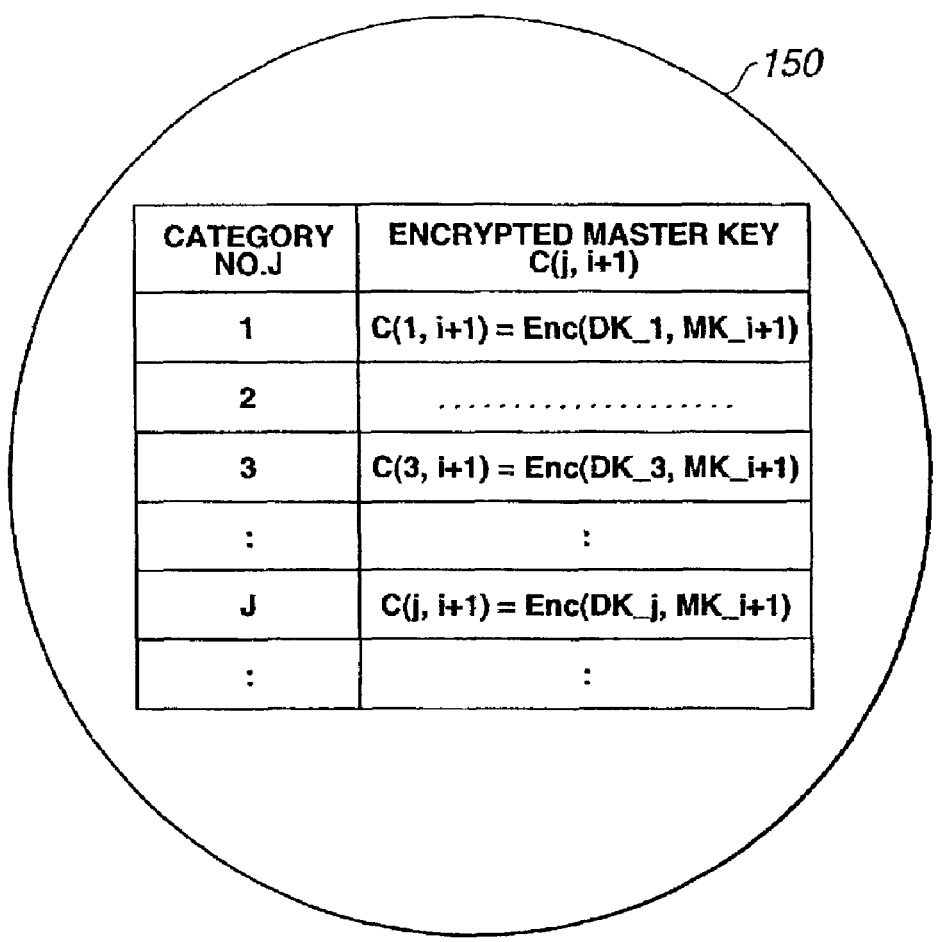
FIG. 2 illustrates the master key management in the information recorder/player according to the present invention.

FIG. 2 shows an example of the encrypted master key C(j, i) recorded in the recording medium (optical disc) 150. This is an example of the renewal of a master key MK_i of a generation i to a master key MK_i+1 of a generation i+1. That is, the optical disc 150 has recorded therein a category number j and an encrypted master key C(j, i+1) derived from encryption of the master key MK_i+1 with the device key DK_j of the category number j as correlated with each other.

As will be seen from FIG. 2, the master key MK_i+1 is common to all category numbers j, namely, to all devices. Thus, this commonization of the master key MK to all devices enables licensed devices each holding a formal device key DK to use data encrypted with the master key MK in common, namely, to keep the interoperability. Any device not holding the formal device key DK is not allowed to decrypt the master key MK, and thus cannot decrypt data having been encrypted with the master key MK.

For instance, when a device of a category number 2 has been attacked by an attacker and it is known that the device key DK_2 has been opened, the field for an encrypted master key C(2, i+1) corresponding to the category number 2, of the data for renewing the master key MK (encrypted master key C(j, i+1)), will be blanked as shown in FIG. 2. Thus, by granting no master key MK_i+1 of a new generation to the device whose device key DK has been uncovered due to such an attacking, it is possible to remove the device having the device key DK_2 from a group of devices each having a legal right of use.

Figure 3:
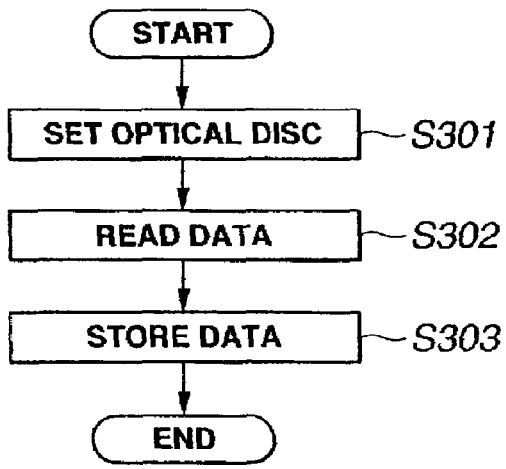
FIG. 3 shows a flow of operations effected in renewal of a master key in the information recorder/player according to the present invention.

Referring now to FIG. 3, there is shown a flow of operations effected in renewal of the master key. The operations of the information player for renewing the master key MK_i of a generation i to a master key MK_i+1 of a generation i+1 will be described below with reference to the flow chart. In step S301, the recording medium (optical disc) 150 having recorded therein data for renewal of the above-mentioned master key MK is set by the user into the information player. In step S302, the data reader 105 in the information player reads, from the thus-set optical disc 150, an encrypted master key C(j, i+1) assigned to the category number i of the information player (stored device key DK). For example, when the category number j is "3", the data reader 105 will read an encrypted master key C(3, i+1).

The encrypted master key C(j, i+1) thus read is stored into the encrypted data holder 102 in step S303. Thus, only the renewed master key C(j, i+1) is stored in the encrypted data holder 102.

Figure 4:
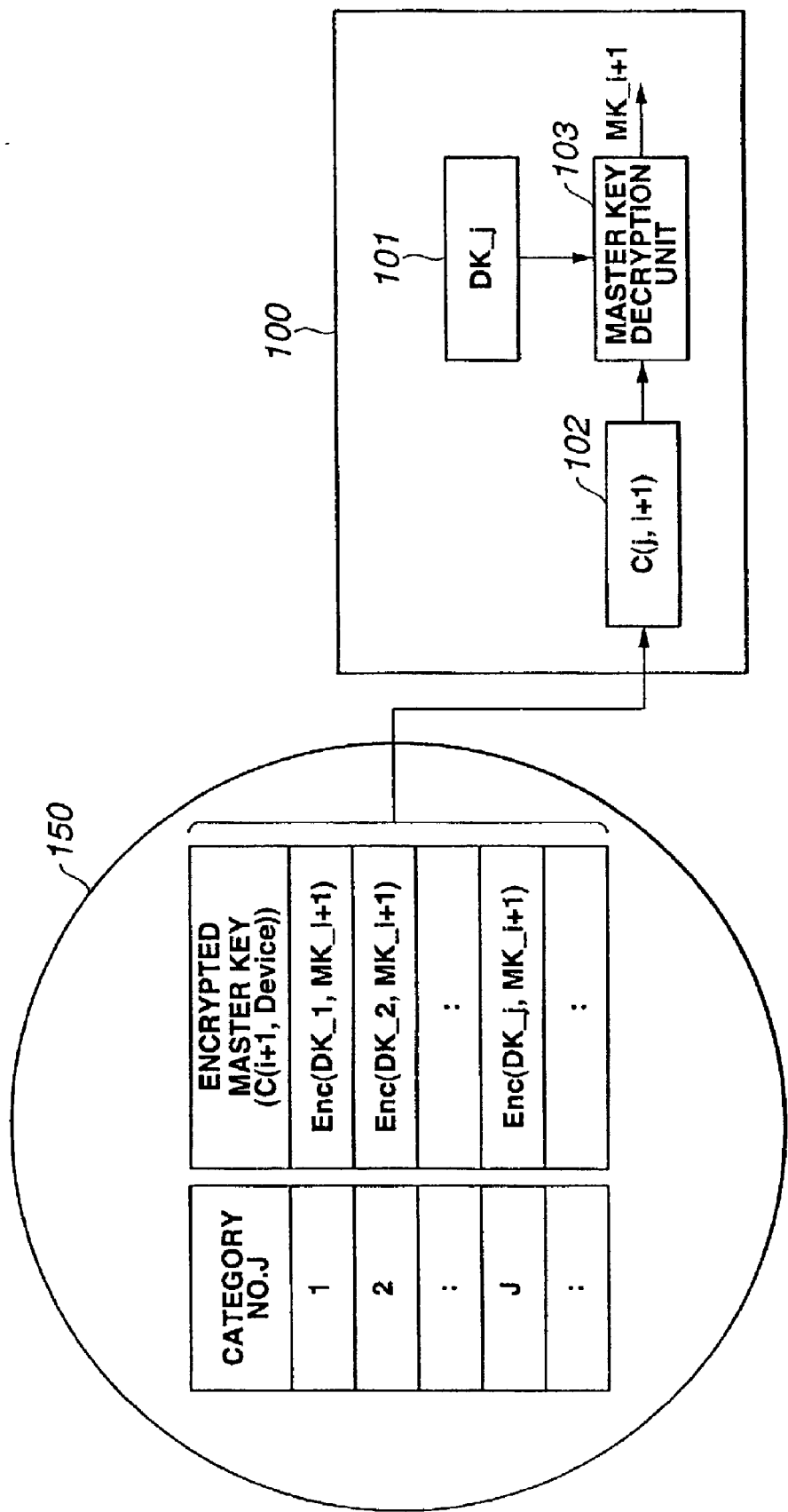
FIG. 4 is a block diagram showing the master key renewal in the information recorder/player according to the present invention.

For playback of data having been encrypted with the master key MK recorded in the optical disc 150 by the use of the master key C(j, i+1) stored in the encrypted data bolder 102, the master key decryption unit 103 the encrypted master key C(j, i+1) stored in the encrypted data holder 102 with a device key DK_j held in the device key holder 101 to acquire a master key MK_i+1 as shown in FIG. 4. Then, the encrypted data recorded in the recording medium (optical disc) 150 is decrypted with the master key MK_i+1.

Figure 5:
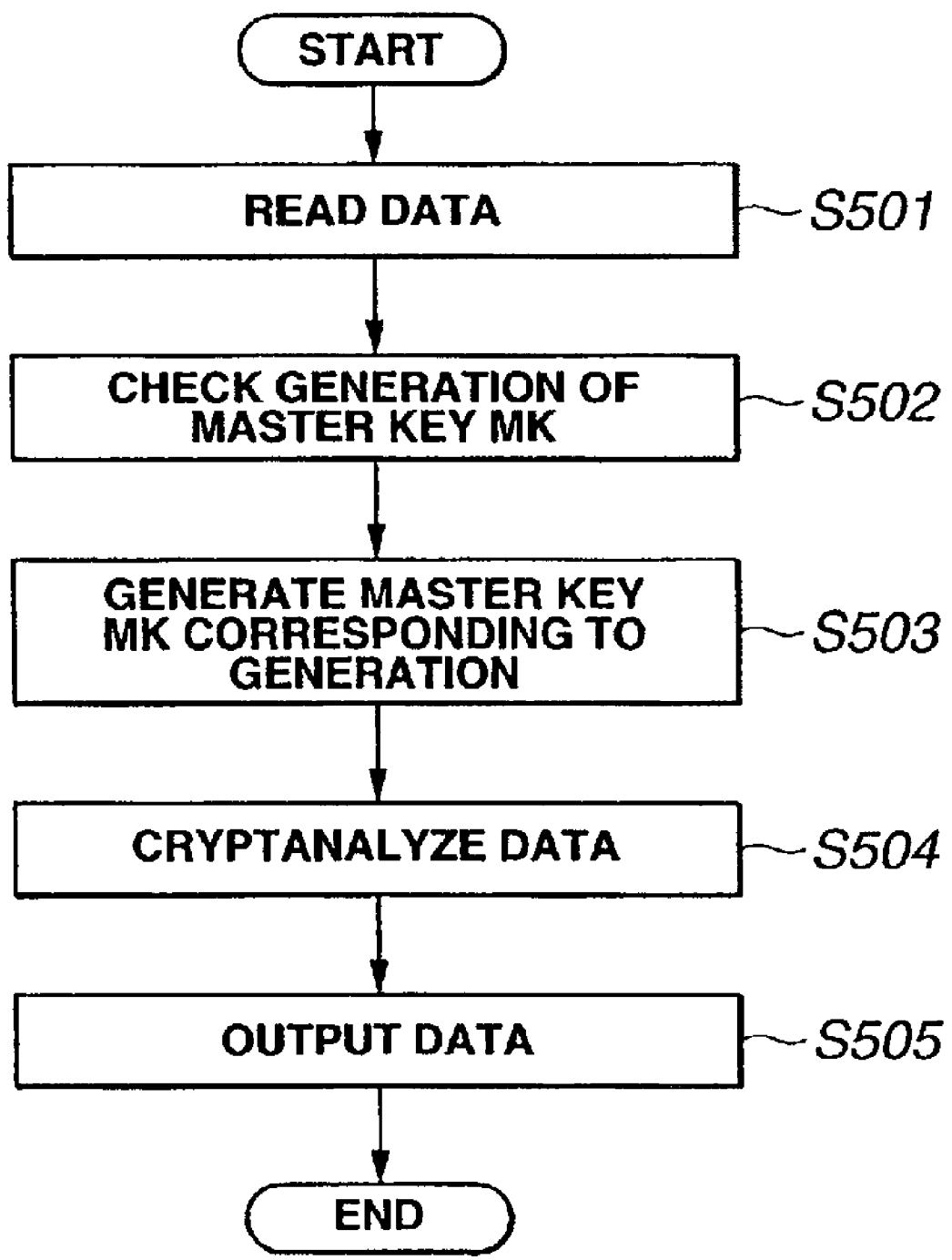
FIG. 5 shows a flow of operations effected in information playback in the information recorder/player according to the present invention.

FIG. 5 show a flow of operations made in this data playback procedure. First in step S5001, the data reader 105 in the information player reads data from the recording medium (optical disc) 150 set in the information player. It should be reminded that the recording medium (optical disc) 150 includes a lead-in area and data area and the lead-in area has recorded therein file names and TOC (table of contents) such as directory information of data recorded in the data area. Also, the lead-in area has recorded therein data (generation information) indicating the generation of a master key MK having been used to encrypt the data in the data area. Note that the generation information indicates the generation of a master key MK used for encryption of data to be recorded. So, the generation information will be referred to as "recording generation information" hereunder wherever appropriate.

In step S501, the data reader 105 reads data from the lead-in area and the information player goes to step S502 where the master key decryption unit 103 will check, based on the data read by the data reader 105 and supplied via the encrypted data holder 102, the generation i of the master key MK having been used to encrypt the data in the data area of the recording medium 150. Then, the information player goes to step S503 where the master key decryption unit 103 will create a master key MK_i for the generation i of the master key MK it has examined.

For example, when the generation of the thus-examined master key MK is the latest generation i+1, the master key decryption unit 103 will use the device key DK held in the device key holder 101 to decrypt the encrypted master key C(j, i+1) stored in the encrypted data holder 102, to thereby create a master key MK_i+1.

When the generation of the master key MK having been examined as in the above is a one older than held in the encrypted data holder 102, the master key decryption unit 103 will create a master key MK of that generation from the encrypted master key C stored in the encrypted data holder 102. That is to say, the master key decryption unit 103 decrypts first the master key MK_i+1 as in the above. Further, the master key decryption unit 103 holds a one-way function f and applies the master key MK_i+1 to the one-way function f a number of times corresponding to a difference between the generation of the master key MK_i+1 and examined generation of the master key MK, thereby creating a master key MK of the examined generation.

For example, when the generation number of the master key MK stored in the encrypted data holder 102 is i+1 and that of the master key MK read as in the above is i−1, the master key MK_i−1 is created by the master key decryption unit 103 using the one-way function f twice and calculating f(f(MK_i+1)). When the generation number of the master key MK stored in the encrypted data holder 102 is i+1 and that of the master key MK read as in the above is a generation i−2, the master key MK_i−2 is created by the master key decryption unit 103 using the one-way function f three times and calculating f(f(f(MK_i+1))).

It should be reminded herein that the one-way function may be for example the hash function. More particularly, it may be for example MD5 (message digest 5), SHA-1 (secure hash algorithm-1) or the like. The key issuing institute predetermines master keys MK_1, MK_2, . . . , MK_N from which master keys each of a generation older than the generation of a master key for the device in consideration can be created using the one-way function. That is, first of all, a master key MK-N having a generation number N is set, the one-way function is applied once to the master key MK_N for each generation to be determined, thereby sequentially creating the master keys MK_N−1, MK_N−2, . . . , MK_1 older than the master key MK_N. Then, the master keys thus created are used in sequence starting with the master key MK_1 of the oldest generation. Assume here that the one-way function used for creation of a master key of a generation older than the generation of a master key fro the device in consideration, is set in the master key decryption unit 103 of each of the information players.

Also, the one-way function may be the public key cryptography for example. In this case, the key issuing institute has a private key based on the public key cryptography and gives a public ken for the private key to each of the information players. The key issuing institute sets a master key MK_1 of the first generation and uses the master key MK_1 first. That is, when a master key MK_i of the second generation is required, the key issuing institute creates it for use by converting a master key MK_i−1 of a generation one generation older than the master key MK_i with the private key. This is also applicable to any master keys of the third and subsequent generations. In this case, the key issuing institute has not to create a master key having the generation number N using the one-way function in advance. Theoretically, this method can be used to create master keys of an infinite number of generations.

Note that if the information player has a master key MK of a generation, it can acquire a master key of a generation older than that generation by converting the master key MK with the public key.

As in the above, the master key decryption unit 103 can use a master key C derived from encryption of a master key MK of the latest generation to create a master key MK of a generation older than the generation. So, the encrypted data holder 102 has only to have stored therein the encrypted master key C of the master key MK of the latest generation.

When the master key MK of the generation examined in step S503 is created (decrypted), the data reader 105 reads data from the data area in the recording medium (optical disc) 150 in step S504. Further in step S504, the cryptanalysis unit 104 will use the master key MK acquired in step S503 to cryptanalyze (decrypt) the data read by the data reader 105. When the data thus cryptanalyzed (decrypted) is image data for example, it is outputted to a display device and displayed thereon in step S505.

Since a master key MK from which a master key of a generation older than the generation of the master key for the device in consideration can be created is renewed by encrypting the master key MK with a device key DK held by each device and distributing it to each device, as it the above, it is possible to renew the master key MK and remove a device holding an uncovered device key DK while maintaining the interoperability. Also, since each device having a master key MK of the latest generation can create a designated master key MK using the one-way function f, the device may have a correspondingly reduced memory capacity.

In the information player, the master key MK used for decryption of data is discarded after completion of the decryption. When the master key MK becomes necessary again, a corresponding one can be created by decrypting the encrypted master key C with the device key DK. In the information player, it is possible to prevent the master key MK from being less confidential because it is left unencrypted.

In this embodiment, only an encrypted master key C of a generation which is a one after the master key C is renewal is stored in the encrypted data holder 102. In addition, however, an encrypted master key C of each generation may be stored in the encrypted data holder 102. In this case, since the master key MK of each generation may not be acquired by calculation, so the data processing burden will be reduced correspondingly.

Note that since the master keys MK_1, MK_2, . . . , MK_N from which master keys of generations older than those of them can be created using the one-way function, cannot be used to create master keys of generations younger than those of them as in the above, so no data can be decrypted with a master key MK of a new generation created from a master key of an older generation.

It should be reminded however that renewing of a master key MK permits to protect data encrypted with any master key MK of a generation which is a one after the master key MK is renewed but there is some problem in protection of data encrypted with any master key MK not yet renewed. More particularly, the above-mentioned master key renewing method has a problem that it is applicable to a recorded which records data encrypted with a master key and data encrypted with a master key of a generation older than that of the master key used to encrypt the data, can be played back from a recording medium by an information player having been attacked by an attacker and not given any master key MK of a new generation (that is, a device to be revoked) but which has a master key MK of a generation older than that of the master key used to encrypted the data, as in the above.

Therefore, if a recorder in which data is encrypted with a master key MK of an older generation, that is, a recorder in which the master key MK is not renewed or cannot be renewed, is used for a long time, the data will possibly be decrypted by an inappropriate information player, that is, an information player not given any master key MK of a new generation, sometime in the long time of operation.

[2. System Configuration for Strict Management of Master Key Generation]

(2.1 Recorder/Player Construction)

Figure 6:
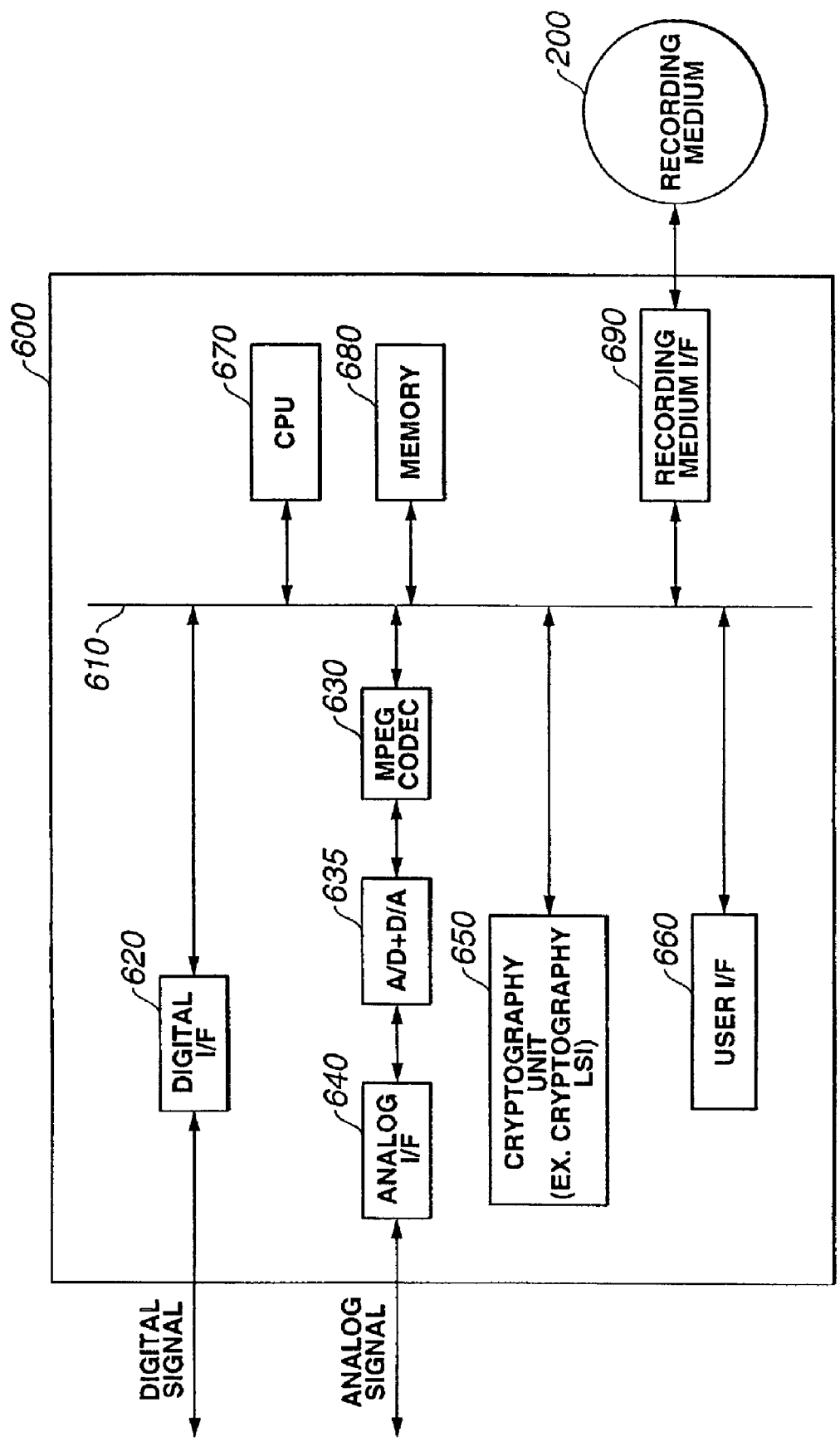
FIG. 6 is a block diagram showing the construction of the information recorder/player (embodiment 1) according to the present invention.

Referring now to FIG. 6, there is illustrated in the form of a block diagram of one embodiment of the information recorder/player constructed to solve the above drawbacks according to the present invention. The information recorder/player is generally indicated with a reference 600 in FIG. 6. The information recorder/player 600 includes a bus 610, digital I/F (interface) 620, MPEG (Moving Pictures Experts Group) code 630, cryptography unit 650 formed from an encryption/decryption LSI (large scale integrated circuit), CPU (central processing unit) 670, memory 680, recording medium I/F 690 and a user I/F 660, all connected to each other.

The digital I/F 620 receives digital signals as a content supplied from outside and outputs them to the bus 610, while receiving digital signals on the bus 610 and outputting them to outside. The MPEG codec 630 makes an MPEG decoding of MPEG-encoded data supplied via the bus 610 and outputs the data to an A/D converter and D/A converter combination 635 also included in the information recorder/player 600, while making an MPEG encoding of digital signals supplied from the A/D converter and D/A converter combination 635 and outputting the data to the bus 610.

The A/D converter and D/A converter combination 635 makes a D/A (digital/analog) conversion of the MPEG-decoded digital signals supplied from the MPEG codec 630 to analog signals and supplies the analog signals to an analog I/F 640 also included in the information recorder/player 600, while making an A/D (analog/digital) conversion of the digital signals supplied from the A/D converter and D/A converter combination 635 to analog signals and outputting the analog signals to the MPEG codec 630. The analog I/F 640 receives analog signals as a content supplied from outside and outputs the analog signals to the A/D converter and D/A converter combination 635 while outputting the analog signals to outside.

The cryptography unit 650 is formed from a one-chip LSI for example. It encrypts or decrypts digital signals as a content supplied via the bus 610 and outputs the data to the bus 610. Note that the cryptography unit 650 is not limited to the one-chip LSI but may be formed from a combination of various kinds of software or hardware. The construction of such a software-formed cryptography unit will further be described later.

The CPU 670 executes a program stored in the memory 680 to control the MPEG codec 630, cryptography unit 650, etc and also makes a variety of processing operations. The memory 680 is for example a nonvolatile memory and stores programs to be executed by the CPU 670 and necessary data for operations of the CPU 670. The recording medium I/F 690 reads (plays back) digital data, for example, from a recording medium 200 such as an optical disc or the like and outputs the data to the bus 610, while supplying digital data supplied from the bus 610 to the recording medium 200 for recording.

The user I/F 660 includes a display unit and input unit (not shown). It provides information to the user, receives an instruction from the user, and outputs it to the bus 610.

(2.2 Cryptography Unit Construction)

Next, the cryptography unit 650 (ex. Encryption/decryption LSI) shown in FIG. 6 will be described in detail with reference to FIG. 7. Note that the components of the cryptography unit 650, corresponding to those of the information recorder/player shown in FIG. 1, are indicated with the same references and will not further be described wherever appropriate.

As shown, the cryptography unit 650 includes an encoder 701. The encoder 701 encrypts a plain content (unencrypted content) supplied via the bus 610 with a master key MK supplied from the master key decryption unit 103 to provide an encrypted data (encrypted content) and outputs the encrypted content to the bus 610. The cryptography unit 650 includes also a decoder 702 which decrypts an encrypted content supplied via the bus 610 with a master key MK fro the master key decryption unit 103 to provide an unencrypted content and outputs the unencrypted content to the bus 610. The cryptography unit 650 includes also a master key renewal unit 703 which controls renewal of a master key MK stored in the encrypted data holder 102.

(2.3 Key Table Format)

Figure 8:
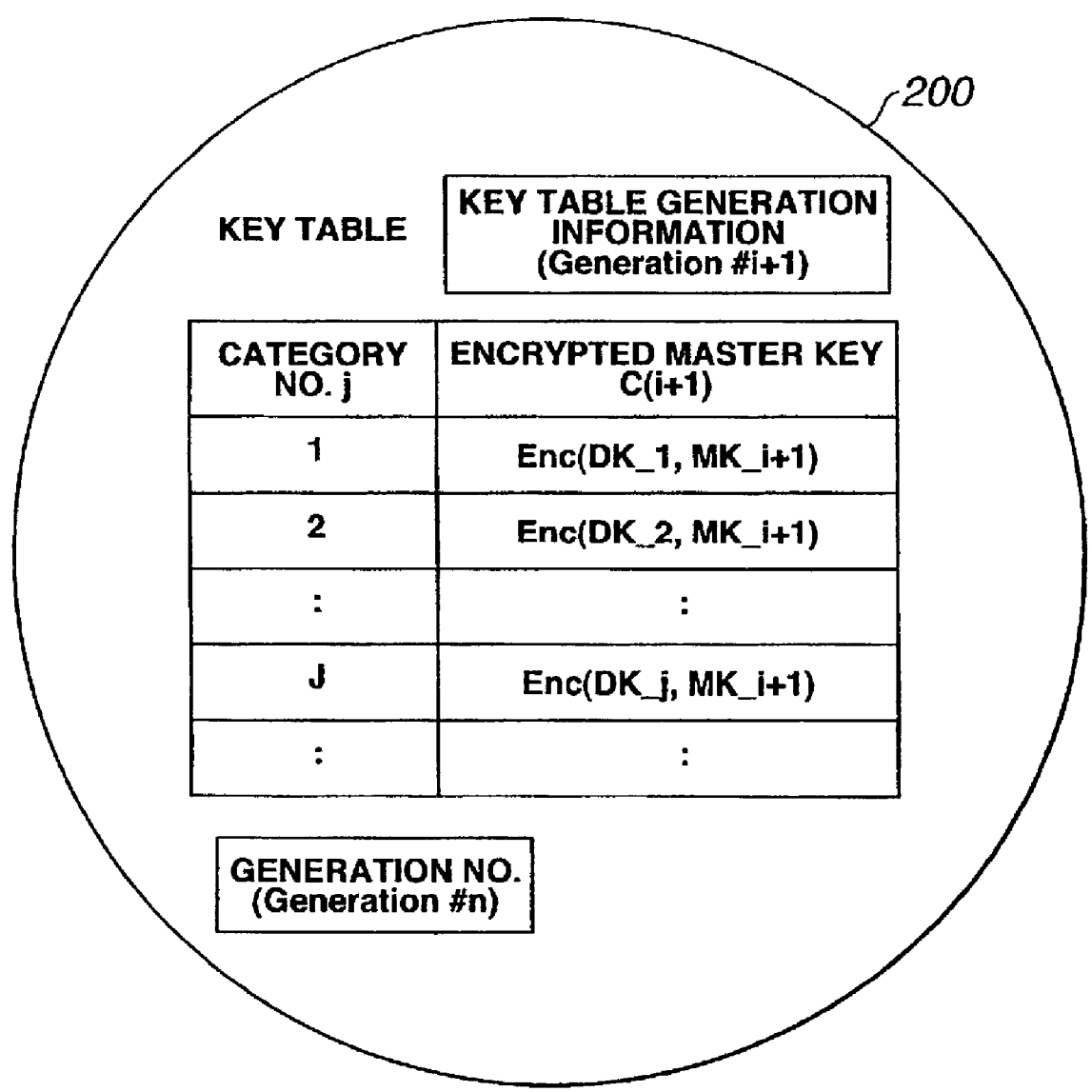
FIG. 8 shows the master key management in the information recorder/player according to the present invention, capable of the strict master key management.

FIG. 8 shows an example format of the recording medium 200 to or from which the recorder/player 600 in FIG. 6 records data or plays back data. FIG. 8 shows the recording medium 200 similar to the recording medium (optical disc) 150 in FIG. 2 and having stored therein a key table based on which a master key $MK\_i$ of a generation i is renewed to a master key $MK\_i+1$ of a generation i+1. The recording medium 200 has recorded therein a table (key table) in which a category number j and encrypted master key C(j, i+1) correlated with each other as in the optical disc 150. The recording medium 200 has further recorded therein generation information (Generation #n) indicative of the oldest generation of a necessary master key MK for recording or playback of data to the recording medium 200. It should be reminded that the generation information Generation #n is prerecorded in a recording medium during production of the latter for example. For differentiation from the above-mentioned recording generation information, the generation information Generation #n will be referred to as "prerecording generation information (prerecording Generation #n) hereunder wherever appropriate.

The smallest generation number of the necessary master key MK for recording and playback of data to the recording medium 200 shown in FIG. 8 is n. The generation number n is granted as a sequential generation number for example. In case the generation number of a master key stored in the memory of the recorder/player 600 is smaller than n, recording of data to the recording medium 200 in FIG. 8, or playback of data from the recording medium shown in FIG. 8, will be rejected.

The recording medium 200 shown in FIG. 8 is a one permitting to acquire a master key $MK\_i+1$ by decryption of an encrypted master key C(i+1) stored in the key table with a device key DK stored in each recorder/player.

Note that all recording medium have not a key table stored therein. In case a recording medium 200 having recorded therein only a generation number (prerecording generation number) is set in the recorder/player 600 for data recording or playback, the recorder/player 600 will make a comparison between the generation number (prerecording generation number) and generation number of a master key stored in the recorder/player. If the generation number of the master key stored in the memory of the recorder/player 600 is smaller than the generation number (prerecording generation number) n of the recording medium 200, no data can be recorded to the recording medium 200 shown in FIG. 8 or played back from the recording medium 200.

The smallest generation number of the necessary master key MK for data recording or playback to or from the recording medium 200 in FIG. 8 is n. A recorder/player 600, in which the generation number of the master key stored in its own memory is as large as or larger than n, will be able to record data to the recording medium 200. However, if the generation number of the master key stored in the memory of the recorder/player 600 is smaller than n, no data recording to the recording medium 200 will be permitted. Data recorded to the recording medium 200 by an inappropriate recorder with a master key of an older generation will not be played back by any appropriate player. Also, since data to be legally recorded to the recording medium 200 is encrypted, for recording, with a master key having a generation number as large as or larger than n without fail, the recorder/player 600 will not be able to decrypt (play back) the data from the recording medium if the generation number of the master key stored in its own memory is smaller than n.

Note that the key table and prerecording generation information Generation #n are recorded in an area of the recording medium 200, for example, the lead-in area (unrewritable area), where they cannot be rewritten, whereby the key table and prerecording generation information Generation #n can be prevented from illegally being rewritten.

The device is designed so that recording of data to the recording medium 200 shown in FIG. 8 cannot be effected (is not permitted) without a master key MK of a generation later than a generation indicated by the prerecording generation information in the recording medium 200. Therefore, with distribution of the recording medium 200 having a prerecording generation information Generation #n indicating a certain generation n, renewal of a master key MK is promoted in a recorder which records data to the recording medium 200 or in the recorder/player shown in FIG. 6 and which can record or play back the prerecording generation information, whereby recorders and recorder/players in which there is used a master key of an older generation will be reduced in number with the result that unauthorized decryption of data is prevented.

That is to say, a recorder having the master key thereof not renewed can record data to the recording medium (optical disc) 150 having been described with FIG. 4 for example and in which the prerecording generation information is not recorded, as in the above. Thus, an information player having the master key thereof not renewed can play back data from the optical disc 150 in which data has been thus recorded, while no data recording is permitted to the recording medium 200 having the prerecording generation information recorded therein as having been described in the above with reference to FIG. 8 unless there is available to that information player any master key MK of a generation younger than a generation indicated by the prerecording generation information. Namely, since a master key MK of a generation younger than the generation indicated by the prerecording generation information recorded in the recording medium 200 is required for data recording to the recording medium 200, it is possible to prevent data from being recorded to a recorder having the master key thereof not renewed.

Note that in this embodiment, it is assumed that the generation of a master key in the key table recorded in the recording medium 200 is recorded as prerecording generation information Generation #n. However, the generation number of a master key in the key table recorded in the recording medium 200 should not always be coincident with a generation number n indicated by the prerecording generation information Generation #n.

(2.4 Renewal of Master Key)

Next, various processing operations of the recorder/player shown in FIG. 6 will be described with reference to FIGS. 9 to 12. First, there will be described with reference to the flow chart in FIG. 9 renewal of a maser key, which will be effected when the recording medium 200 is set in the recorder/player for recording or playback of data to the recording medium 200.

Figure 7:
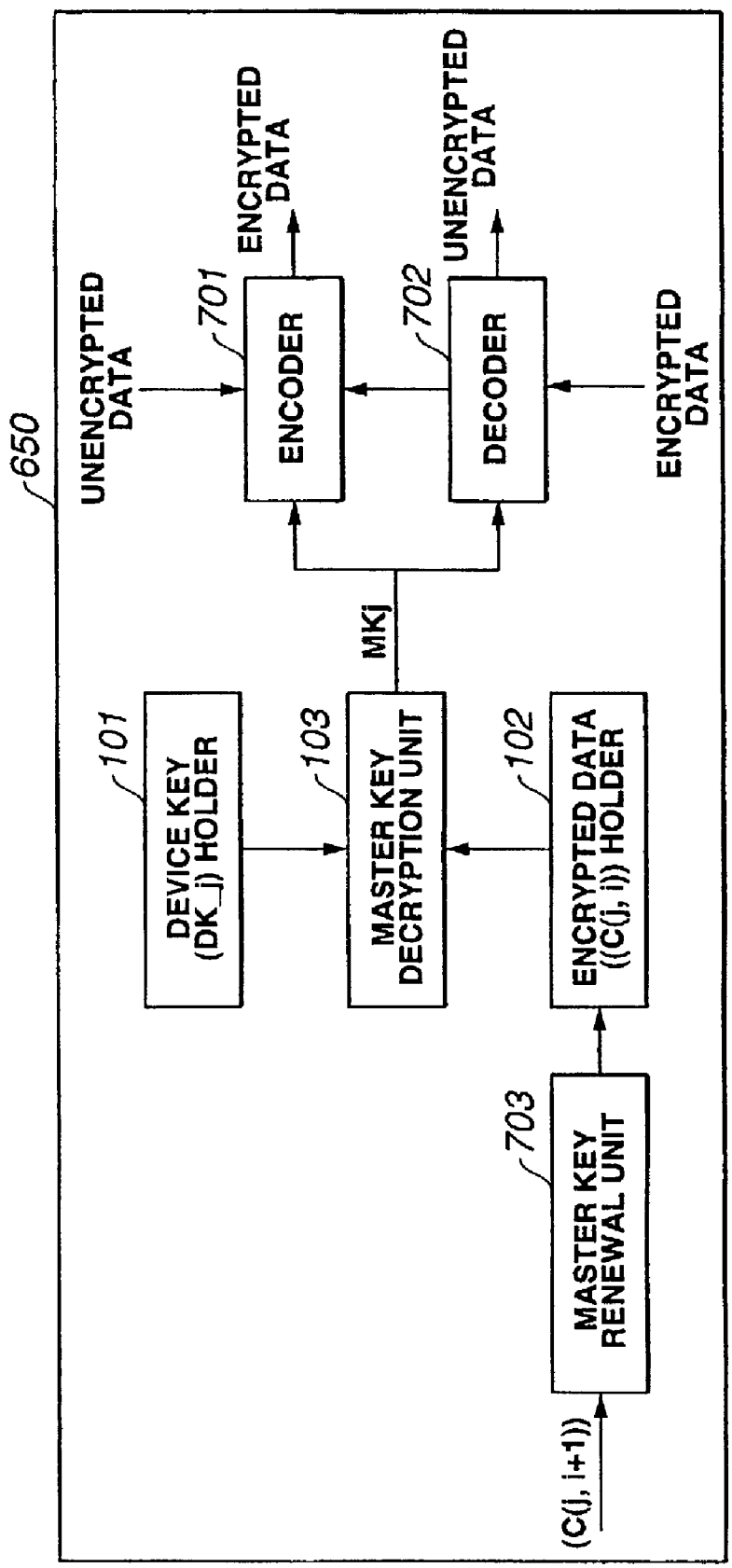
FIG. 7 is a block diagram showing the construction of the cryptography unit capable of a strict master key generation management in the information recorder/player according to the present invention.

After the recording medium 200 is set in the recorder/player, first in step S901, the recording medium I/F 690 (in FIG. 6) will read key table generation information Generation #i+1 from the recording medium 200 and supplies it to the master key renewal unit 703 of the cryptography unit 650 (in FIG. 7). The master key renewal unit 703 reads an encrypted master key C stored in the encrypted data holder 102, and makes a comparison between the generation number of the encrypted master key and the generation number i+1 indicated by the key table generation information generation #i+1 to judge which one of the generations is younger or older than the other, in step S902.

If it is judged in step S902 that the generation number i+1 indicated by the key table generation information Generation #i+1 is not larger than the generation number of the encrypted master key C stored in the encrypted data holder 102, namely, if the generation number of the encrypted master key C stored in the encrypted data holder 102 is as large as or larger than the generation number i+1 indicated by the key table generation information Generation #i+1, the recorder/player will skip over steps S903 to S905 and exit the master key renewing procedure.

That is, in this case, since the master key MK (encrypted master key C) stored in the encrypted data holder 102 has not to be renewed, so the renewal will not be effected.

On the other hand, if the generation number i+1 indicated by the generation information Generation #i+1 in the key table is judged in step S902 to be larger than the generation number of the encrypted master key C stored in the encrypted data holder 102, namely, if the generation number of the master key C stored in the encrypted data holder 102 is smaller than the generation number i+1 indicated by the key table generation information Generation #i+1, the recorder/player goes to step S903 where the recording medium I/F 690 will read a key table from the recording medium 200 (in FIG. 8) and supply it to the master key renewal unit 703 of the cryptography unit 650 (in FIG. 7).

In step S904, the master key renewal unit 703 judges whether an encrypted master key C assigned to a device number i of the device exists in the key table. If the judgment result is that the encrypted master key C is not in the key table, the recorder/player skips over step S905 and exits the master key renewing procedure.

That is to say, in case it is already known that the recorder/player has been attacked by an attacker and the device key DK_j thereof has been known to the attacker as having previously been described with reference to FIG. 2, the field for an encrypted master key C(j, i+1) corresponding to the category number j in the key table is blanked, so that the master key MK will not be renewed (cannot be renewed).

On the other hand, if the result of the judgment made in step S904 is that there exists in the key table the encrypted master key C assigned to the device number j of the recorder/player itself, the recorder/player goes to step S905 where the master key renewal unit 703 will supply the encrypted master key C to the encrypted data holder 102 where the encrypted master key is replaced with an encrypted master key stored in the holder 102 and stored there, and exit the master key renewing procedure.

(2.5 Content Recording)

Next, operations made by the recording/player for recoding data to the recording medium 200 will be described with reference to the flow chart in FIG. 10.

First in step S1001, the recording medium I/F 690 reads the prerecording generation information Generation #n from the recording medium 200 and supplies it to the CPU 670. The CPU 670 will recognize the generation of the encrypted master key C stored in the encrypted data holder 102 of the cryptography unit 650 (in FIG. 7), and make a comparison between the generation number of the encrypted master key and generation number n indicated by the prerecording generation information Generation #n and judges which one of the generations is younger or older than the other in step S1002.

If the generation number of the encrypted master key C stored in the encrypted data holder 102 is judged in step S1002 not to be larger than the generation number n indicated by the prerecording generation information Generation #n, that is, if the generation number of the encrypted master key C stored in the encrypted data holder 102 is smaller than the generation number n indicated by the prerecording generation information Generation #n, the recorder/player goes to step S1005.

On the other hand, if the result of the judgment effected in step S1002 is that the generation number of the encrypted master key C stored in the encrypted data holder 102 is larger than the generation number n indicated by the prerecording generation information Generation#n, namely, if the generation number of the encrypted master key C stored in the encrypted data holder 102 is as large as or larger than the generation number n of the prerecording generation information Generation #n, the recorder/player goes to step S1003 where the CPU 670 will control the recording medium I/F 690 to record the generation information indicating the generation of the encrypted master key C stored in the encrypted data holder 102 as recording generation information into the recording medium 200 (in FIG. 8).

Then, in step S1004, a content to be recorded to the recording medium 200, supplied to the recorder/player, is encrypted by the cryptography unit 650 and supplied to the recording medium 200 via the bus 610.

More particularly, supplied with digital signals as a content to be recorded to the recording medium 200, the digital I/F 620 supplies them to the encoder 701 of the cryptography unit 650 (in FIG. 7) via the bus 610. Also, supplied with analog signals as a content to be recorded to the recording medium 200, the analog I/F 640 supplies them to the MPEG codec 630 via the converter 635. The MPEG codec 630 will make an MPEG encoding of the digital signals supplied from the converter 635 and supply the data to the encoder 701 of the cryptography unit 650 via the bus 610.

In the cryptography unit 650, the master key decryption unit 103 decrypts the encrypted master key C stored in the encrypted data holder 102 with the device key DK stored in the device key holder 101 to a master key MK, and supplies the master key MK to the encoder 701 which in turn will use the master key MK from the master key decryption unit 103 to encrypt unencrypted digital signals (content) supplied thereto and will supply the content thus encrypted to the recording medium I/F 690 via the bus 610.

Further in step S1004, the recording medium I/F 690 supplies the encrypted content from the cryptography unit 650 to the recording medium 200 for recording, and exits the content recording procedure.

Figure 11:
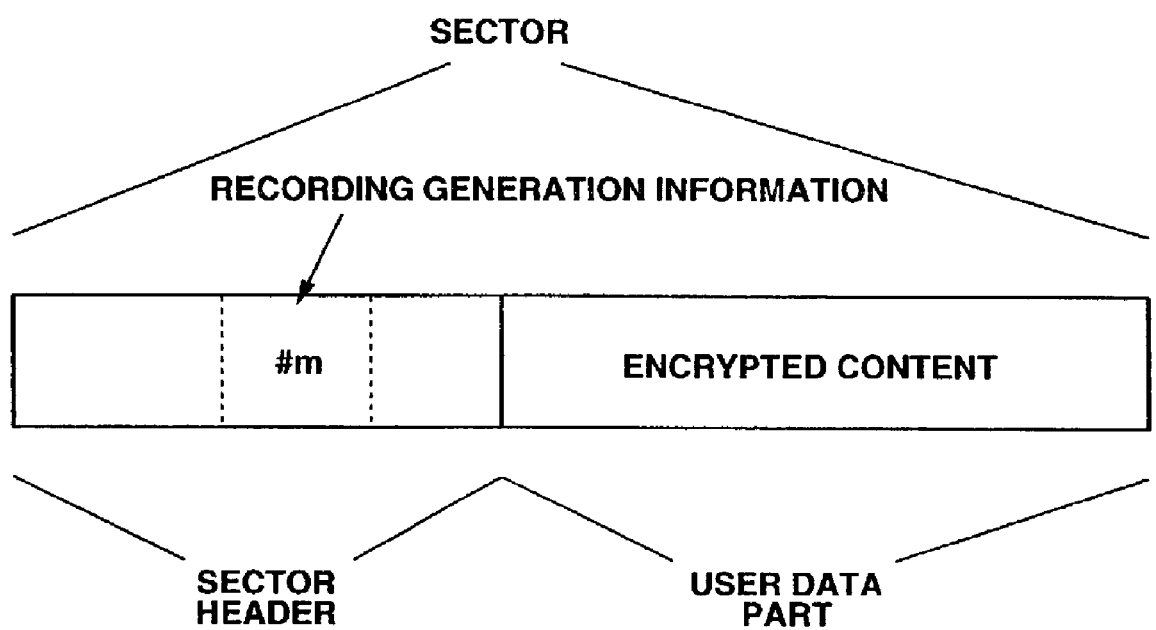
FIG. 11 shows the storage of master key generation information in the information recorder/player according to the present invention, capable of the strict master key management.

Note that in case the recording medium 200 is a disc-shaped one such as an optical disc for example, the recording generation information is recorded to a sector header of a sector or the like for example as shown in FIG. 11. That is, a sector is composed of a sector header and a user data part, and recording generation information is recorded to the sector header of the sector while the content having been encrypted with a master key MK of a generation indicated by the recording generation information is recorded to the user data part of the sector. Such a method for recording generation information is disclosed in detail in the Japanese Patent Application No. 352975 of 1998 of the Application of the present invention.

Also, for recording as a file to the recording medium 200, an encrypted content can be recorded to the recording medium 200 in such a manner that recording generation information can be managed in correlation with the file.

In the above, a master key of a generation stored in the encrypted data holder 102 is used to encrypt a content for recording. Alternatively, however, a master key of a generation indicated by prerecording generation information recorded in the recording medium 200, created from a master key of a generation recorder in the encrypted data holder 102, for example, may be used to encrypt a content for recording. In this case, since the generation of the master key used for encryption of a content to be recorded to the recording medium 200 always coincides with that indicated by the prerecording generation information recorded in the recording medium 200, so it is not necessary to record the recording generation information to the recording medium 200.

On the other hand, in case the recorder/player has gone to step S1005, no data recording to the recording medium 200 is permitted (can be done) if the generation number of the encrypted maser key C stored in the encrypted data holder 102 is smaller than the generation number n indicated by the prerecording generation information Generation #n.

Thus, in step S1005, the content recording procedure is ended with displaying a message for prompting to renew the master key to a one of a younger generation, or giving a warning sound or warning indication, to the user via the user I/F 660.

When the prompting message or the warning sound or indication are given, the user will follow the message to carry his device to a service station of the device manufacturer in order to have the master key renewed or follow a method included in the following description of the embodiment to renew the master key. Thus, data will be recordable to the recording medium 200.

(2.6 Content Playback)

Next, operations of the recorder/player for playback of data from the recording medium 200 will be described with reference to the flow chart of FIG. 12.

First in step S1201, the recording medium I/F 690 reads the prerecording generation information Generation #n from the recording medium 200 and supplies it to the CPU 670. Then, the recording medium I/F690 goes to step S1202 where it will read, from the recording medium 200, generation information (recording generation information) of the master key MK having been used to encrypt a content (data) to be played back, and supply the information to the CPU 670.

In step S1203, the CPU 670 makes a comparison between the generation number n indicated by the prerecording generation information Generation #n from the recording medium I/F 690 and generation number m indicated by the recording generation information to judge which one of the generations is younger or older than the other.

If the generation number m indicated by the recording generation information is judged in step S1203 not to be larger than the generation number n indicated by the prerecording generation information Generation #n, namely, if the generation number m indicated by the recording generation information is smaller than the generation number n indicated by the prerecording generation information Generation #n, the recorder/player will skip over steps S1204 to S1206, and exit the content playback procedure.

Therefore, in case a content recorded in the recording medium 200 has been encrypted with a master key MK of a generation older than the generation n indicated by the prerecording generation information Generation #n, it will not be played back (playback is not permitted).

Namely, since the above case means that the content is data having been encrypted with a master key of an old generation and recorded to the recording medium 200 by an inappropriate recorder of which inappropriateness has been discovered and which has not any master key of the latest generation given thereto, the recording medium 200 having data recorded thereto by such an inappropriate device will not be played, whereby it is possible to revoke any inappropriate device.

On the other hand, if the result of the judgment made in step S1203 is that the generation number m indicated by the recording generation information is larger than the generation number n indicated by the prerecording generation information Generation #n, namely, if the generation number m indicated by the recording generation information is as large as or larger than the generation number n indicated by the prerecording generation information Generation #n and thus the content recorded in the recording medium 200 has been encrypted with a master key MK having a generation number larger than the generation number n indicated by the prerecording generation information Generation #n, the recorder/player goes to step S1204 where the CPU 670 will recognize the generation of an encrypted master key C stored in the encrypted data holder 102 of the cryptography unit 650 (in FIG. 7) and make a comparison between the generation number of the encrypted master key C and generation number m indicated by the recording generation information to judge which one of the generations is younger or older than the other.

If the generation number of the encrypted master key C stored in the encrypted data holder 102 is judged in step S 1204 not to be larger than the generation number m indicated by the recording generation information, that is, if the generation number of the encrypted master key C stored in the encrypted data holder 102 is smaller than the generation number m indicated by the recording generation information, the recorder/player will got to step S1207.

On the other hand, if the result of the judgment made in step S1204 is that generation number of the encrypted master key C stored in the encrypted data holder 102 is larger than the generation number m indicated by the recording generation information, that is, if the generation number of the encrypted master key C stored in the encrypted data holder 102 is as large as or larger than the generation number m indicated by the recording generation information, the recorder/player goes to step S1205 where the master key decryption unit 103 of the cryptography unit 650 (in FIG. 7) will decrypt the encrypted master key C stored in the encrypted data holder 102 with a device key DK stored in the device key holder 101 to a master key MK. Further, if the generation number of the master key MK thus decrypted is larger than the generation number m indicated by the recording generation information, the master key decryption unit 103 will create, from the master key MK thus decrypted, a master key MK having the generation number m indicated by the recording generation information from the maser key MK, and supply it to the decoder 702.

Then, the recorder/player goes to step S1206 where the recording medium I/F 690 will read an encrypted content from the recording medium 200, and supply the data to the cryptography unit 650 via the bus 610. Further in step S1206, the decoder 702 of the cryptography unit 650 decrypts the encrypted content read from the recording medium 200 with the master key MK having been acquired in step S1205, and exits the content playback procedure.

The content decrypted as in the above is outputted to outside via the bus 610 and digital I/F 620. Alternatively, the content is subjected to MPEG decoding in the MPEG codec 630 and then to D/A conversion in the converter 635 to analog signals. The analog signals are outputted to outside vide the analog I/F 640.

On the other hand, in step S1207, data playback from the recording medium 200 is not permitted because the generation number of the encrypted master key C stored in the encrypted data holder 102 is smaller than the generation number m indicated by the recording generation information. That is, if the generation number of the encrypted master key C is smaller than the generation number m indicated by the recording generation information, a master key MK having a generation number m larger than the generation number of the master key MK acquired from the encrypted master key C cannot be created from the latter master key MK, so that no data playback will be done (cannot be done) from the recording medium 200.

Thus, in step S1207, the data playback procedure is ended with displaying a message for prompting to renew the master key to a master key of a younger generation, or giving a warning sound or indication, to the user via the user I/F 660.

Thus, the user will follow the message to carry his device to a service station of the device manufacturer in order to have the master key renewed or follow a method included in the following description of the embodiment to renew the master key. Thus, it will be possible to play back data from the recording medium 200.

Since no playback can be done in case the generation indicated by the recording generation information is not younger that indicated by the prerecording generation information, it is possible to compel the user to renew the master key, whereby it is made possible to indirectly prevent a recording medium having data recorded illegally by any inappropriate device from being distributed.

Also, if a device cannot record or play back data to or from a recording medium because it has no master key of the latest generation stored therein, a message for prompting to renew the master key may be displayed to the user, thereby further promoting the procedure for renewing the master key in the entire system.

[3. Other Embodiments]

(3.1 System Configuration for Renewal of Master Key by IC Card)

Another embodiment of the recorder/player according to the present invention will be described concerning an example construction thereof with reference to FIG. 13.

Figure 13:
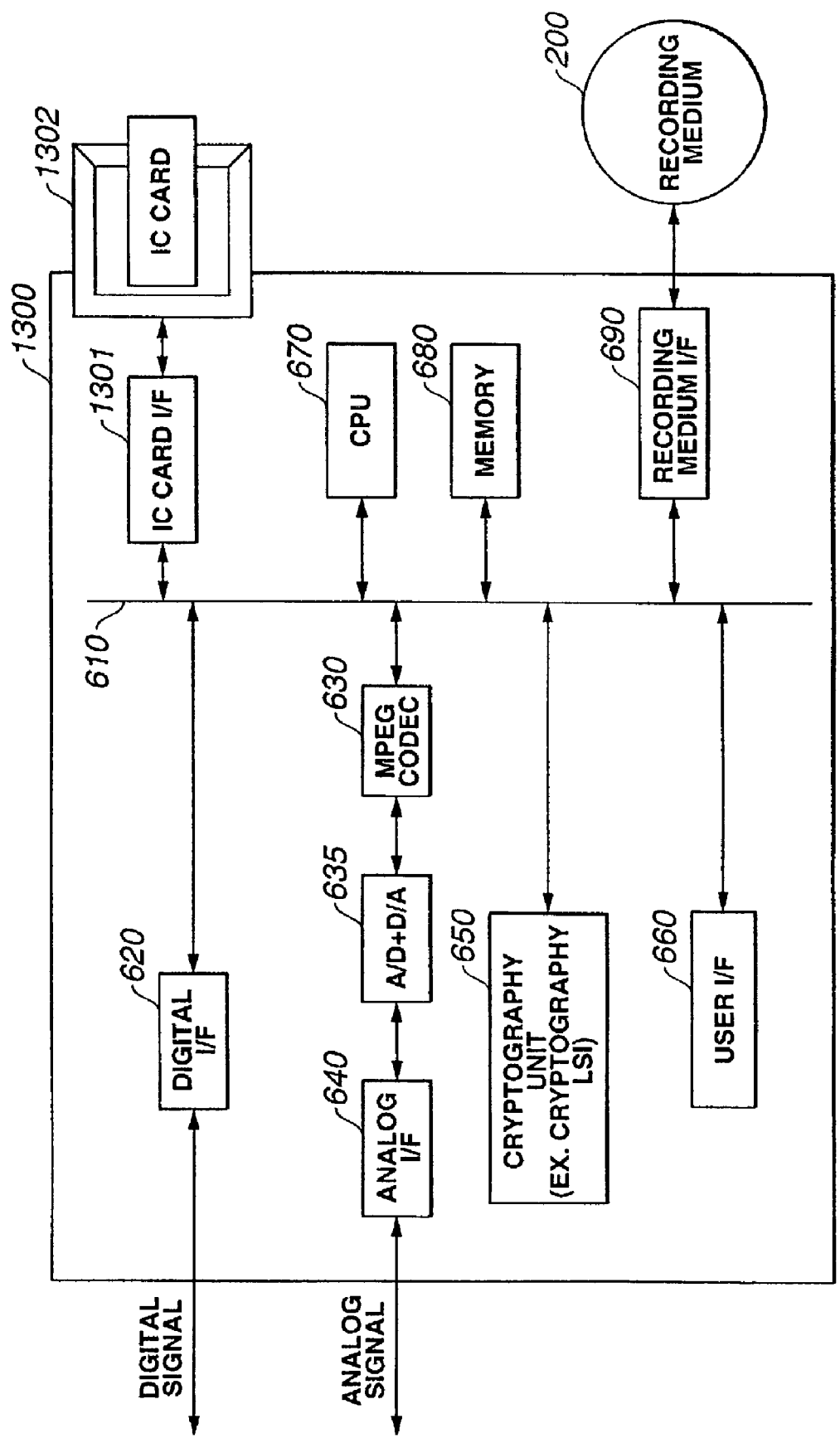
FIG. 13 is a block diagram showing the construction of the information recorder/player (embodiment 2) according to the present invention.

In FIG. 13, the recorder/player is generally indicated with a reference 1300. Most of the components of the recorder/player 1300 shown in FIG. 13 are similar to those shown in FIG. 6, and will not further be described. As shown in FIG. 13, an IC (integrated circuit) card I/F 1302 is connected to the bus 610. The IC card I/F 1301 is an interface intended to transfer data to and from an IC card 1302 which is removably settable in the recorder/player 1300.

Figure 9:
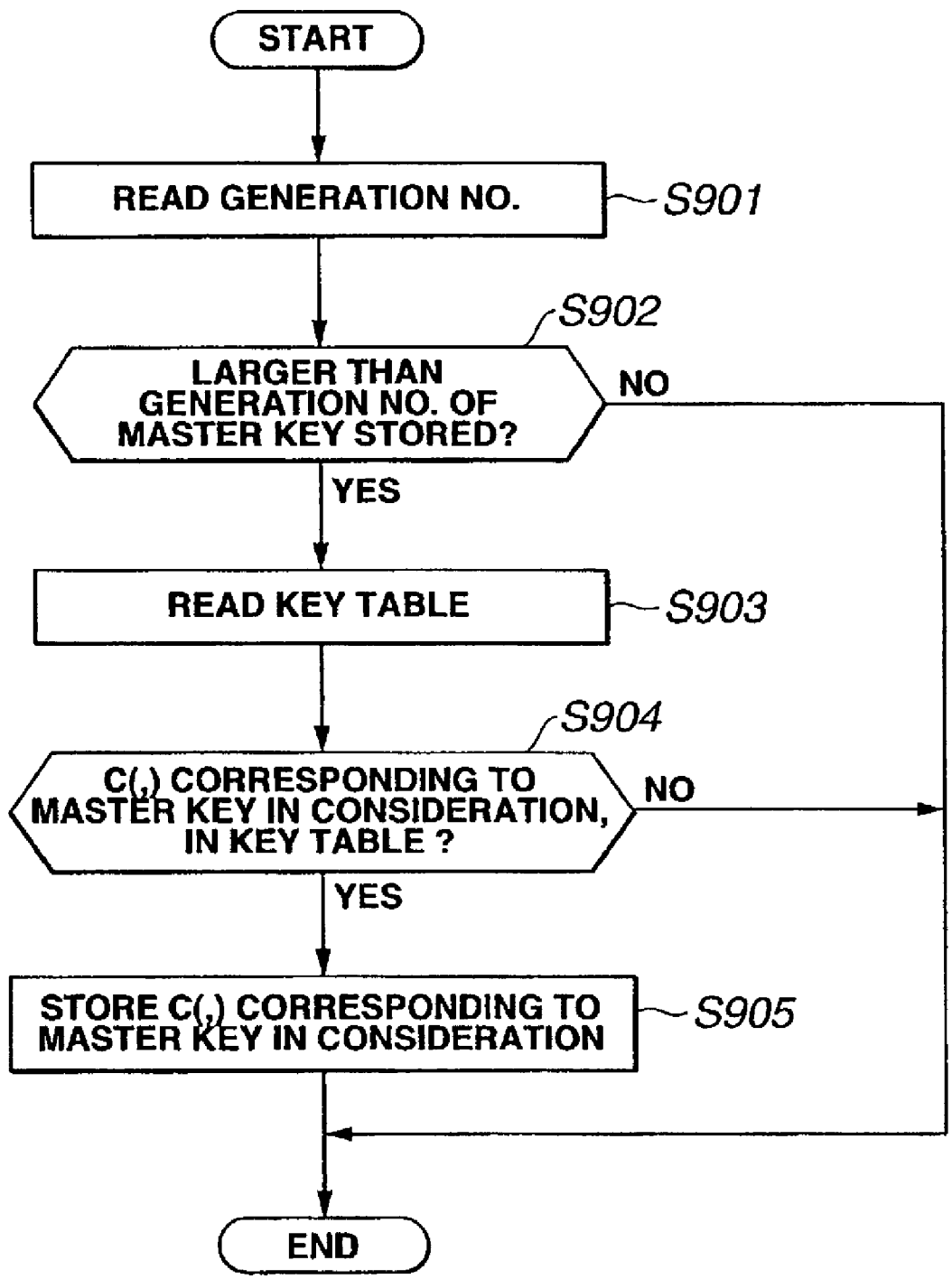
FIG. 9 shows a flow of operations effected in content recording in the information recorder/player according to the present invention, capable of the strict master key management.

The procedure for renewing a master key when the recording medium 200 is set in the recorder/player 1300 is similar to that having been described and illustrated in FIG. 9.

Next, operations of the recorder/player 1300 in recording data to the recording medium 200 will be described with reference to the flow chart in FIG. 14.

Figure 10:
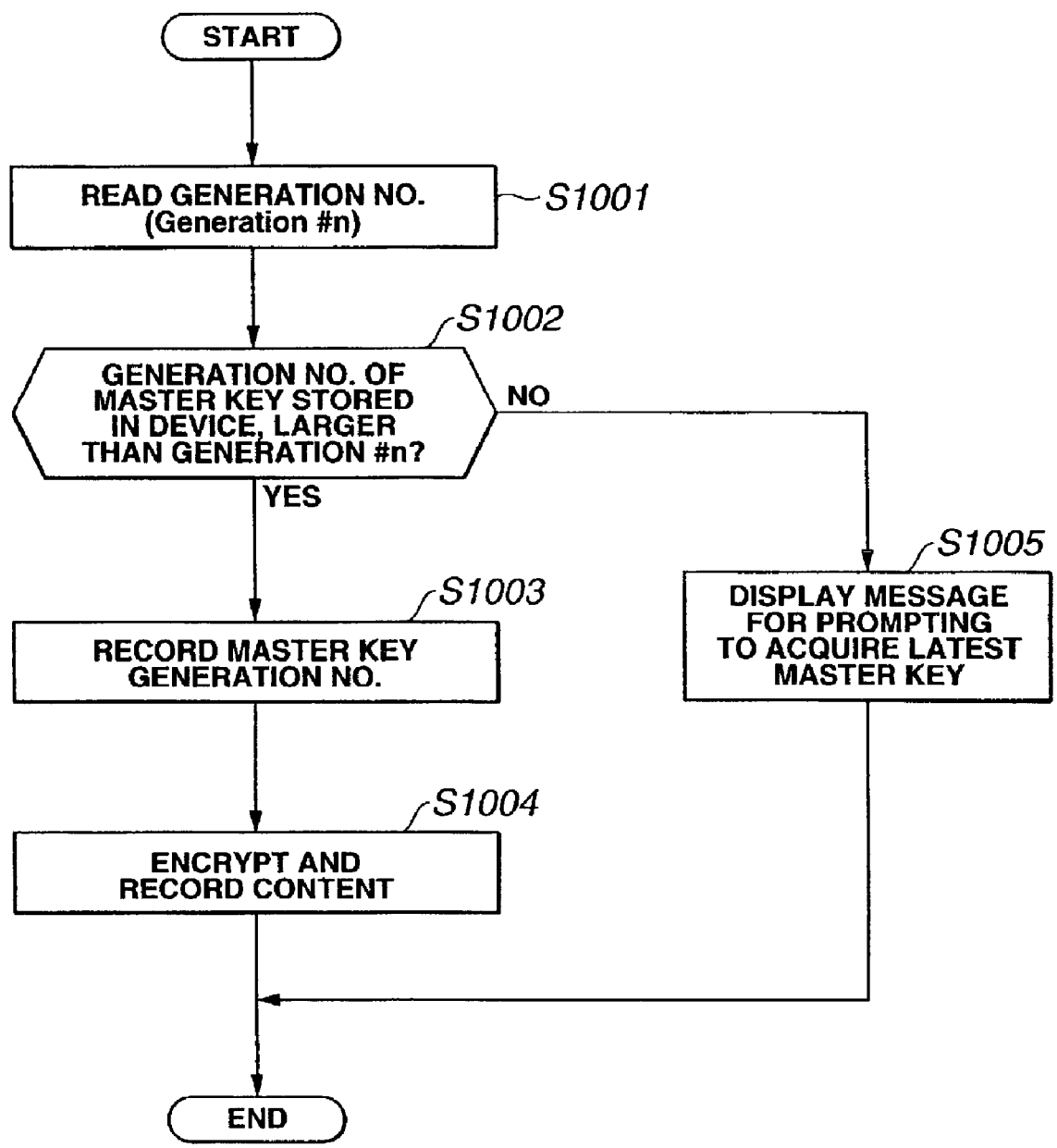
FIG. 10 shows a flow of operations effected in master key renewal in the information recorder/player according to the present invention, capable of the strict master key management.
Figure 14:
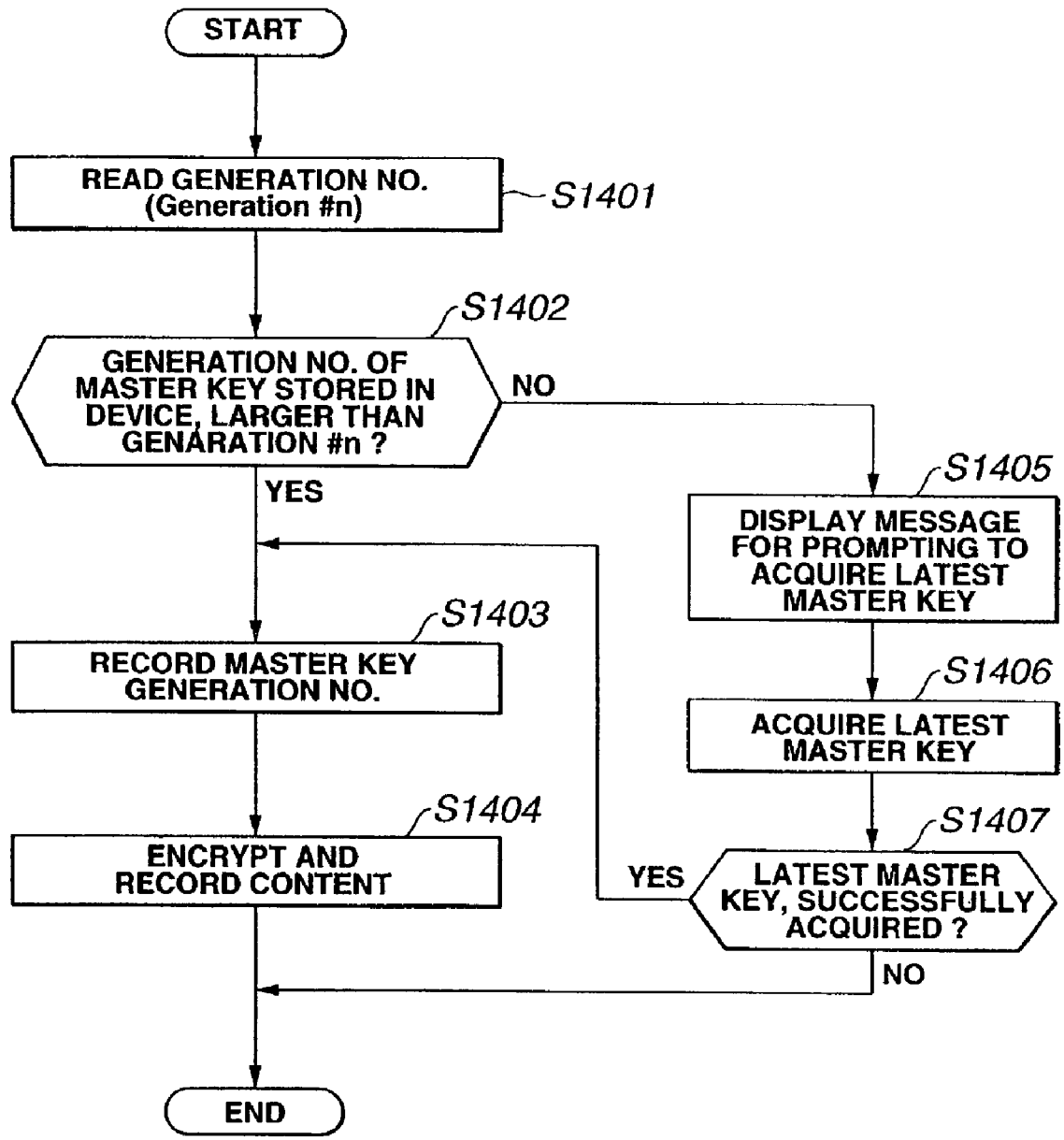
FIG. 14 shows a flow of operations effected in content recording in the information recorder/player (embodiment 2) according to the present invention, capable of the strict master key management.

Operations in steps S1401 to S1405 shown in FIG. 14 are similar to those in steps S1001 to S1005 in FIG. 10, and so will not be described any longer. In step S1405, however, a message for prompting to renew the master key is displayed to the user and the recorder/player will go to step S1406. That is, a message for prompting to renew the master key to a one of a younger generation is displayed to the user via the user I/F 660 or a warning sound or indication is given to the user, and the recorder/player 1300 will got to step S1406.

In step S1406, the IC card 1302 is set by the user and then the master key is renewed using the IC card 1302. That is, the IC card 1302 has recorded therein a similar key table to that recorded in the recording medium 200, having previously been described with reference to FIG. 8, and the recorder/player 1300 can effect the aforementioned method to process the key table, thereby to acquire an encrypted master key of the latest generation.

In the above embodiment, the IC card 1302 has recorded therein the similar key table to that recorded in the recording medium 200, having previously been described with reference to FIG. 8. However, the IC card 1302 may be used as in the following.

Namely, the memory 680 of the recorder/player 1300 has stored therein identification information (device ID) for identification of each recorder/player and device key corresponding to each device ID, and the IC card 1302 has stored therein an encrypted master key derived from encryption of a master key of the latest generation with a device key corresponding device ID. By handling the encrypted master key similarly to the key table stored in the recording medium 200, the recorder/player 1300 can acquire an encrypted master key of the latest generation.

Since the IC card having data for each user stored therein can easily be mailed to the user by the key issuing institute, use of the IC card as in the above is advantageous in that the key can be elaborately managed and thus the recording capacity of the recording medium will not be wasted by storage of the key table.

Next in step S1407, it is checked whether an encrypted master key of a necessary generation has been acquired via the IC card 1302 in step S1406.

If an encrypted master key of the necessary generation has been acquired in step S1406, the recorder/player 1300 goes to step S1403 where it will finally record data to the recording medium 200.

If the encrypted master key of the necessary generation has not been acquired in step S1406, the recorder/player 1300 will exit the data recording procedure without recording data to the recording medium 200. Note that at this time, a message informing that the encrypted master key of the necessary generation has not been acquired may be displayed to the user.

Next, operations of the recorder/player 1300 in playback of data recorded in the recording medium 200 will be described with reference to the flow chart in FIG. 15.

Figure 12:
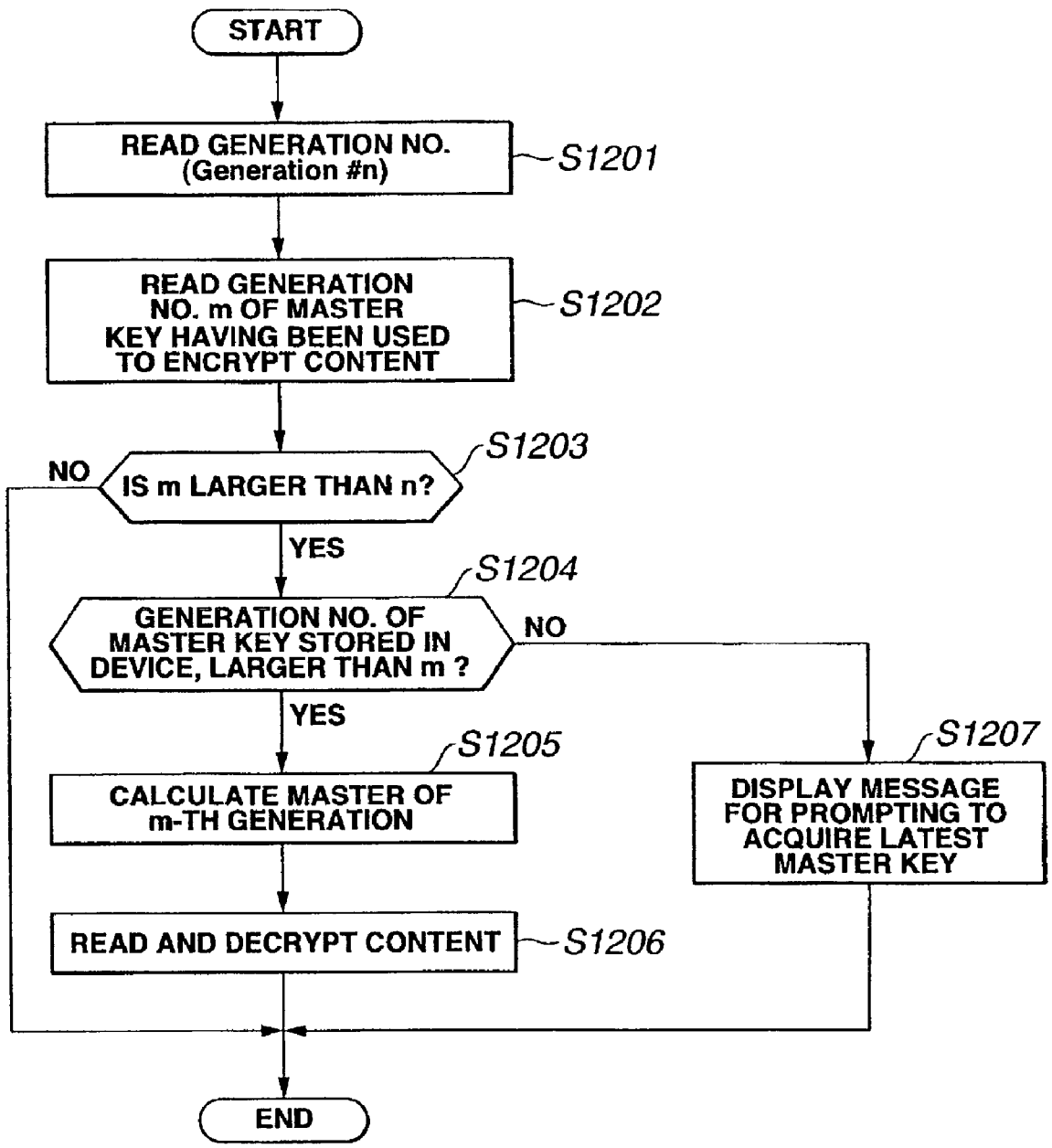
FIG. 12 shows a flow of operations effected in content playback in the information recorder/player according to the present invention, capable of the strict master key management.
Figure 15:
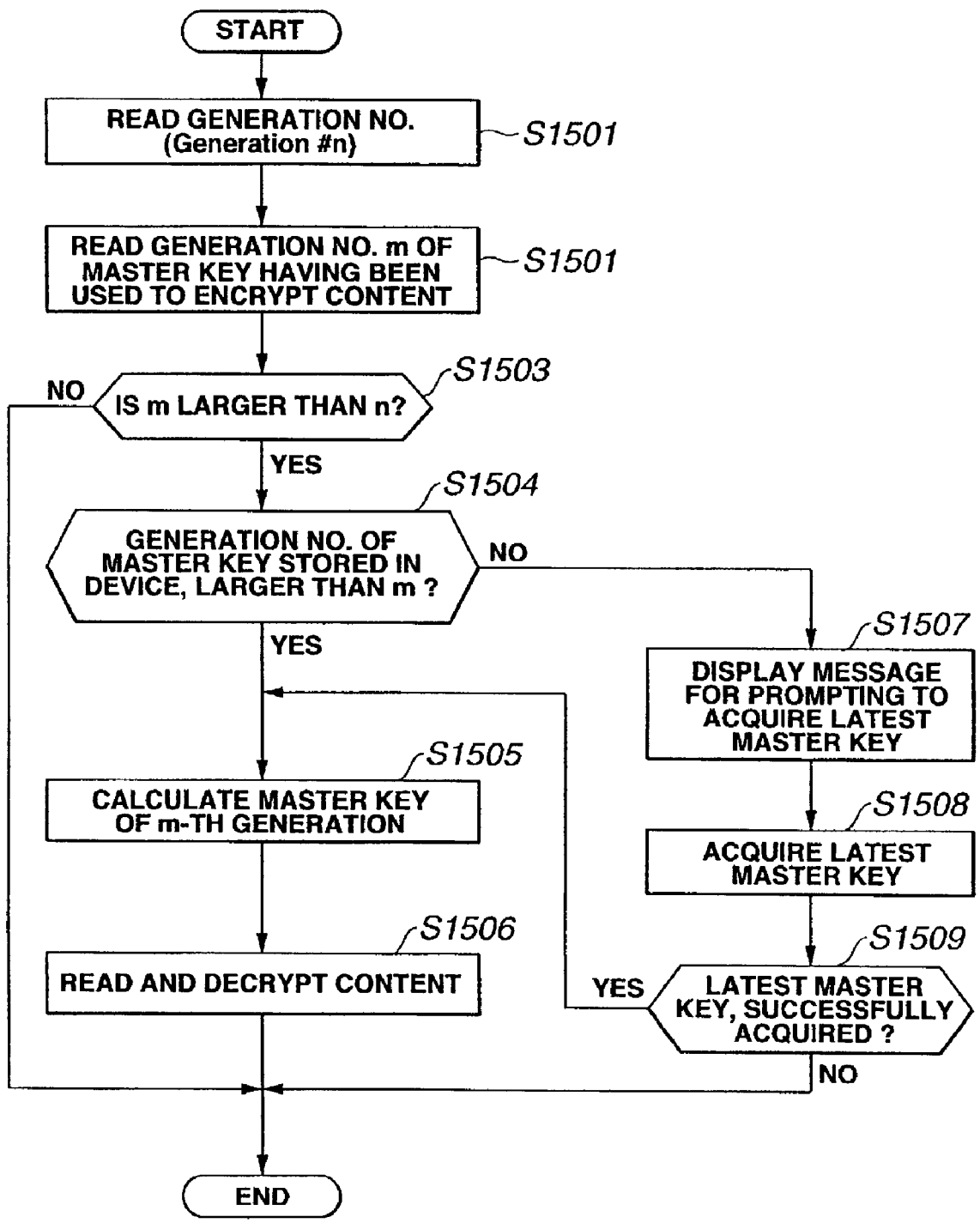
FIG. 15 shows a flow of operations effected in content playback in the information recorder/player (embodiment 2) according to the present invention, capable of the strict master key management.

Operations in steps S1501 to S1507 shown in FIG. 15 are similar to those in steps S1201 to S1207 in FIG. 12, and so will not be described any longer. In step S1507, however, a message for prompting to renew the master key is displayed to the user and the recorder/player 1300 will go to step S1508. That is, a message for prompting to renew the master key to a one of a younger generation is displayed to the user via the user I/F 660 or a warning sound or indication is given to the user, and the recorder/player will got to step S1508.

In step S1508, an encrypted master key of a necessary generation is acquired from the IC card 1302 as in step S1406 in FIG. 14. Then the recorder/player 1300 will go to step S1509.

In step S1509, it is checked whether an encrypted master key of a necessary generation has been acquired in step S1508.

If the encrypted master key of the necessary generation has been acquired in step S1508, the recorder/player 1300 goes to step S1505 where it will finally play back data from the recording medium 200.

If the encrypted master key of the necessary generation has not been acquired in step S1508, the recorder/player 1300 exits the data playback procedure without playing back data from the recording medium 200. Note that at this time, a message informing that the encrypted master key of the necessary generation has not been acquired may be displayed to the user.

(3.2 System Configuration for Renewal of Master Key via Modem)

Next, another embodiment of the recorder/player according to the present invention will be described concerning an example construction thereof with reference to FIG. 16.

Figure 16:
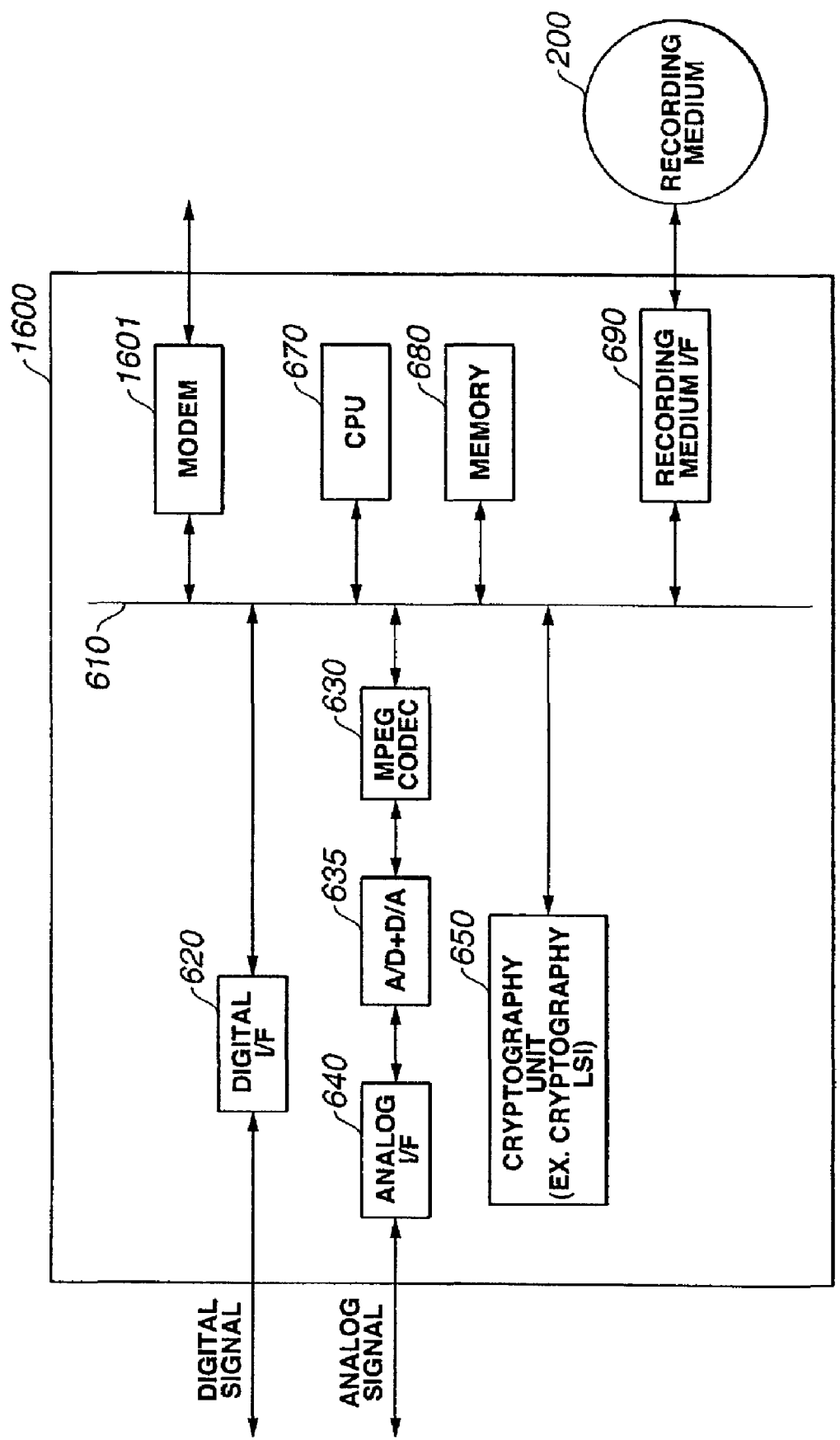
FIG. 16 is a block diagram showing the construction of the information recorder/player (embodiment 3) according to the present invention.

In FIG. 16, the recorder/player is generally indicated with a reference 1600. As shown in FIG. 16, most of the components of the recorder/player 1600 are similar to those shown in FIG. 6 and will not be described any longer. However, the memory 680 has stored therein identification information unique to a recorder/player (device ID), an encryption key of a common key cryptography system or a private key of a public key cryptography system, unique to each device, a public key certificate, etc.

As shown in FIG. 16, the bus 610 has connected thereto a modem 1610 which is connected to a telephone line.

Next, operations of the recorder/player 1600 constructed as shown in FIG. 16 in data recording to the recording medium 200 will be described with reference to FIG. 17.

Figure 17:
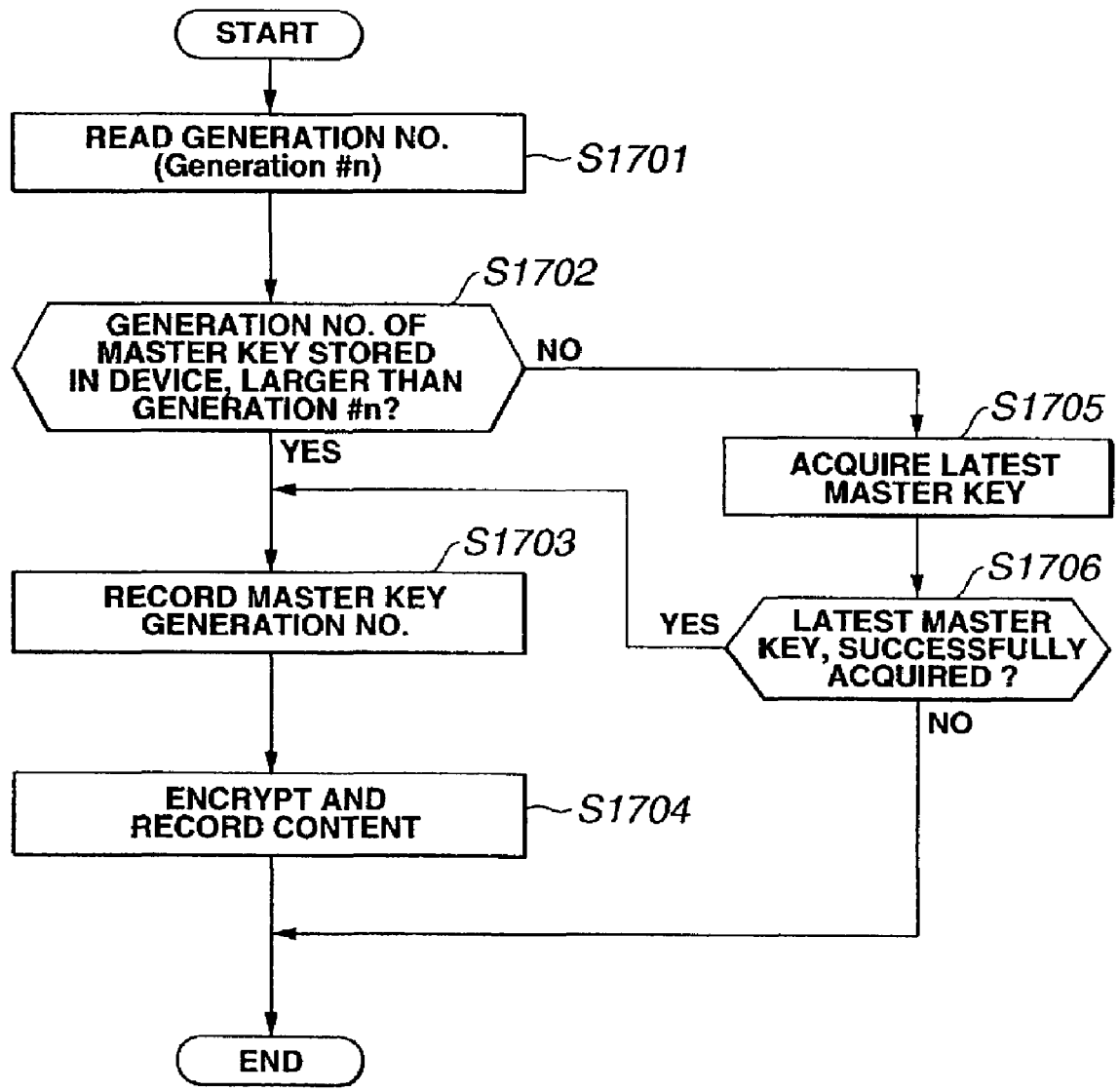
FIG. 17 shows a flow of operations effected in content recording in the information recorder/player (embodiment 3) according to the present invention, capable of the strict master key management.

Operations in steps S1701 to S1704 in FIG. 17 are similar to those in steps S1001 to S1004 in FIG. 10, and will not be described any longer.

If the generation number of an encrypted master key stored in the recorder/player 1600 itself is judged in step S1702 to be smaller than that indicated by the prerecording generation information, the recorder/player 1600 goes to step S1705 where the modem 1601 of the recorder/player 1600 will form a link with the key issuing institute via the telephone line to receive and acquire an encrypted master key sent from the key issuing institute.

Note that at this time, a mutual authentication protocol may be effected for the recorder/player 1600 and key issuing institute to mutually confirm the appropriateness of their counterpart. For example, the well-known mutual authentication protocols includes a one using a common key cryptography as in ISO/IEC 9798-2, a one using a public key cryptography as in ISO/IEC 9798-3, a one using a cryptographic check function as in ISO/IEC 9798-4, etc.

Figure 18:
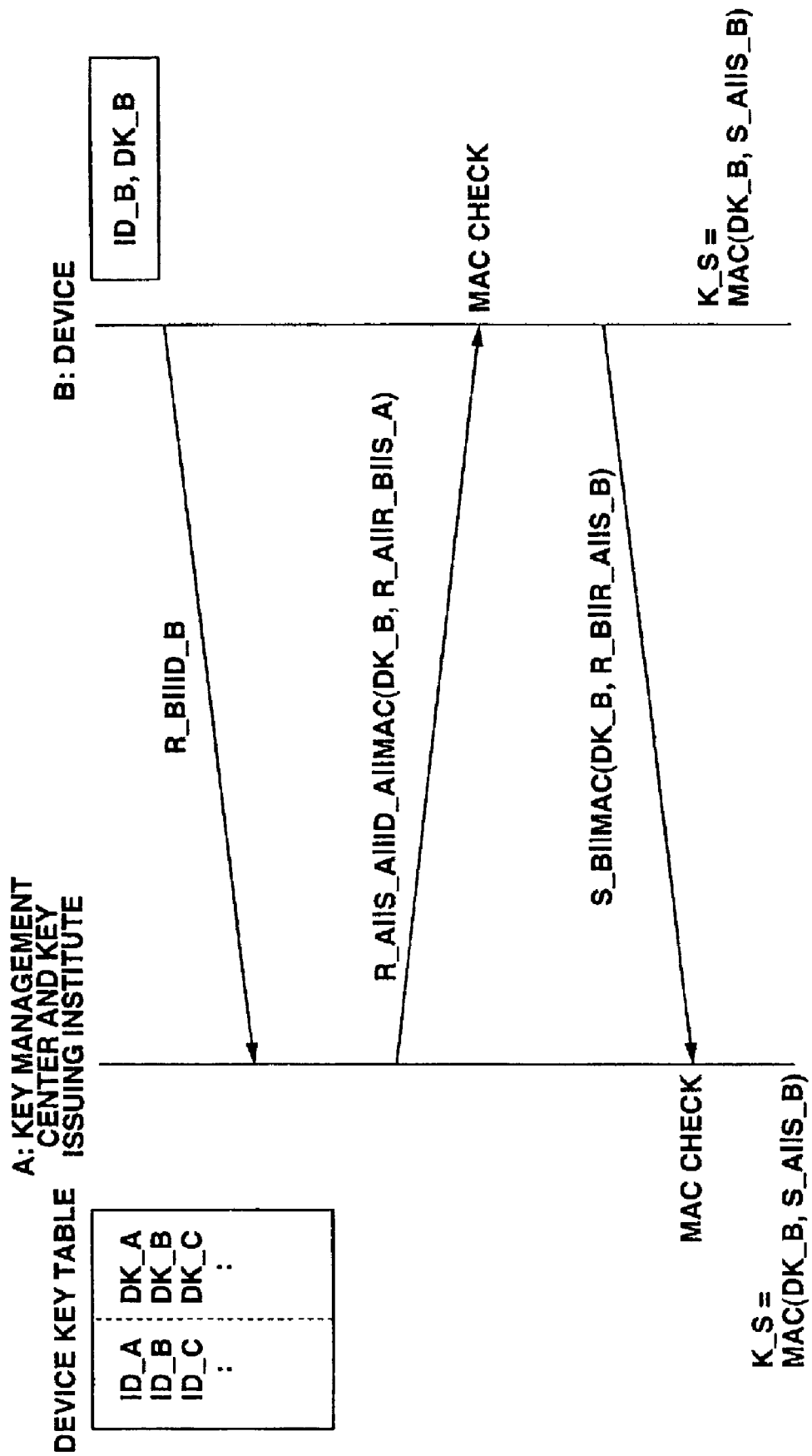
FIG. 18 shows a sequence of authentication (common key system) applicable to the key acquisition in the information recorder/player according to the present invention.

FIG. 18 shows the application of one of protocols using the cryptographic check function for mutual authentication and encryption key sharing to the embodiment.

In FIG. 18, a recorder/player (B: Device) has stored therein ID_B being a unique device ID and a private key DK_B. A key issuing institute (A) has stored therein a device ID for each device and a private key table corresponding to each device ID.

First, the recorder/player creates a random number R_B and sends it along with ID_B to the key issuing institute. Note that the symbol "∥" in FIG. 18 indicates a concatenation.

Next, the key issuing institute creates random numbers R_A,S_A and ID_A, and sends MAC(DK_B, R_A∥R_B∥S_A) along with them to the recorder/player. The ID_A is identification information indicating the key issuing institute, and MAC(DK_B, R_A∥R_B∥S_A) indicates input of DK_B as a key to the cryptographic check function and R_A∥R_B∥S_A as data. The cryptographic check function can be formed by applying the Data Encryption Standard (DES) defined in FIPS 46-2 as shown in ISO/IEC 9797. Also, DK_B used as in the above is retrieved from the stored private key table using ID_B as a retrieval key.

The recorder/player uses received data to calculate MAC (DK_B, R_A∥R_B∥S_A) by itself and check if the calculation result coincides with the received MAC(DK_B, R_A∥R_B∥S_A). If there is found a coincidence between the calculated MAC(DK_B, R_A∥R_B∥S_A) and received one, the recorder/player will judge that the key issuing institute is appropriate, and operate continuously. If not, the recorder/player will judge that the key issuing institute is inappropriate, and cease the master key renewing procedure.

Next, the recorder/player creates the random number S_B and sends it along with MAC(DK_B, R_A∥R_B∥S_A) to the key issuing institute.

The key issuing institute will also use the received data to calculate MAC(DK_B, R_A∥R_B∥S_A) by itself and confirm whether the calculation result coincides with the received MAC(DK_B, R_A∥R_B∥S_A). If the calculated MAC(DK_B, R_A∥R_B∥S_A) coincides with the received one, the key issuing institute will judge that the recorder/player is appropriate and operate continuously. If not, the key issuing institute will judge that the recorder/player is inappropriate and cease the master key renewing procedure.

Next, the recorder/player creates the random number S_B, and sends it along with MAC(DK_B, R_B∥R_A∥S_B) to the key issuing institute.

Also the key issuing institute uses the received data to calculate MAC(DK_B, R_B∥R_A∥S_B) by itself and confirm whether the calculation result coincides with the received MAC(DK_B, R_B∥R_A∥S_B). If there is found a coincidence between the calculated MAC(DK_B, R_B∥R_A∥S_B) and received one, the key issuing institute will judge that the recorder/player is appropriate. If not, the key issuing institute will judge that the recorder/player is inappropriate, and cease the master key renewing procedure.

Finally, both the recorder/player and key issuing institute calculate MAC(DK_B, S_A∥S_B) and uses it as a session key in that session.

Since the key issuing institute and recorder/player can mutually confirm the appropriateness of their counterpart and also share the session key safety as in the above, the key issuing institute for example can encrypt a master key of the latest generation by DES or the like using the session key as a key, and send the encrypted master key safely to the recorder/player.

Figure 19:
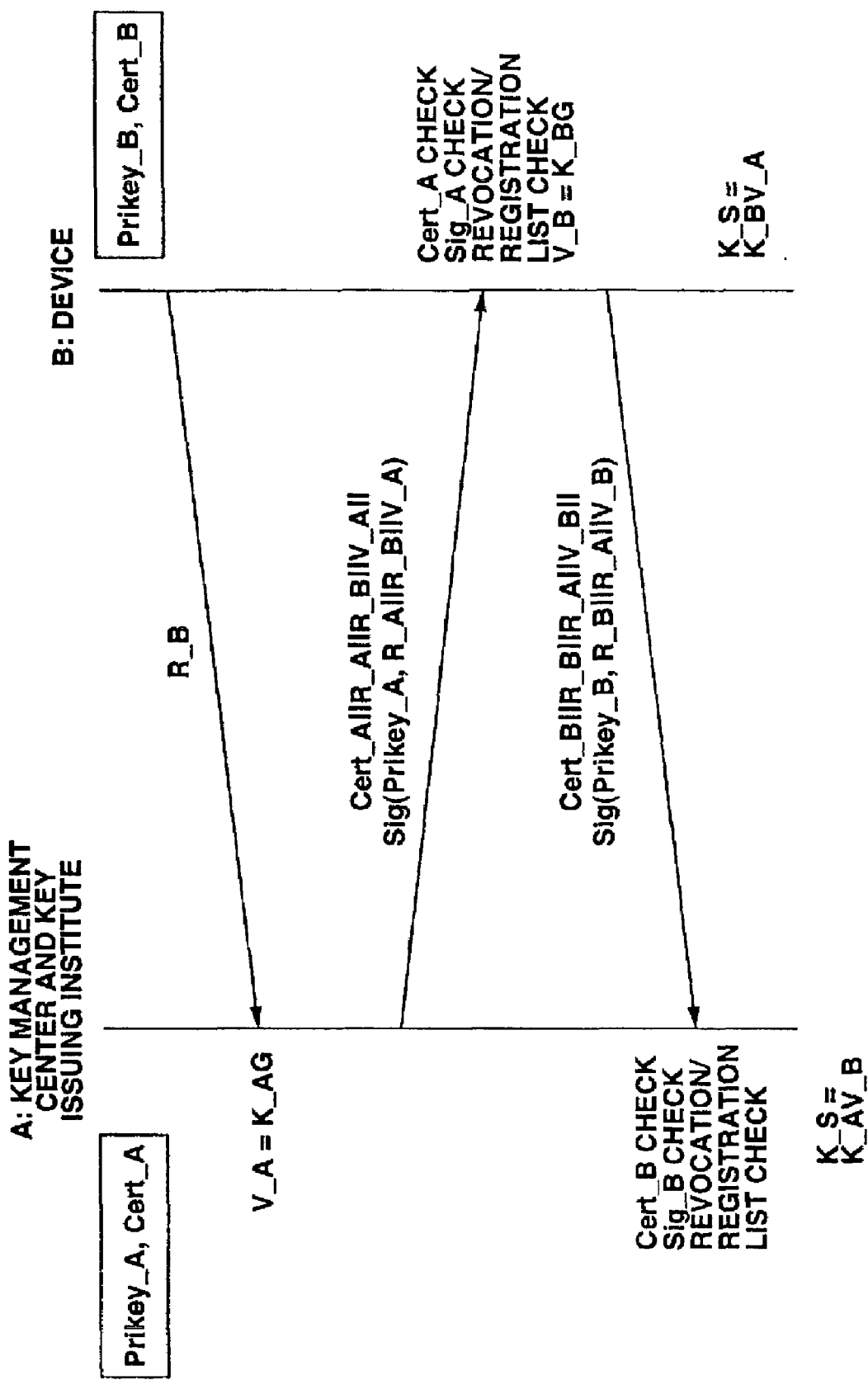
FIG. 19 shows a sequence of authentication (public key system) applicable to the key acquisition in the information recorder/player according to the present invention.

FIG. 19 shows an application of an authentication technique using the public key cryptography to this embodiment.

Figure 20:
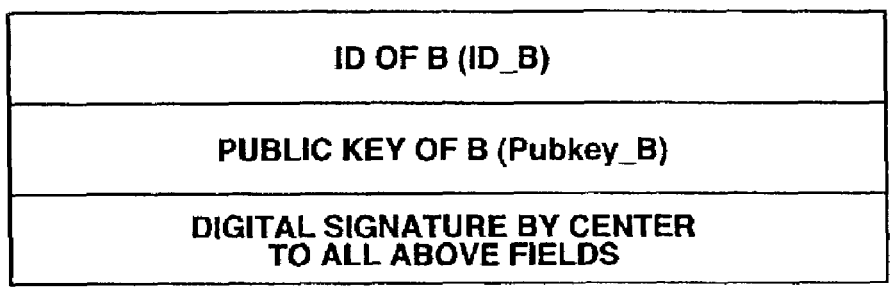
FIG. 20 shows the configuration of a public key certificate used in the authentication application to key acquisition in the information recorder/player according to the present invention.

In FIG. 19, the each of key issuing institute A and recorder/player B owns an ID for identification of itself, public key certificate and revocation list or registration list. The public key certification is data certified with a signature by the center (key issuing institute) for the entity ID and public key as shown in FIG. 20.

Figure 21:
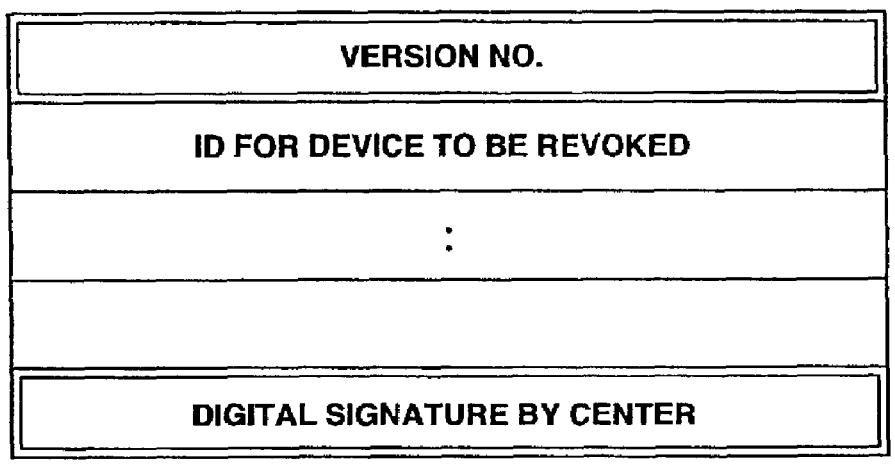
FIG. 21 shows the configuration of a revocation list in the information recorder/player according to the present invention.

The revocation list is also called "authorized devices list" or "black list". As shown in FIG. 21, it lists up IDs of devices whose private keys have been uncovered and carries a version number which will monotonously be larger and a digital signature made by the center (key issuing institute).

Figure 22:
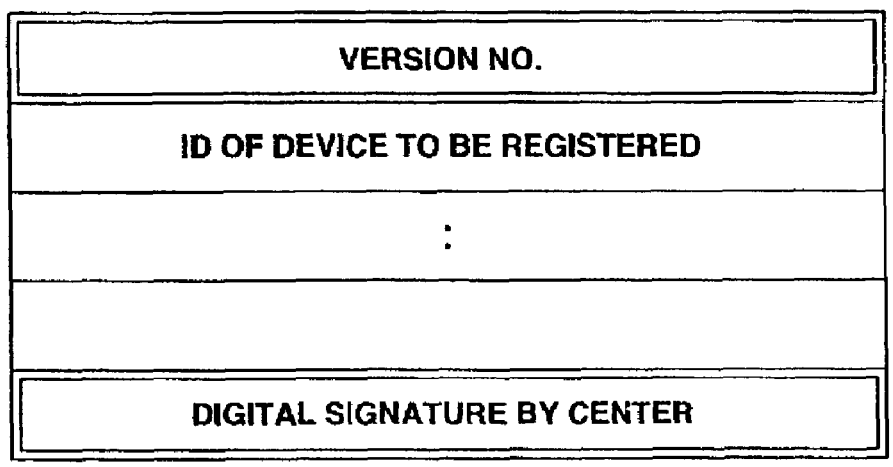
FIG. 22 shows the configuration of registration list in the information recorder/player according to the present invention.

The registration list is also called "unauthorized devices list" or "registered devices list". As shown in FIG. 22, it lists up IDs of concurrently reliable devices (whose private keys have not been uncovered) and carries a version number which will monotonously be larger and a digital signature made by the center (key issuing institute).

As shown in FIG. 19, the recorder/player creates the random number R_B and sends it to the key issuing institute.

The key issuing institute creates random numbers K_A and R_A, calculates V_A by multiplying a system-common point (base point) G on an elliptic curve E by K_A, and sends a public key certificate (Cert_A, R_A, R_B, V_A) along with a signature made to data R_A∥R_B∥V_A with its own private key (Prikey_A) to the recorder/player.

The recorder/player checks the validity of the public key certificate from the key issuing institute and of the signature made by the key issuing institute. When it has a revocation list stored therein, it confirms that the counterpart's ID is not listed in the revocation list. In case it has a registration list stored therein, it confirms that the counterpart's ID is listed in the registration list. If the recorder/player has not succeeded in the confirmation, it will judge that the key issuing institute is inappropriate and exit the master key renewing procedure. When the recorder/player has succeeded in the confirmation, it will create the random number K_B, make a similar calculation to that having been made by the key issuing institute and send a signature made to data R_B∥R_A∥V_B along with the public key certificate (Cert_B, R_B, R_A, V_B) to the key issuing institute.

The key issuing institute will make similar inspections to those having been made by the recorder/player to the received data and continue the master key renewing procedure only when all the inspections have successfully been made.

Thereafter, the key issuing institute multiplies K_A and V_B, while the recorder/player multiplies K_B and V_A, on the elliptic curve E, respectively, to acquire a session key K_S of which the use is as having been described with respect to FIG. 18.

Note that the multiplication on the elliptic curve, creation of the digital signature, and inspection method are under definition by the IEEE P1363, and they are detailed in the available preliminary standard.

In step S1706 in FIG. 17, it is judged whether the recorder/player has successfully acquired a master key of a necessary generation. If the master key has been acquired, the recorder/player goes to step S1703 where it will eventually record data to the recording medium.

If the recorder has not successfully acquired the encrypted master key of the necessary generation, it will exit the master key renewing procedure without recording data to the recording medium. Note that at this time, there may be displayed to the user a message informing that the encrypted master key of the necessary generation has not successfully been acquired.

In the above embodiment, the modem 1601 and telephone line are used to acquire a master key from the key issuing institute in step S1705. Note however that a master key can be acquired from any other recorder/player and a link may be formed using the digital I/F 620, not the modem 1601. In case the recorder/player acquires a master key from another recorder/player, not from the key issuing institute, the authentication using the public key as shown in FIG. 19 should preferably be adopted.

Next, operations of the recorder/player 1600 in FIG. 16 in playback of data recorded in the recording medium 200 will be described with respect to the flow chart shown in FIG. 23.

Figure 23:
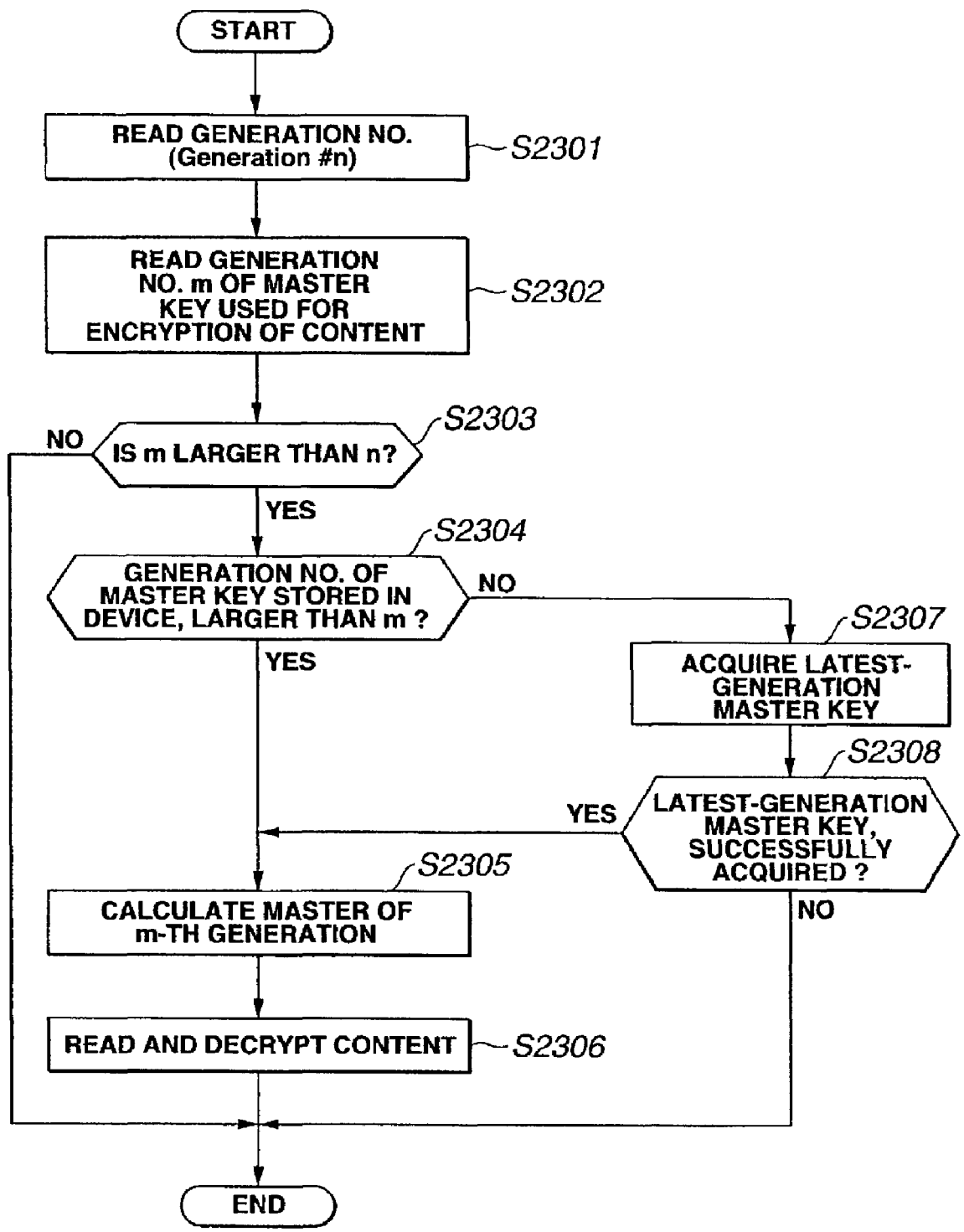
FIG. 23 shows a flow of operations effected in content playback in the information recorder/player according to the present invention.

Operations in steps S2301 to S2306 in FIG. 23 are similar to those in steps S1201 to S1206 in FIG. 12, and so will not be described any longer. In step S2304, however, if the generation of an encrypted master key stored in the player is older that indicated by the recording generation information, the recorder/player 1600 will go to step S2307.

In step S2307, the similar method to that in step S1705 in FIG. 17 is used to try to acquire an encrypted master key of the latest generation. That is, the recorder/player 1600 uses the modem 1601 to form a link to the key issuing institute via a telephone line, and thus receives and acquires the encrypted master key of the latest generation sent from the key issuing institute. Note that at this time, the recorder/player and key issuing institute should preferably execute the aforementioned mutual authentication protocol.

Next in step S2308, if the encrypted master key of the necessary generation has successfully been acquired in step S2307, the recorder/player goes to step S2305 where it will eventually read data from the recording medium 200. On the other hand, if the encrypted master key of the necessary generation has not successfully been acquired, the recorder/player will exit the master key renewing procedure without reading data from the recording medium 200. Note that at this time, there may be displayed to the user a message informing that the master key of the necessary generation has no successfully been acquired.

Note that also in the procedure for renewing the master key with the IC card, having been described with reference to FIGS. 13 to 15, mutual authentication may be effected between the recorder/player 1300 and IC card 1302 to acquire a renewed master key only when the authentication has successfully been made. Also, for acquisition of a master key, the recorder/player 600 constructed as shown in FIG. 6 should preferably be constructed to effect the above-mentioned authentication by network communications via the digital I/F 620 for example to acquire a renewed master key only when the authentication has successfully be made.

(3.3 System Configuration for Renewal of Master Key Via Key Renewing Terminal)

Next, there will be described another embodiment of the present invention will be described concerning a system configuration in which a key renewing terminal, constructed as a separate unit independent of the information recorder or player is used. More specifically, when a message for prompting to acquire a master key of the latest generation is displayed in step S1005 in FIG. 10, a special tool, namely, a key renewing terminal, is used to renew the master key. The key renewing terminal is held by a service man dispatched from a service center for example. This embodiment uses such a key renewing terminal.

As having previously been described, in the key renewing system using a recording medium, a plurality of, for example, thousands of, devices belongs to one category. Therefore, even if only one of the many recorder/players included in one category has the device key thereof, which has to be stored safely therein, uncovered or known to outside, all the devices include in the category have to be removed from the system. The key renewing system of this embodiment is such that the devices revoked once and which should not be revoked are recovered into the system, namely, the key renewing terminal is used to renew the master key, thereby re-enabling the normal recording and playback. A plurality of modes of master key renewal with the key renewing terminal will be described herebelow.

3.3.1 Master Key Renewal Via Key Renewing Terminal—Example 1)

First, the system for renewing a master key via the key renewing terminal in the information recorder or player constructed as in FIG. 6 will be described. It should be reminded that in this embodiment, however, the information recorder or player has safely stored therein a category number to which the device belongs, a device key corresponding to the category number, and in addition, a device ID and a device-unique key corresponding to the device ID. The device-unique key is stored in the cryptography unit having previously been described with reference to FIG. 1 for example.

Figure 24:
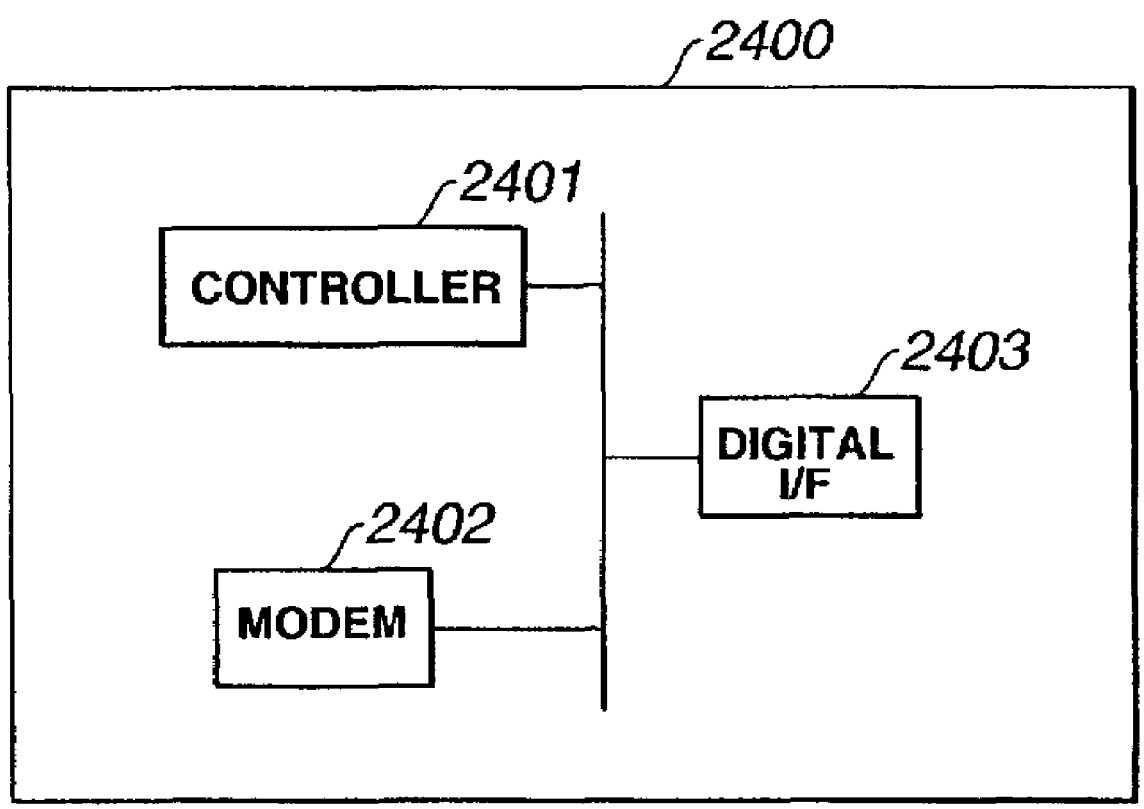
FIG. 24 is a block diagram showing the construction of the key renewing terminal used in the information recorder/player according to the present invention.

In this embodiment, to renew the master key of the information recorder or player, an information processor for renewal of a key (will be referred to as "key renewing terminal" herein). FIG. 24 is a block diagram showing an example construction of the key renewing terminal.

As shown in FIG. 24, the key renewing terminal is generally indicated with a reference 2400. The key renewing terminal 2400 includes a controller 2401, modem 2402 and a digital interface (I/F) 2403. For example, when in key renewal using the aforementioned ordinary recording medium, a category to which the device in consideration belongs is revoked, identification of the category results in that no key renewal is to be done for the device and thus the device cannot acquire a master key of any new generation, each recorder/player provides a communication path for acquisition of a master key directly from the key issuing institute.

Figure 25:
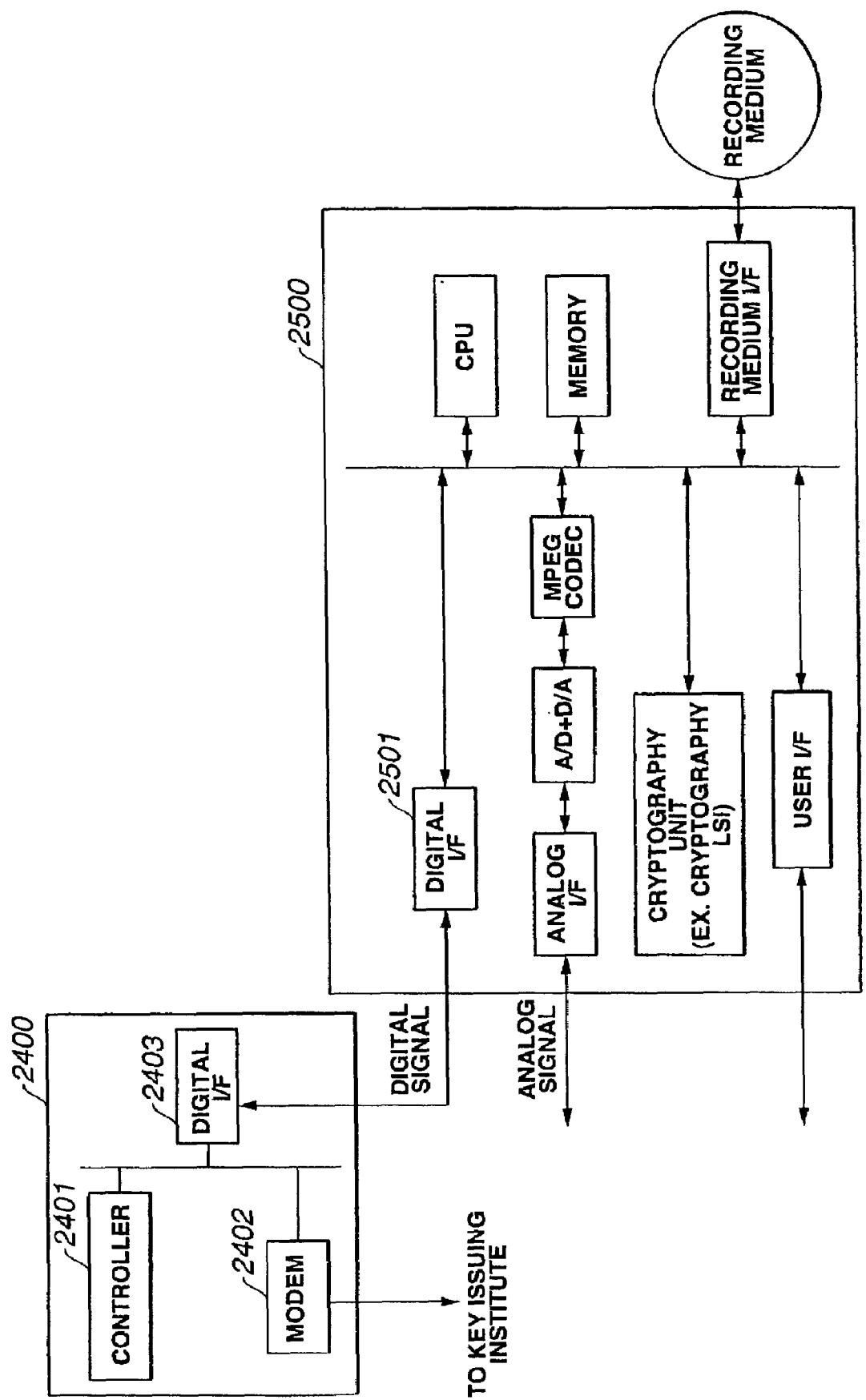
FIG. 25 is a block diagram explaining an example (1) of the key renewal with the key renewing terminal in the information recorder/player according to the present invention.

FIG. 25 shows the construction of the information recorder or player in which the key renewing terminal shown in FIG. 24 is used to establish a communication path for acquisition of a master key from the key issuing institute. The recorder/player is generally indicated with a reference 2500. It includes a digital I/F 2501. The digital I/F 2501 is normally used to transmit content data such as music, movie or the like. For acquisition of a master key from the key issuing institute, however, the digital I/F 2501 and the digital I/F 2403 of the key renewing terminal 2400 are connected to each other to establish a communication path from the modem 2402 of the key renewing terminal 2400 to the key issuing institute via a telephone line. The controller 2401 controls the communications, conversion of format of data to be transmitted, selection of data to be transmitted, etc.

After the recorder/player 2500 has established a communication path to the key issuing institute via the key renewing terminal 2400, the key issuing institute and recorder/player use a mutual authentication and key sharing protocol based on the common key cryptography (will be shown in FIG. 26) or a mutual authentication and key sharing protocol based on the public key cryptography (will be shown in FIG. 27) to mutually confirm their appropriateness, and then the key issuing institute gives a master key of the latest generation to the recorder/player.

Figure 26:
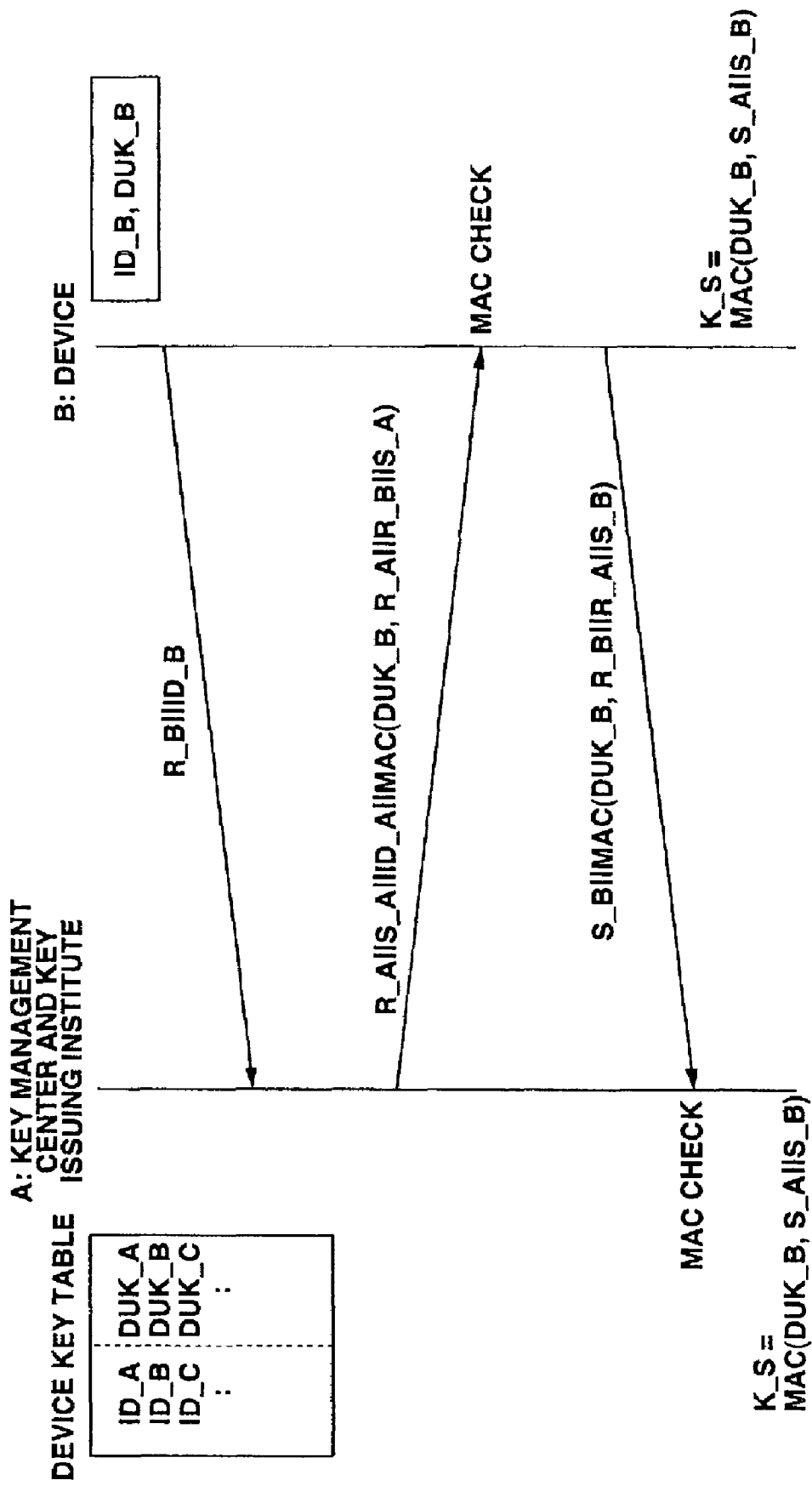
FIG. 26 shows a sequence of authentication (common key system) using the key renewing terminal, applicable to the key acquisition in the information recorder/player according to the present invention.
Figure 27:
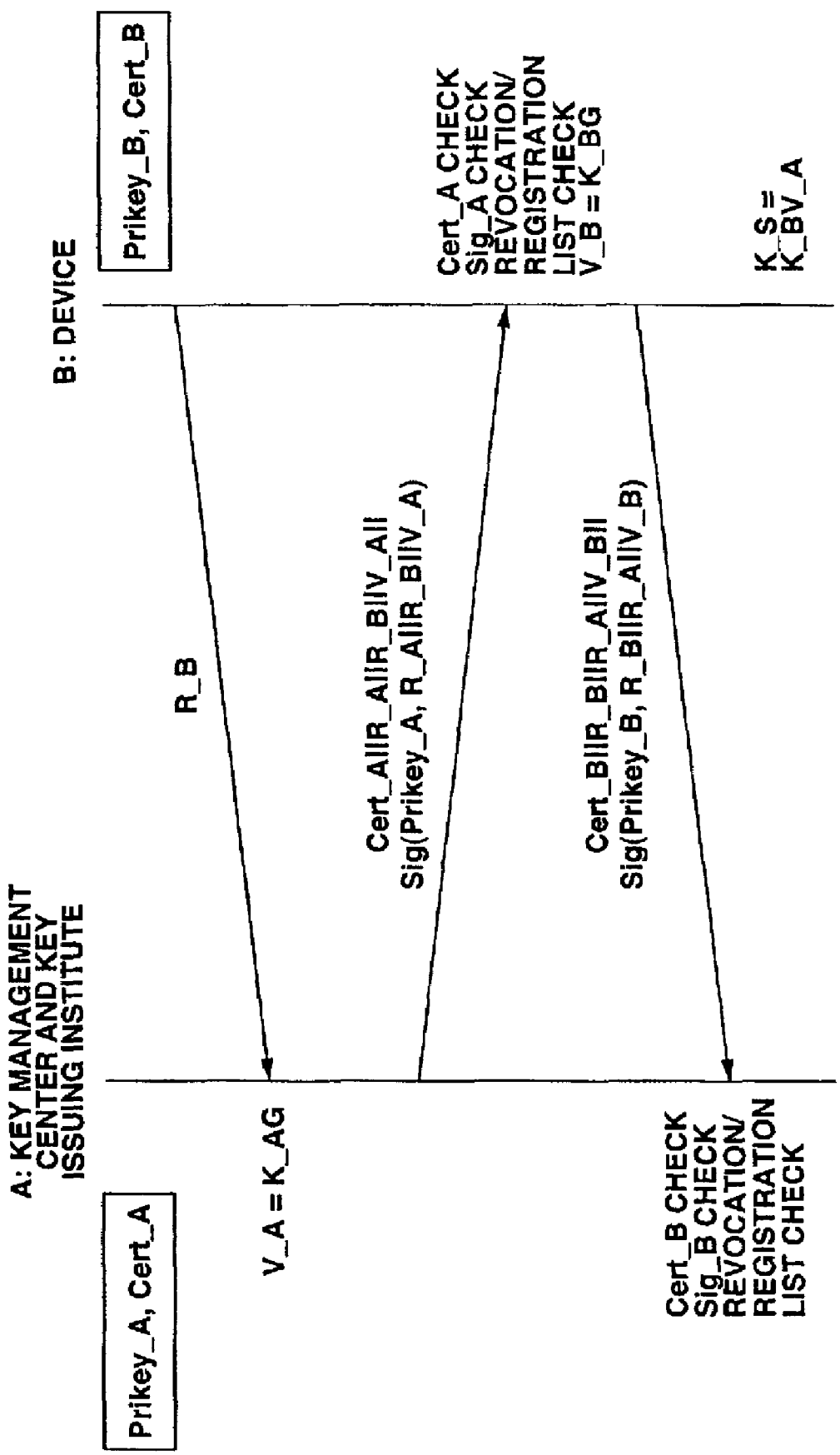
FIG. 27 shows a sequence of authentication (public key system) using the key renewing terminal, applicable to the key acquisition in the information recorder/player according to the present invention.

FIGS. 26 and 27 show a mutual authentication and key sharing protocol based on the common key cryptography, similar to that shown in FIG. 18 and a mutual authentication and key sharing protocol based on the public key cryptography, similar to that shown in FIG. 19. Thus, the details of these protocols are referred to FIGS. 18 and 19. In the mutual authentication and key sharing protocol based on the common key cryptography, shown in FIG. 26, however, a device-unique key (DUK) being a key unique to each of the recorder/players is used as a private key instead of the device key (DK) which is the private key used in the sequence in FIG. 18. Therefore, the key issuing institute has a table including a device ID of each recorder/player and a device-unique key corresponding to the device ID.

The mutual authentication and key sharing protocol shown in FIG. 26 or 27 is executed between the recorder/player 2500 and key issuing institute via the key renewing terminal 2400 shown in FIG. 25. A renewed master key acquired through the above operations can be transmitted safely by encrypting the renewed master key with a session key K_S having been shared based on the protocol.

Note that in the above, a master key is transmitted from the key issuing institute to the recorder/player after completion of the authentication but the key issuing institute may receive only a device ID from a recorder/player which has made a request for key renewal with omission of the mutual authentication, take out a device-unique key (DUK) for the recorder/player in consideration from its table including device IDs and device-unique keys, encrypt a master key with the device-unique key (DUK) and transmit the encrypted master key to the recorder/player. The recorder/player having received the encrypted master key will decrypt it with its own device key (DUK) to acquire a renewed master key. In this case, the counterpart with which the recorder/player communicates may be a server or the like having stored therein a master key table shown in FIG. 28, not the key issuing institute which should be reliable. The table shown in FIG. 28 is a one created in correlation with individual recorder/players included in one category and in which there are stored a device-unique identification number for each recorder/player and a master key (MK_n) having the generation number n, encrypted with a corresponding device-unique key for the recorder/player, in correlation with each other. The recorder/player whose master key is to be renewed accesses a server having the table shown in FIG. 28 stored therein via the key renewing terminal to acquire the n-th generation master key (MK_n) encrypted with its own device-unique key (DUK).

3.3.2 Master Key Renewal Via Key Renewing Terminal— Example 2)

Next, a second example of the master key renewal via the key renewing terminal will be described. In this example, the communication interface (I/F) of the recorder/player is connected to the key renewing terminal to acquire a renewed master key.

Figure 29:
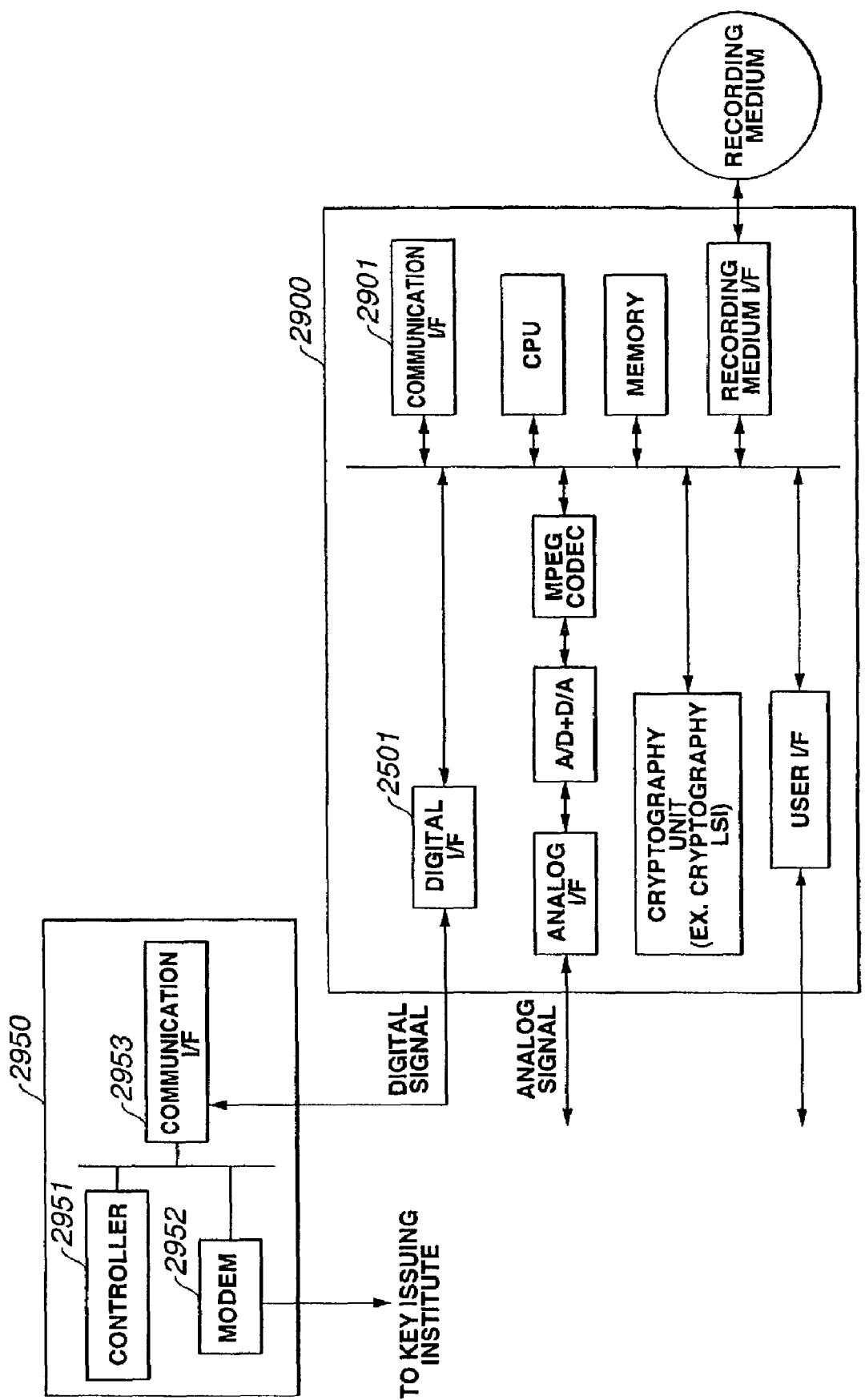
FIG. 29 is a block diagram explaining an example (2) of the key renewal with the key renewing terminal in the information recorder/player according to the present invention.

As shown in FIG. 29, the recorder/player is generally indicated with a reference 2900. As seen, the recorder/player 2900 is connected to a communication I/F 2951 of a key renewing terminal 2950 via a communication I/F 2901 and also connected to the key issuing institute via a modem 2952 under the control of a controller 2951. The recorder/player 2900 executes the aforementioned mutual authentication and key sharing protocol to acquire a renewed master key. The communication I/F 2901 of the recorder/player 2900 may be of a radio communication type such as an infrared communication or Bluetooth type.

3.3.3 Master Key Renewal Via Key Renewing Terminal— Example 3)

In the above two examples, the communication path to the key issuing institute is established via the key renewing terminal and a renewed master key is acquired by the communication with the key issuing institute. In this third example, the key renewing terminal does not provide any communication path between the recorder/player and key issuing institute but it works as a key issuing institute or as the above-mentioned server. That is to say, the key renewing terminal includes a storage unit in which a master key table as shown in FIG. 28 for example is stored.

Figure 30:
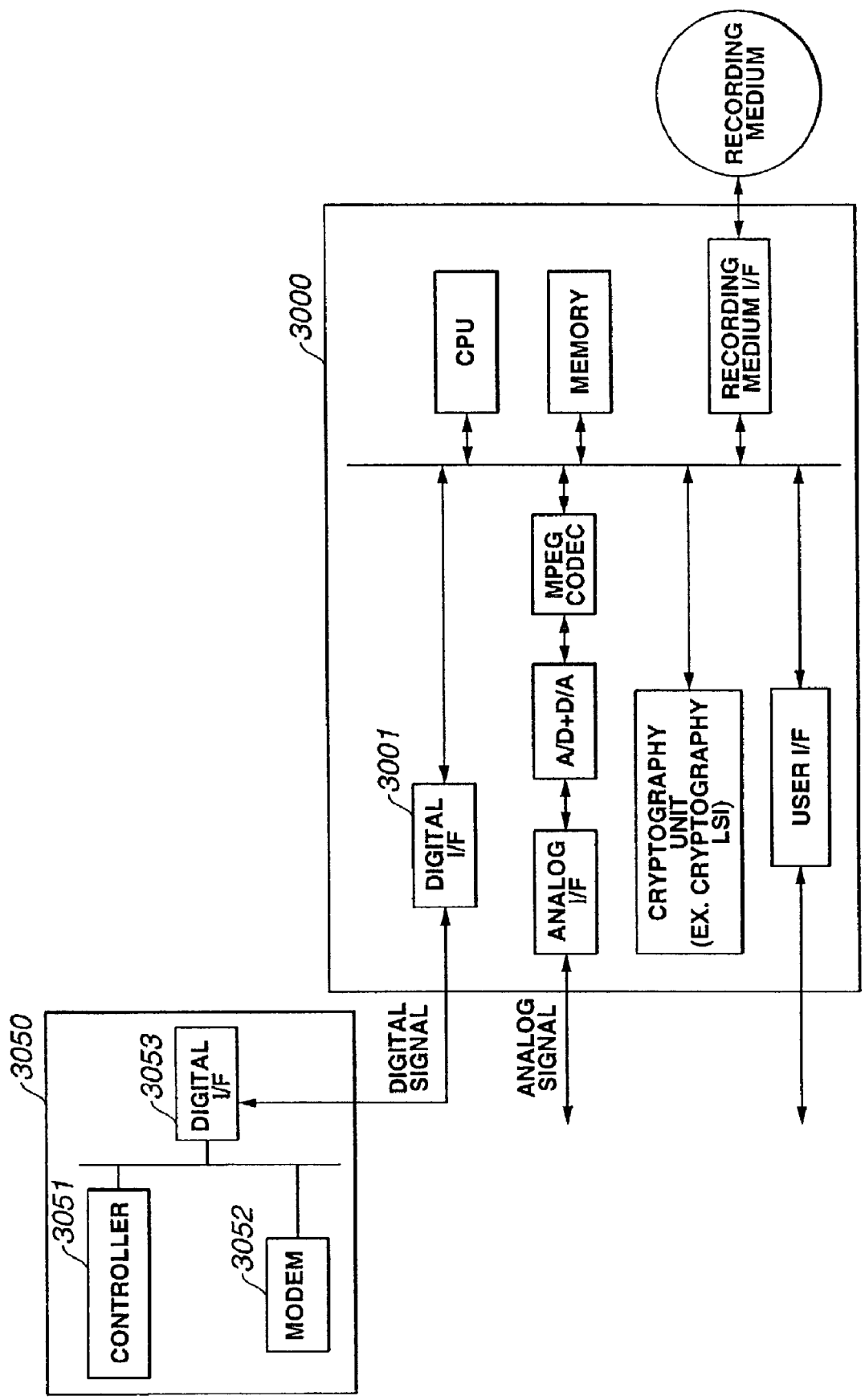
FIG. 30 is a block diagram explaining an example (3) of the key renewal with the key renewing terminal in the information recorder/player according to the present invention.
Figure 31:
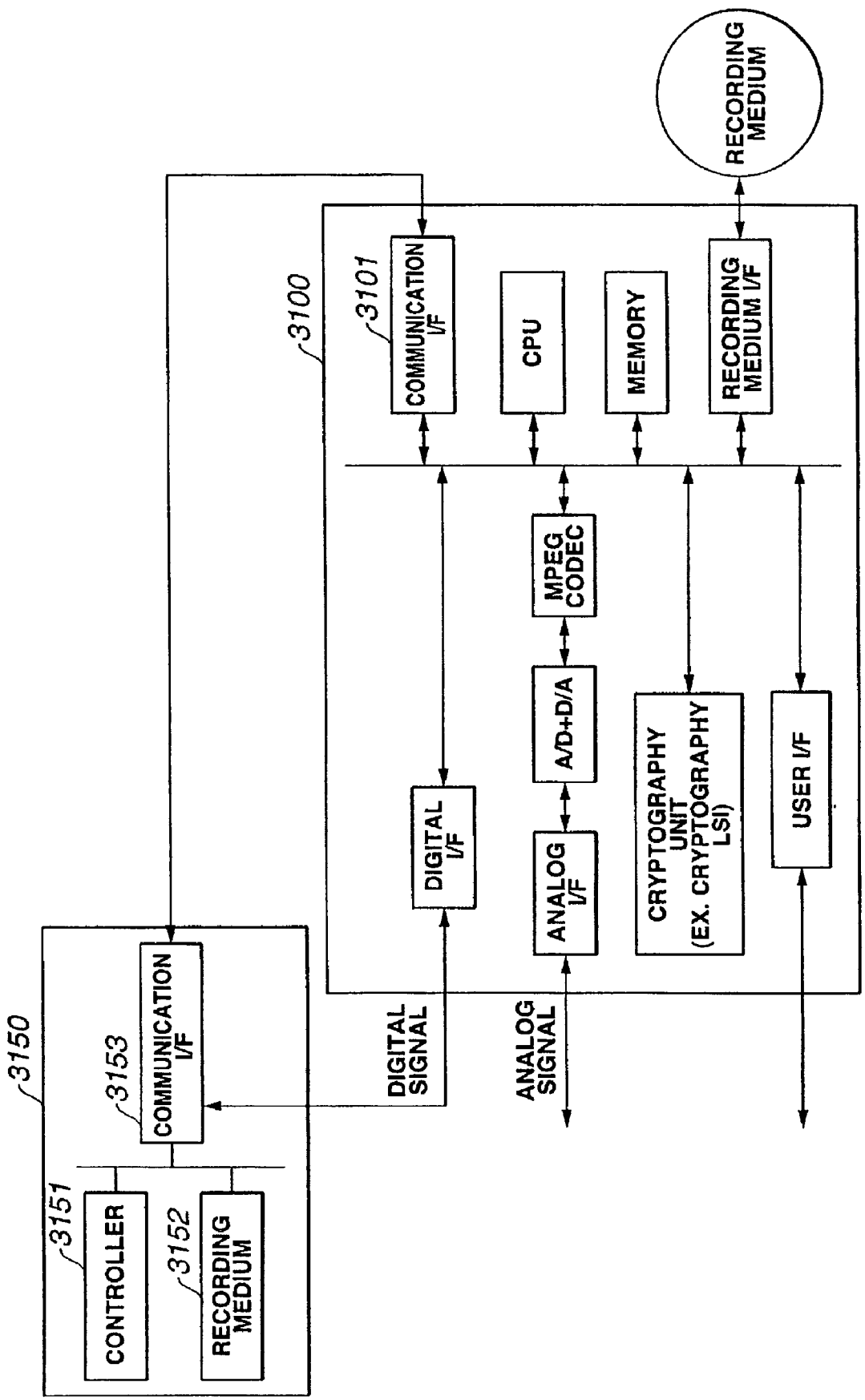
FIG. 31 is a block diagram explaining an example (4) of the key renewal with the key renewing terminal in the information recorder/player according to the present invention.

FIGS. 30 and 31 explain third and fourth examples, respectively, of the acquisition of renewed master key. The recorder/player in the third example is generally indicated with a reference 3000. As shown in FIG. 30, the recorder/player 3000 includes a digital I/F 3001 which is normally used to transmit content data such as music, movie, etc. For acquisition of a aster key from a key renewing terminal 2050, however, the digital I/F 3001 is connected to a digital I/F 3053 of the key renewing terminal 3050 to acquire an encrypted master key corresponding to a device ID of the recorder/player 3000 from an encrypted master key table shown in FIG. 28 for example and stored in a recording medium 5052 of the key renewing terminal 3050. The key renewing terminal 3050 includes also a controller 3051 which controls the communications between the recorder/player 3000 and key renewing terminal 3050.

In the fourth example shown in FIG. 31, a recorder/player 3100 is connected to a communication I/F 3151 of a key renewing terminal 3150 via a communication I/F 3101 of the recorder/player 3100 itself. The recorder/player 3100 acquires, from an encrypted master key table shown in FIG. 28 for example and stored in a recording medium 3153 of the key renewing terminal as in the aforementioned example, an encrypted master key corresponding to its own device ID under the control of a controller 3151 also included in the key renewing terminal 3150. The communication I/F 3101 of the recorder/player 3100 may be of a radio communication type such as an infrared communication or Bluetooth type.

Also in this example, the key renewing terminal and recorder/player may execute the mutual authentication and key exchange protocol to confirm their appropriateness. Then the key renewing terminal may use the encryption key shared in the protocol to send the master key safely to the recorder/player. For these operations, there can be applied the authentication and key exchange protocol based on the common key cryptography as shown in FIG. 26 and authentication and key exchange protocol based on the public key cryptography as shown in FIG. 27, having previously been described.

In case the authentication and key exchange protocol based on the common key cryptography, shown in FIG. 26, is used, a device-unique key table is given to the key renewing terminal and the device ID of a recorder/player known to have the device-unique key (DUK) thereof uncovered is marked with an indication of the DUK uncovering, thereby granting no master key to the recorder/player.

Also, in case the authentication and key exchange protocol based on the public key cryptography, shown in FIG. 27, is used, the key renewing terminal does not require the device-unique key (DUK), but in order to pass no master key to a recorder/player known to have the device-unique key (DUK) thereof uncovered, a revocation list of device IDs is stored in the key renewing terminal to pass a master key only to a device for which there is not found in the list any crisis ID corresponding to a device ID of a recorder/player having made a request for key renewal.

By the above-mentioned key renewal via the key renewing terminal, it is made possible to acquire a renewed master key via the key renewing terminal provided separately from the recorder/player. For example a device having to renew its master key because the device of any other device belonging to the same category has been uncovered, can establish a communication path to the key issuing institute via the key renewing terminal to acquire a master key or can acquire a master key directly from the key renewing terminal, so that a different procedure for renewal of the master key can be taken for each of the terminals belonging to the same category. Also, the key renewing terminal may be adapted for use as connected to a recorder/player only when it is necessary to renew the master key. Since the key renewing terminal can send and receive information to and from the recorder/player via an interface which is normally provided, this arrangement is also advantageous in that no modem or the like has to be provided in the recorder/player, namely, it will not lead to any increase of costs of the system.

[4. Tree-Structured Key Distribution System]

Figure 32:
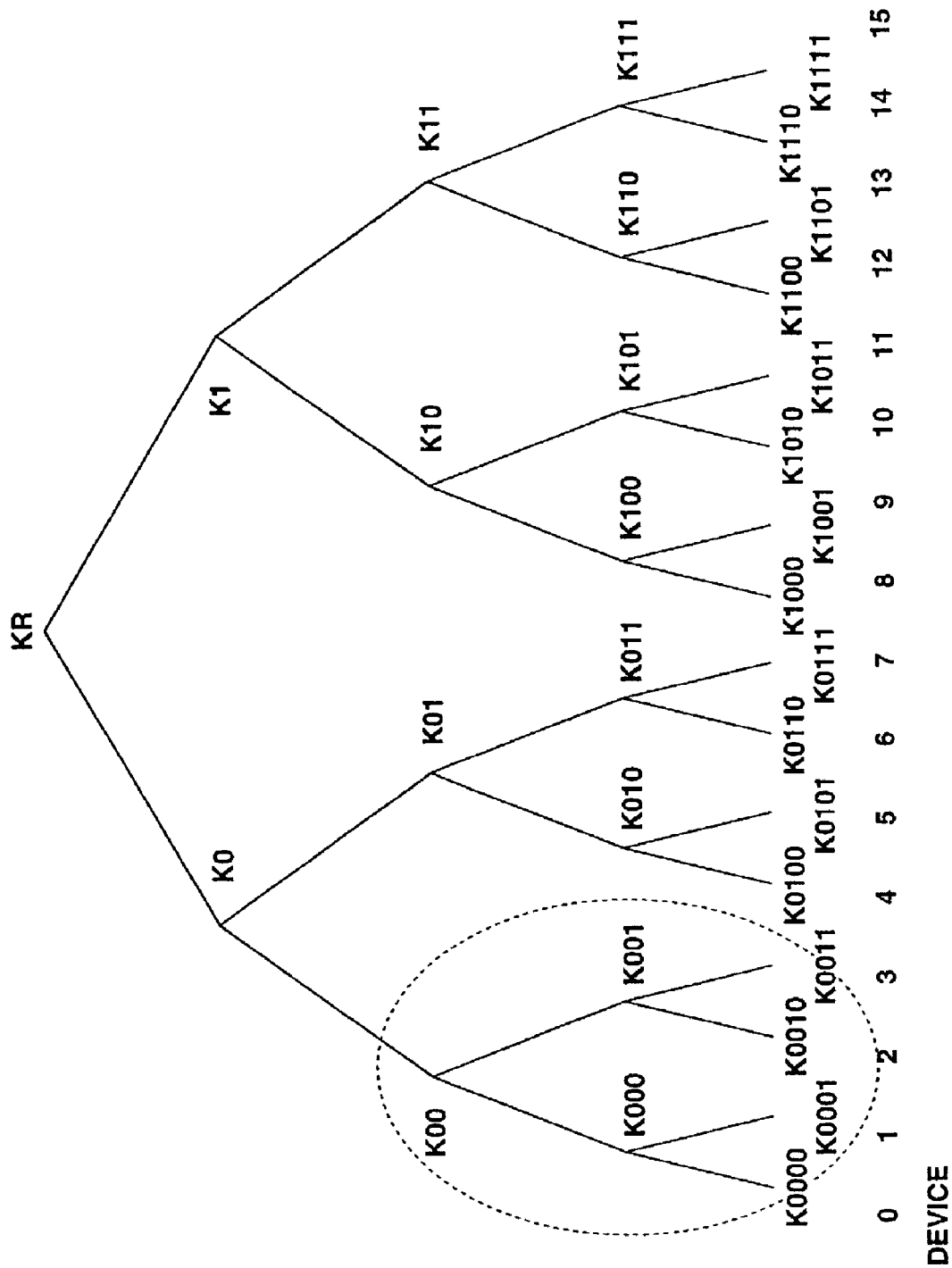
FIG. 32 shows a tree structure diagram explaining the encryption of keys such as a master key, medium key and the like in the information recorder/player according to the present invention.

The recorder/player shown in FIG. 6 distributes, via a tree-structured key distribution system, to each of the other recorder/players included in the system, a master key necessary for recording data to the recording medium or for playback of data from the recording medium as will be described herebelow. FIG. 32 shows the key distribution in the recorder/player in a tree-structured recording system. The numbers 0 to 15 shown at the bottom in FIG. 32 indicate individual recorder/players. That is, in FIG. 32, each of the leaves of the tree structure corresponds to each of the recorder/players (will be referred to as "device" hereunder wherever appropriate).

During production (or at shipment), there is stored in each of the devices 0 to 15 a node key assigned to a node from its own leaf to a route and a leaf key for each leaf in a predetermined initial tree. "K0000" to "K1111" in the next lowest portion in FIG. 32 are leaf keys assigned to the devices 0 to 15, respectively, and "KR" at the highest node to "K1111" at the bottom nodes are node keys.

In the tree structure shown in FIG. 32, for example, the device 0 owns a leaf key K0000 and node keys K000, K00, K0 and KR. The device 5 owns a leaf key K0101 and node keys K010, K01, K0 and KR. The device 15 owns a leaf key K1111 and node keys K111, K11, K1 and KR. Note that the tree shown in FIG. 32 includes only 16 devices 0 to 15 laid in 4 stages and well-balanced in horizontal symmetry but it may include more devices laid therein and be varied in number of stages from one part to another thereof.

The recorder/players (device) included in the tree structure shown in FIG. 32 include various types of recorder/players using a variety of recording media, such as DVD, CD, MD, memory stick (trademark), etc. Further, various application services are coexistent with each other in the tree structure. The key distribution system shown in FIG. 32 is applied while such different devices and applications are coexistent with each other.

In the system in which such devices and applications are coexistent, a portion of the tree, shown as encircled with a dotted line in FIG. 32 and including the devices 0, 1, 2 and 3, is set as a group in which the devices use the same recording medium. For example, each of the devices included in the encircled group will receive an encrypted common content sent from a content provider or a common master key or will output an encrypted content-fee payment data to the provider or a settlement institution. The content provider, settlement institution or an institution for data communications with each of the devices collectively sends data to the encircled portion in FIG. 32, that is, the devices 0, 1, 2 and 3 as one group. More than one such group exist in the tree shown in FIG. 32.

Note that the node key and leaf key may collectively be managed by a certain key management center or by each of groups including the provider, settlement institution, etc. which make a variety of data communications with each group. If these node and leaf keys have been uncovered for example, they are renewed by the key management center, provider, settlement institution, etc.

In the tree structure shown in FIG. 32, the four devices 0, 1, 2 and 3 included in one group own common keys K00, K0 and KR as node keys. Owing to this common use of the node keys, for example a common master key can be served to only the devices 0, 1, 2 and 3. For example, by setting the node key K00 itself owned in common as a master key, it is possible only for the devices 0, 1, 2 and 3 to set a common master key without receiving any new key. Also, by distributing, to the devices 0, 1, 2 and 3 via a network or as stored in a recording medium, a value Enc (K00, Kmaster) obtained by encrypting a new master key Kmaster with the node key K00, only the devices 0, 1, 2 and 3 can analyze the value Enc (K00, Kmaster) with the common node key K00 owned by each of the devices to acquire the master key Kmaster. Note that Enc (Ka, Kb) is a data derived from encryption of Kb with Ka.

If at a time t, it has been revealed that the keys K0011, K001, K00, K0 and KR owned by the device 3 for example were cryptanalyzed and uncovered by any attackers (hacker), it becomes necessary to disconnect the device 3 from the system in order to protect data transferred to and from a system (group including the devices 0, 1, 2 and 3) after that. To this end, it the node keys K001, K00, K0 and KR have to be changed to new keys K(t)001, K(t)00, K(t)0, K(t)R respectively and the new keys have to be passed to the devices 0, 1 and 2. Note that K(t)aaa is a renewed one of a key Kaaa in a generation t.

The distribution of renewed key will be described herebelow. A key will be renewed by supplying a table composed of block data called key renewal block (KRB) as shown in FIG. 33A to each of the devices 0, 1 and 2 via a network or as stored in a recording medium.

As shown in FIG. 33A, the renewal key block (KRB) is formed as a block data having a data structure which only a device needing renewal of a node key can renew. The example shown in FIG. 33A is a block data formed in order to distribute a renewed node key of the generation t to the devices 0, 1 and 2 included in the tree structure shown in FIG. 32. As apparent from FIG. 32, the devices 0 and 1 need renewed node keys K(t)00, K(t)0 and K(t)R while the device 2 needs renewed node keys K(t)001, K(t)00, K(t)0 and K(t)R.

As seen from FIG. 33A, the KRB includes a plurality of encryption keys. The bottom encryption key is Enc(K0010, K(t)001). This is a renewed node key K(t)001 encrypted with a leaf key K0010 of the device 2. The device 2 can decrypt this encryption key with its own leaf key to acquire K(t)001. Also, the device 2 can decrypt an encryption key Enc(K(t)001, K(t)00) on the next bottom stage with K(t)001 it has acquired by the decryption, thereby to acquire a renewed node key K(t)00. After that, the device 2 decrypts an encryption key Enc(K(t)00, K(t)0) on the next top stage in FIG. 33A to acquire a renewed node key K(t)0, and decrypts encryption key Enc(K(t)0, K(t)R) on the top stage in FIG. 33A to acquire a renewed encryption K(t)R. On the other hand, for the devices 0 and 1, a node key K000 is not to be renewed but node keys to be renewed are K(t)00, K(t)0 and K(t)R. The devices 0 and 1 decrypt an encryption key Enc(K000, K(t)00) on a third top stage in FIG. 33A to acquire a renewed node key K(t)00. Subsequently, the devices 0 and 1 decrypt an encryption key Enc(K(t)00, K(t)0) on the second top stage in FIG. 33A to acquire a renewed node key K(t)0, and decrypts an encryption key Enc(K(t)0, K(t)R) on the top stage in FIG. 33A to acquire a renewed node key K(t)R. In this way, the devices 0, 1 and 2 can acquire the renewed node keys K(t)00, K(t)0 and K(t)R. Note that "Index" in FIG. 33A shows an absolute address of a node key or leaf key used as a decryption key.

The node keys K0 and KR on the top stage of the tree structure shown in FIG. 32 have not to be renewed. In case only the node key K00 has to be renewed, use of the key renewal block (KRB) in FIG. 33B enables to distribute the renewed node key K(t)00 to the devices 0, 1 and 2.

KRB shown in FIG. 33B is usable for distribution of a new master key for common use in a specific group for example. More particularly, the devices 0, 1, 2 and 3 in the group shown in a dotted-line circle in FIG. 32 uses a certain recording medium and need a new common master key K(t)master. At this time, a node key K(t)00 derived from renewal of the node key K00 common to the devices 0, 1, 2 and 3 is used to distribute data Enc(K(t), K(t)master) derived from encryption of the new common master key K(t)master along with KRB shown in FIG. 33B. With this distribution, data which cannot be decrypted in the devices included in another group, for example, device 4, can be distributed.

That is, the devices 0, 1 and 2 can acquire the master key K(t)master at a time t by decrypting the encrypted data with K(t)00 acquired by processing KRB.

[Master Key Distribution Using KRB]

Figure 34:
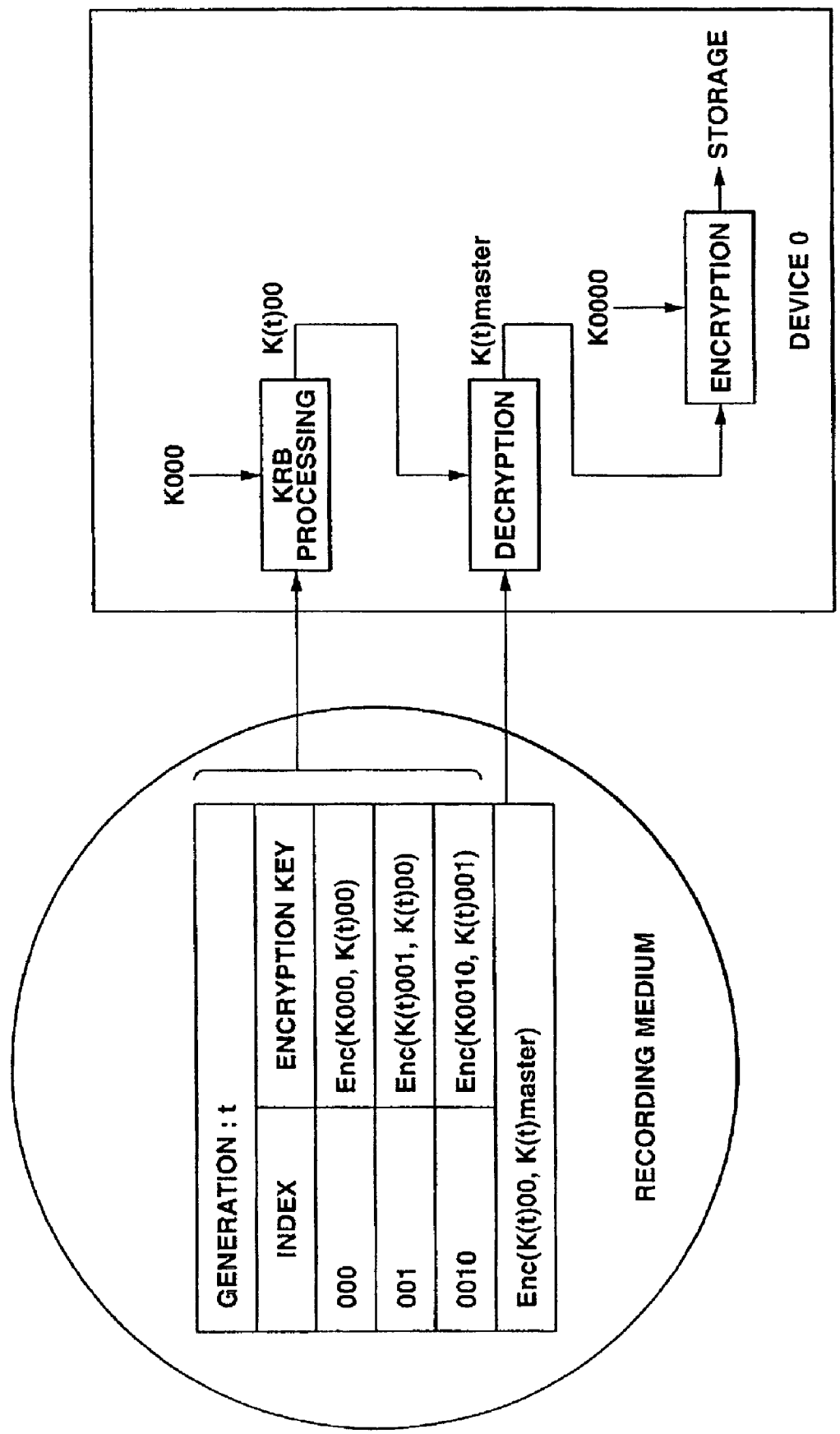
FIG. 34 shows examples of key distribution and decryption using the renewal key block (KRB) for the master key in the information recorder/player according to the present invention.

FIG. 34 shows the procedure for acquisition of a master key K(t)master at the time t by the device 0 having acquired a data Enc(K(t)00, K(t)master) derived from encryption of a new common master key K(t)master with K(T)00, and KRB shown in FIG. 33B.

As shown in FIG. 34, the device 0 creates a node key K(t)00 by a similar processing of KRB to the above from KRB at a time t (generation in which KRB is stored) and node K000 prestored in itself. Further, the device 0 decrypts the renewed master key K(t)master with the decrypted renewed node key K(t)00, encrypts it with its own leaf key K0000 for later use, and stores it. Note that in case the device 0 can safely store the renewed master key K(t)master therein, it is not necessary to encrypt it with the leaf key K0000.

Figure 35:
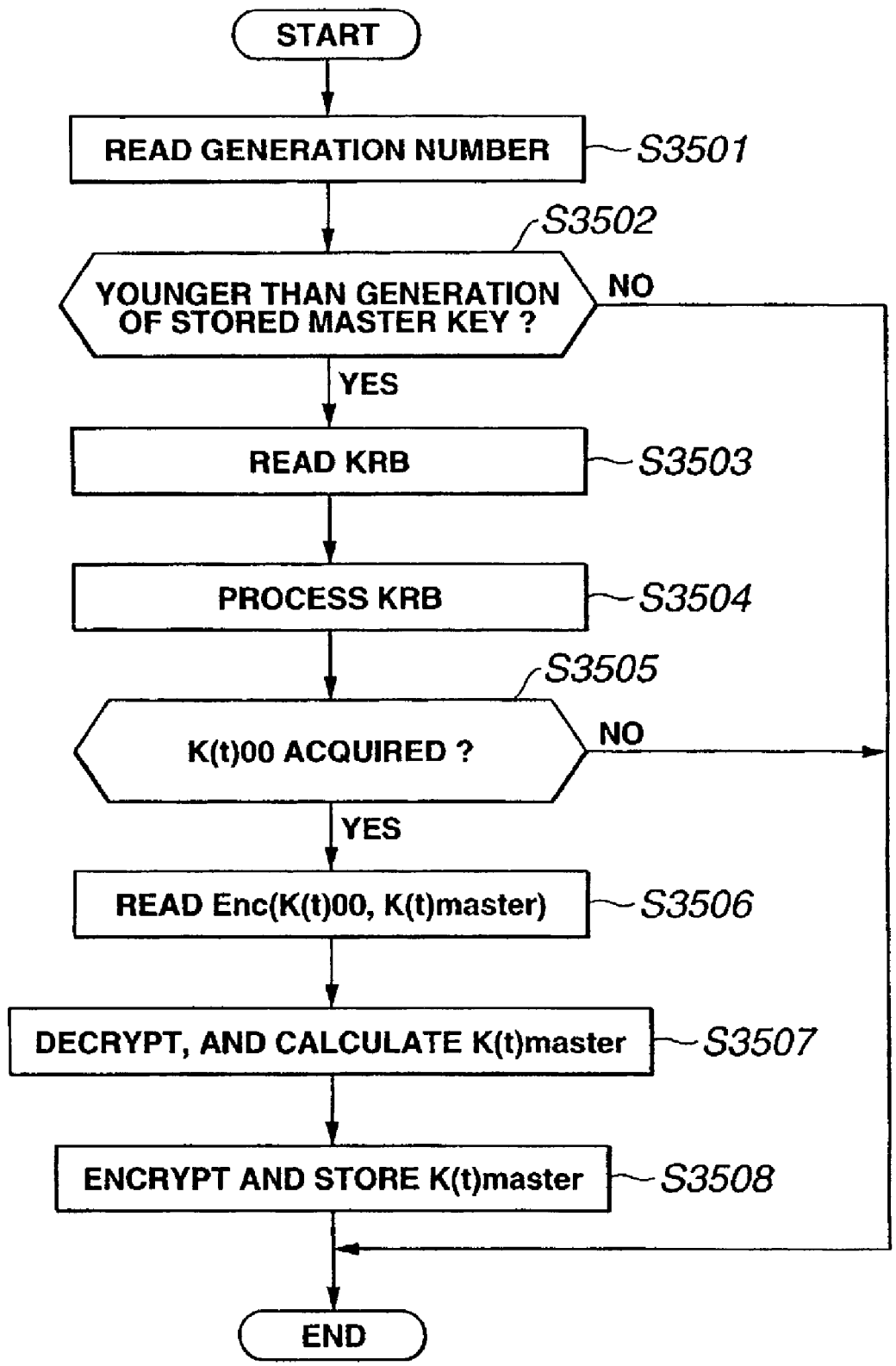
FIG. 35 shows a flow of operations made in the decryption using the key renewal block (KRB) for the master key in the information recorder/player according to the present invention.

Also, the acquisition of the renewed master key will be described with reference to the flow chart shown in FIG. 35. It is assumed here that the recorder/player is granted the latest master key K(c)master at the time of shipment and has it safely stored in its own memory (more precisely, as encrypted with its own leaf key).

When the recoding medium having the renewed master key K(n)master and KRB stored therein is set in the recorder/player, the latter will read, first in step S3501, the generation number n of the master key K(n)master (will be referred to as "prerecording generation information Generation #n" hereunder) from the recording medium. The recording medium has a generation number n of a master key K(n)master prestored there. Then, the recorder/player reads the encrypted master key C from its own memory. In step S3502, it makes a comparison between the generation number c of its own encrypted master key and a generation number n indicated by the prerecording generation information Generation #n to judge which is larger or smaller, the generation numbers c or n.

If the recorder/player has judged in step S3502 that the generation number n indicated by the prerecording generation information Generation #n is not larger than the generation c of the encrypted master key C stored in its own the memory, that is, if the generation number c of the encrypted master key C stored in the memory is as large as or larger than the generation number n indicated by the prerecording generation information Generation #n, the recorder/player will skip over steps S3503 to 3508 and exit the master key renewing procedure. In this case, since it is not necessary to renew the master key K(c)master (encrypted master key C) stored in the memory of the recorder/player, so the renewal will not be done.

On the other hand, if the recorder/player has judged in step S3502 that the generation number n indicated by the prerecording generation information Generation #n is larger than the generation number c of the encrypted master key C stored in the memory, that is, if the generation number c of the encrypted master key C stored in the memory is smaller than the generation number n indicated by the prerecording generation information Generation #n, the recorder/player will go to step S3503 where it will read a key renewal block (KRB) from the recording medium.

In step S3504, the recorder/player calculates a key K(t)00 for the node 00 at a time (time t in FIG. 34) indicated by the prerecording generation information Generation #n from KRB having been read in step S3503, leaf key (K0000 for the device 0 in FIG. 32) and node keys (K000 and K00, . . . for the device 0 in FIG. 32), stored in the memory thereof.

In step S3505, it is examined whether K(t)00 has been acquired in step S3504. If not, it means that the recorder/player has been revoked from the group in the tree-structure at that time, and so the recorder/player will skip over steps S3506 to 3508 and exits the master key renewing procedure.

If K(t)00 has been acquired, the recorder/player goes to step S3506 where it will read a value derived from encryption of the master key at the time t with Enc(K(t)00, K(t)master), namely, K(t)00, read from the recording medium. In step S3507, the recorder/player calculates K(t) master by decrypting the encrypted value with K(t)00.

In step S3508, the recorder/player encrypts K(t)master with its own leaf key (K0000 for the device 0 in FIG. 32) and stores it into the memory. Here, the recorder/player will exit the master key renewing procedure.

It should be reminded here that the master key is used in the ascending order from the time (generation) 0 but each of devices in the system should desirably be able to acquire, by calculation, an older-generation master key from a new-generation master key. That is, the recorder/player should own a one-way function f and create a master key in an examined generation by applying its own master key to the one-way function f for a number of times corresponding to a difference between the generation of the master key and that of a necessary master key.

More particularly, for example, in case the generation number of a master key MK stored in the recorder/player is i+1 while the generation number of a masker key MK necessary for playback of a data (having been used for recording the data) is i−1, the recorder/player creates a master key K(i−1)master by using the one-way function f twice and calculating f(f(K(i+1)master)).

Also, in case the generation number of the master key stored in the recorder/player is i+1 while that of the necessary master key is i−2, the recorder/player creates a master key K(i−2)master by using the one-way function f twice and calculating f(f(f(K(i+1)master))).

The one-way function may be a hash function for example. More particularly, the hash function may be MD5 (message digest 5), SHA-1 (secure hash algorithm-1) or the like for example. A key issuing institution should determine master keys K(0)master, K(1)master, K(2)master, . . . , K(n)master with which a generation older than the generation of the master key for the device in consideration can be pre-created using these one-way functions. That is, first of all, a master key K(N)master of a generation No. N should be set and the one-way function be applied once to the master key K(N)master, thereby creating master keys K(N−1)master, K(N−2)master, . . . , K(1)master, K(0)master of the preceding generations one after another. The master keys should be used one after another starting with the master key K(0)master of the earliest generation. Note that it is assumed that the one-way function used to create a master key of a generation older than the generation for the device in consideration is set in all the recorder/players.

Also, as the one-way function, there may be used the public key cryptography for example. In this case, the key issuing institute should own a private key which is based on the public key cryptography, and issue a public key corresponding to the private key to each of all the players. The key issuing institute should set a 0-th generation master key K(0)master and use master keys starting with K(0)master. That is, when the key issuing institute needs a master key K(i)master younger than the first-generation master key, it converts a master key K(i−1)master one generation older than the master key K(i)master with the private key to create the master key K(i)master for use. Thus, the key issuing institute has not to pre-create the master key of the generation No. N using the one-way function. With this way of key creation, it is theoretically possible to create a master key over all generations. Note that if the recorder/player has a master key of a generation, it will be able to convert the master key with the public key to acquire a master key of a generation older than that generation.

[5. Storage of Key Renewal Block (KRB) Into Recording Medium by Recorder/Player]

In the above example, a key renewal block (KRB) is prestored in a recording medium. However, the recorder/player can record a KRB received from any other device via the input/output I/F, IC card, modem or the like to a recording medium when it initially records data to the recording medium or each time it records data to the recording medium.

Figure 36:
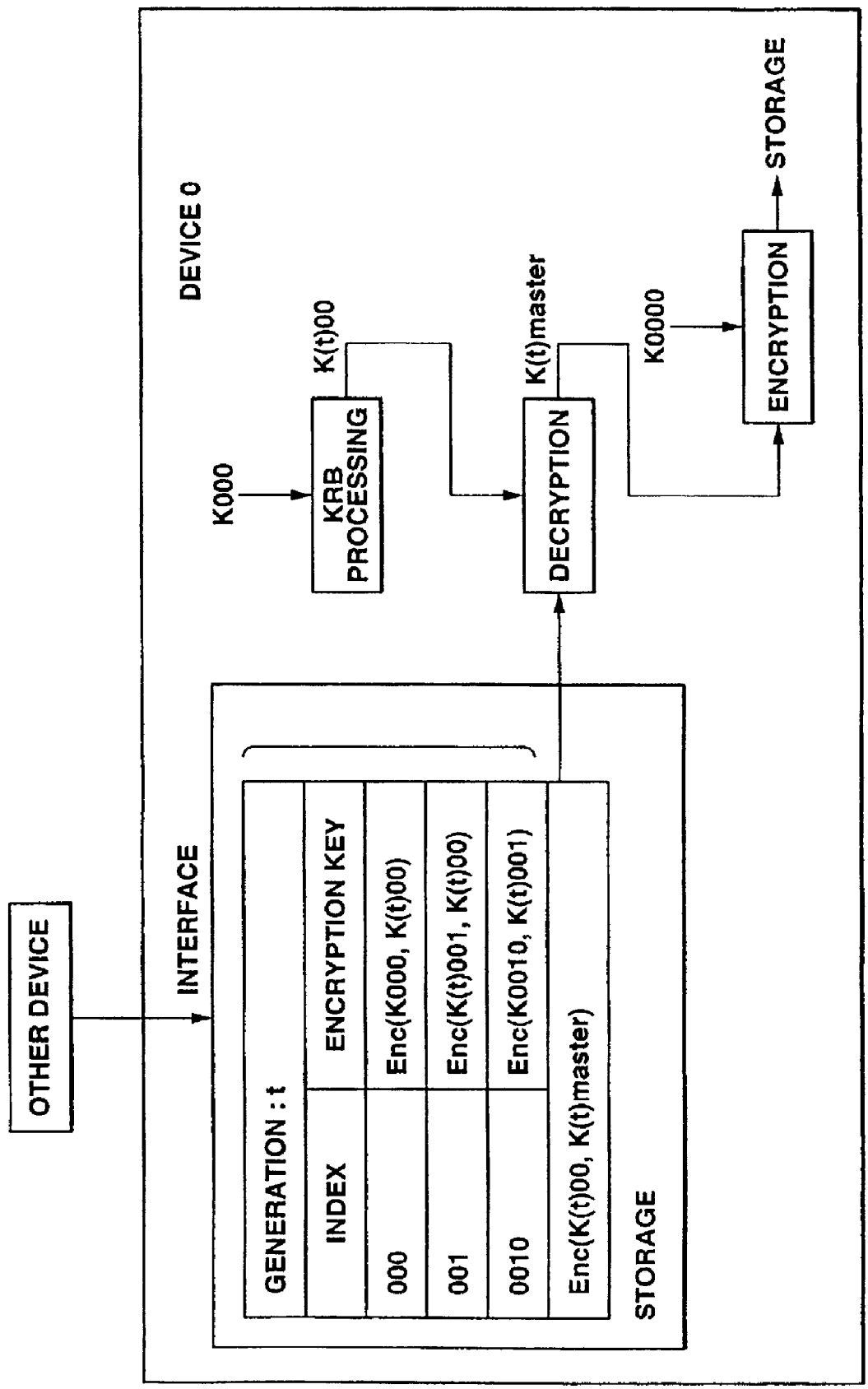
FIG. 36 is a block diagram explaining a procedure, followed in the information recorder/player according to the present invention, for receiving KRB from outside via a communications means or the like and storing it into a recording medium.
Figure 37:
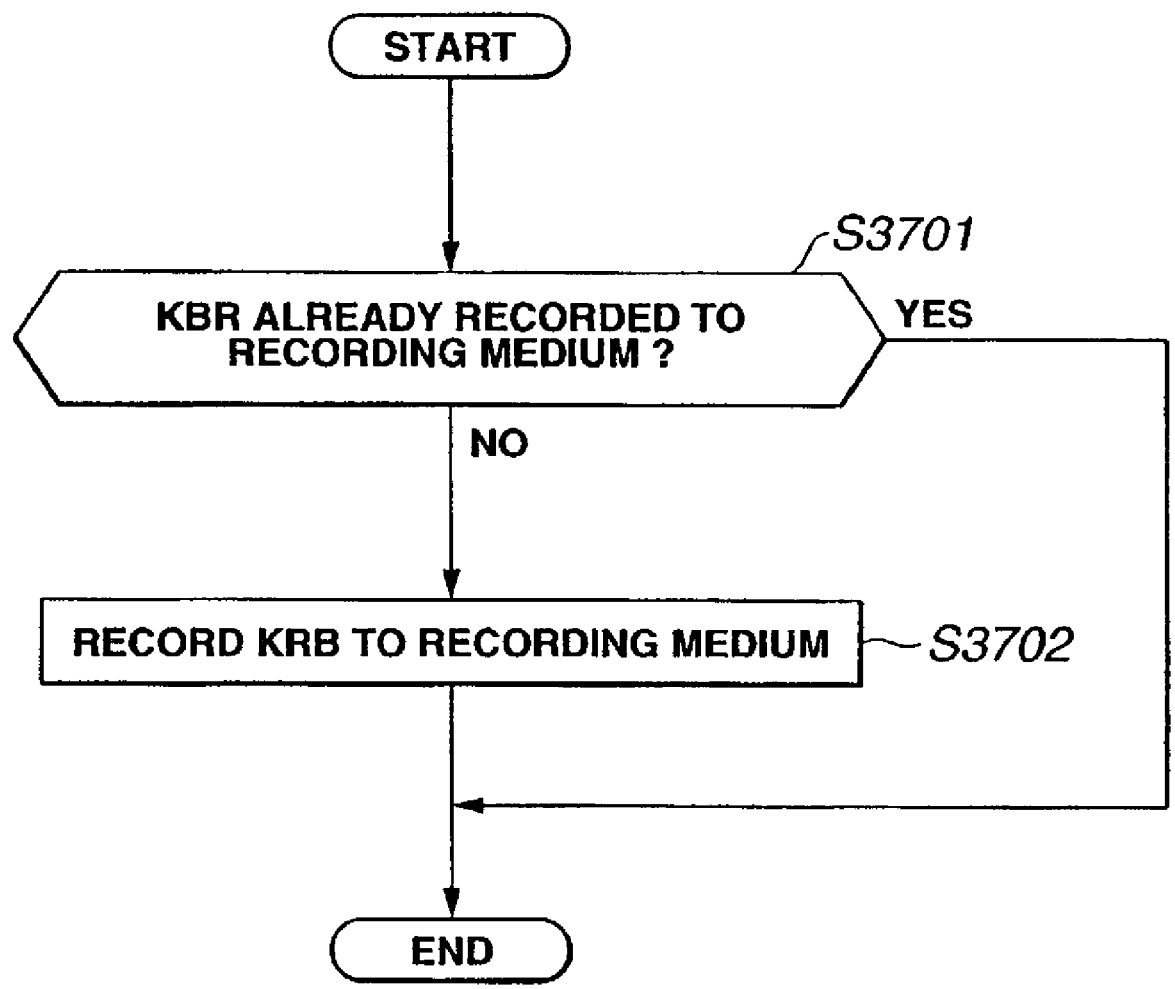
FIG. 37 shows a flow of operations effected in receiving KRB from outside via the communications means or the like and storing into a recording medium in the information recorder/player according to the present invention.
Figure 38:
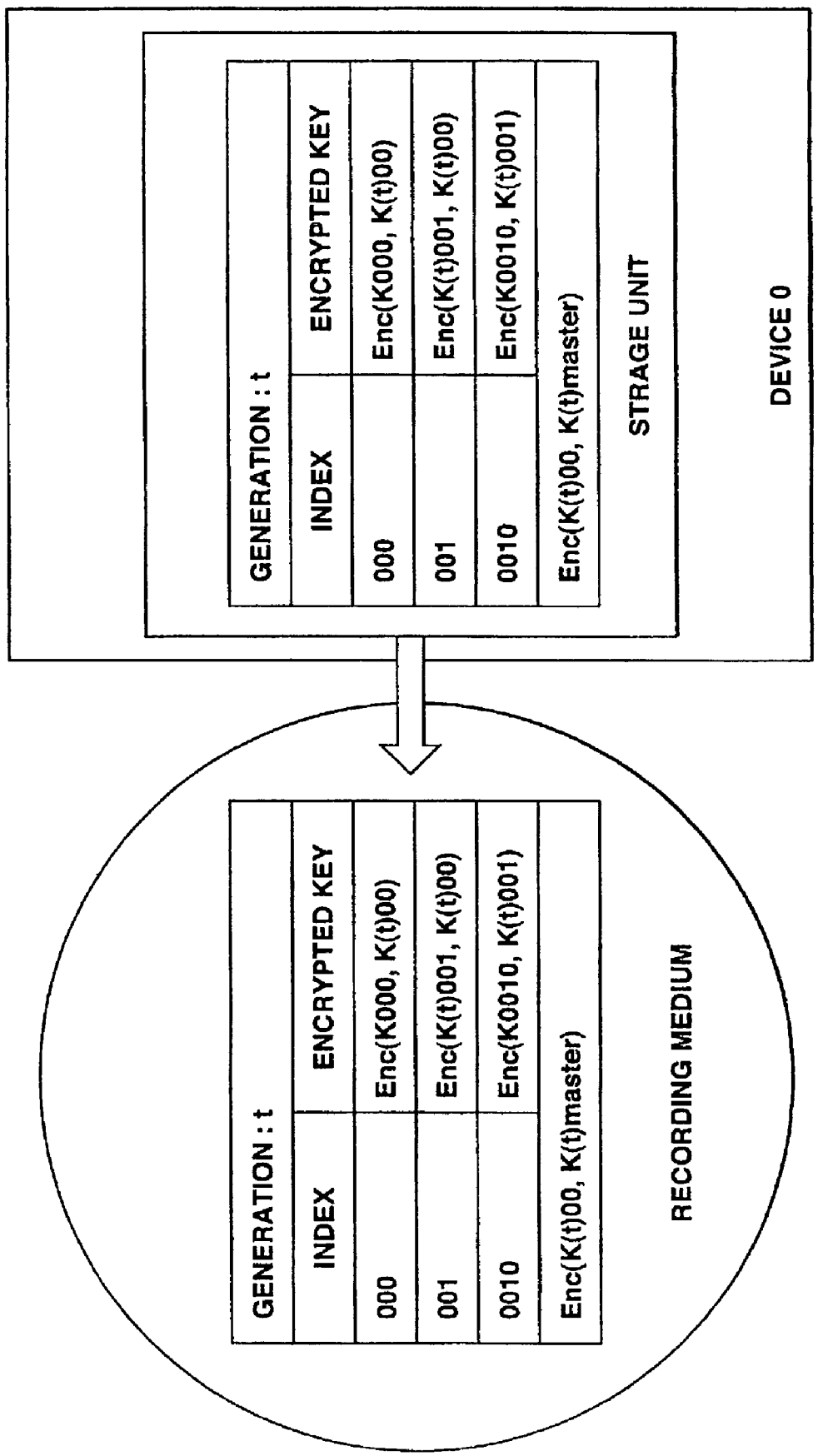
FIG. 38 explains the procedure, followed in the information recorder/player according to the present invention, for receiving KRB from outside via the communications means or the like and storing it into a recording medium.

That is, as shown in FIG. 36, the recorder/player may also be adapted to acquire a KRB and unencrypted data derived from encryption of a master key with a node key in advance via the input/output I/F, IC card, modem or the like, store them in its own memory, and process them as in the flow chart in FIG. 37 when recording content data to the recording medium.

Operations of the recorder/player in KRB recording to a recording medium will be described with reference to FIG. 37. In step S3701, the recorder/player checks whether a KRB is already recorded in a recording medium to which data is going to be recorded. If KRB is found already recorded in the recording medium, the recorder/player skips over step S3702 and exits the KRB storing procedure (goes to content data recording procedure). If no KRB is found recorded in the recording medium, the recorder/player goes to step S3702 where it will record KRB stored in its own memory and unencrypted data derived from encryption of a master key to the recording medium. After completion of this KRB storing procedure, the recorder/player will go to content data recording procedure).

Figure 39:
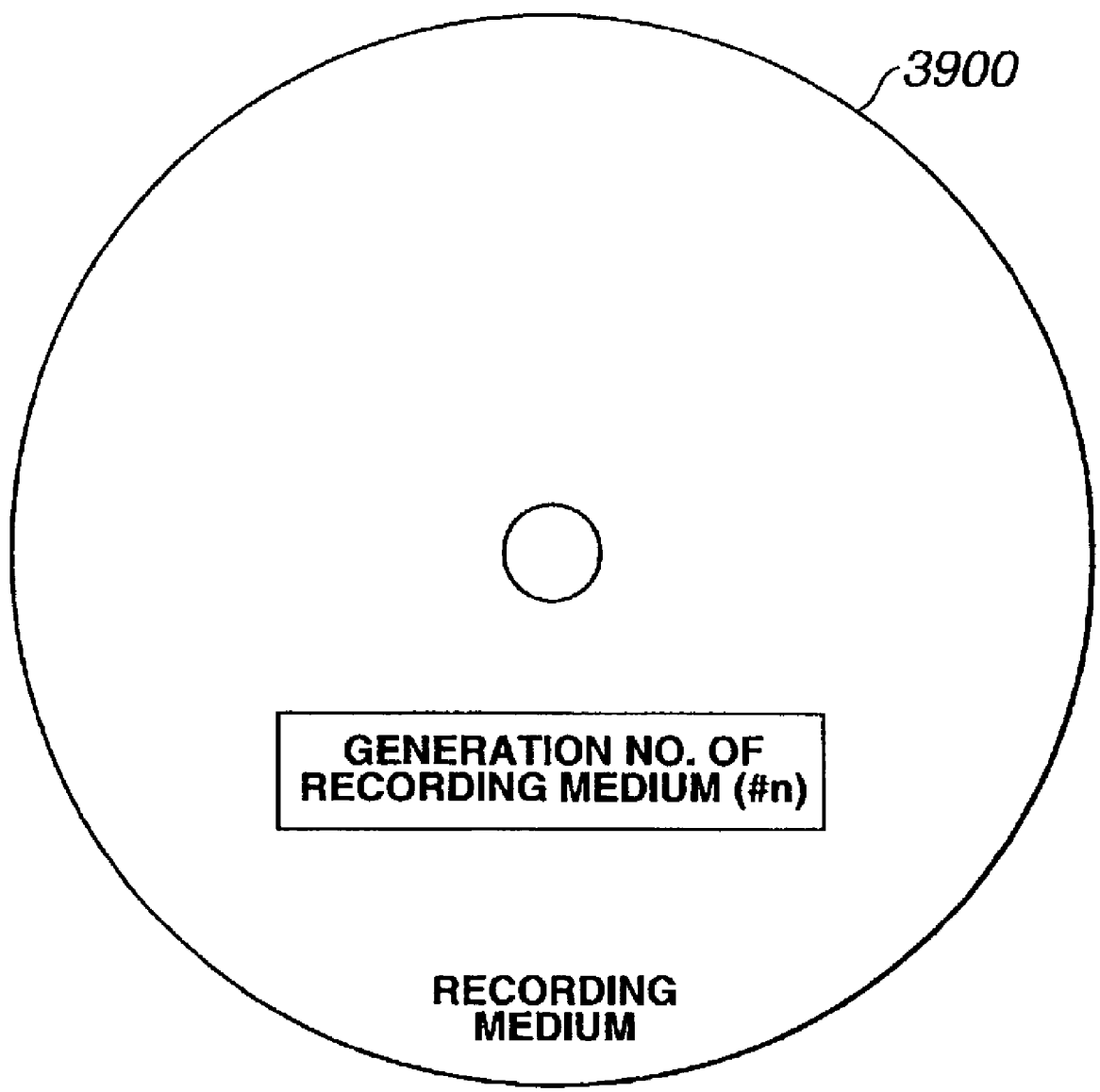
FIG. 39 shows an example of the recording medium usable in the system according to the present invention.

FIG. 39 shows an example construction of the recording medium used in this embodiment. A recording medium generation number is stored into the recording medium shown in FIG. 39. The recording medium is generally indicated with a reference 3900. The recording medium 3900 has recorded therein a generation number (Generation #n) as generation information indicative of the smallest generation number of a master key MK necessary for data recording and playback to and from the recording medium 3900. It should be reminded that the generation n umber (Generation #n) is prerecorded into a recording medium 3900 being produced for example, and similar to the aforementioned prerecording generation information (prerecording Generation #n).

The smallest generation number of the master key MK necessary for recording or playing back data to or from the recording medium 3900 shown in FIG. 39 is n. The generation number n is given as a sequential generation number. If the generation number of a master key stored in the memory of the recording/player is smaller than the generation number n, recording to, or playback from, the recording medium 3900 in FIG. 39 will be rejected.

For recording or playing back data to or from the recording medium 3900 having a generation number (prerecording generation number) recorded therein, set in the recorder/player, the recorder/player makes a comparison between the generation number (prerecording generation number) and generation number of the master key stored in the recorder/player. If the generation number of the master key stored in the memory of the recorder/player is smaller than the generation number (prerecording generation number) n of the recording medium, the recorder/player cannot record any data to, or play back any data from, the recording medium 3900 in FIG. 39.

As mentioned above, the smallest generation number of the master key MK necessary for data recording or playback to or from the recording medium 3900 in FIG. 39 is n. If the generation number of the master key stored in the memory of the recorder/player is as large as or larger than the smallest generation number n, the recorder/player can record data to the recording medium 3900 in FIG. 39. However, if the generation number of the master key stored in the memory of the recorder/player is smaller than the smallest generation number n, the recorder/player is not allowed to record data to the recording medium 3900. Even if the recording medium 3900 has data recorded therein with any older-generation master key by an inappropriate device, an appropriate device will not play back the data from the recording medium 3900. Also, since data legally recorded to the recording medium 3900 has been encrypted with a master key having a generation number as large as or larger than the smallest generation number n without fail, if the generation number of the master key stored in the memory of the recorder/player is smaller than the smallest generation number n, the recorder/player cannot decrypt (play back) data from the recording medium.

Note that the prerecording generation information Generation #n is recorded in an area of the recording medium 3900 where it cannot be rewritten (unrewritable area), for example, in the lead-in area, whereby the key table and prerecording generation information Generation #n are prevented from illegally being rewritten.

The device is designed so that recording of data to the recording medium 3900 shown in FIG. 39 cannot be done (allowed) without a master key MK of a generation younger than that indicated by the prerecording generation information in the recording medium 3900. Therefore, as the recording medium 3900 having recorded therein a prerecording generation information Generation #n indicating a generation is distributed, the renewal of the master key in a recorder which records data to the recording medium 3900 or a recorder/player (in FIG. 6) which can record or play back to or from the recording medium 3900 is promoted, whereby the number of the recorders or recorder/players using a master key MK having a generation smaller than Generation #n decreases with the result that it is possible to prevent data from illegally being decrypted.

That is to say, a recorder having the master key thereof not renewed can record data to the recording medium (optical disc) 150 shown in FIG. 4 and having no prerecording generation information recorded therein. An information player having the master key thereof not renewed will be able to play the optical disc 150 having data thus recorded therein. On the other hand, recording of data to the recording medium 3900 having the prerecording generation information recorded therein and having been described with reference to FIG. 39 is not allowed unless there is available a master key MK of a generation younger than the generation indicated by the prerecording generation information. Namely, since recording of data to the recording medium 3900 needs a master key of a generation younger than the generation indicated by the prerecording generation information recorded in the recording medium 3900, it is possible to prevent a recorded having the master key thereof not renewed from recording data to the recording medium 3900.

Note that the master key renewing procedure may be such that a key renewal block (KRB) and unencrypted data derived from encryption of an encrypted master key with a node key are acquired via an input/output I/F, IC card, modem or the like and a renewed master key can be acquired by processing the KRB. Since only a device having node key and leaf key with which KRB can be decrypted as in the above can process KRB, it is not necessary to make any mutual authentication for distribution of KRB and only an appropriate device can acquire a renewed master key.

[6. Construction of the Data Processor]

Figure 40:
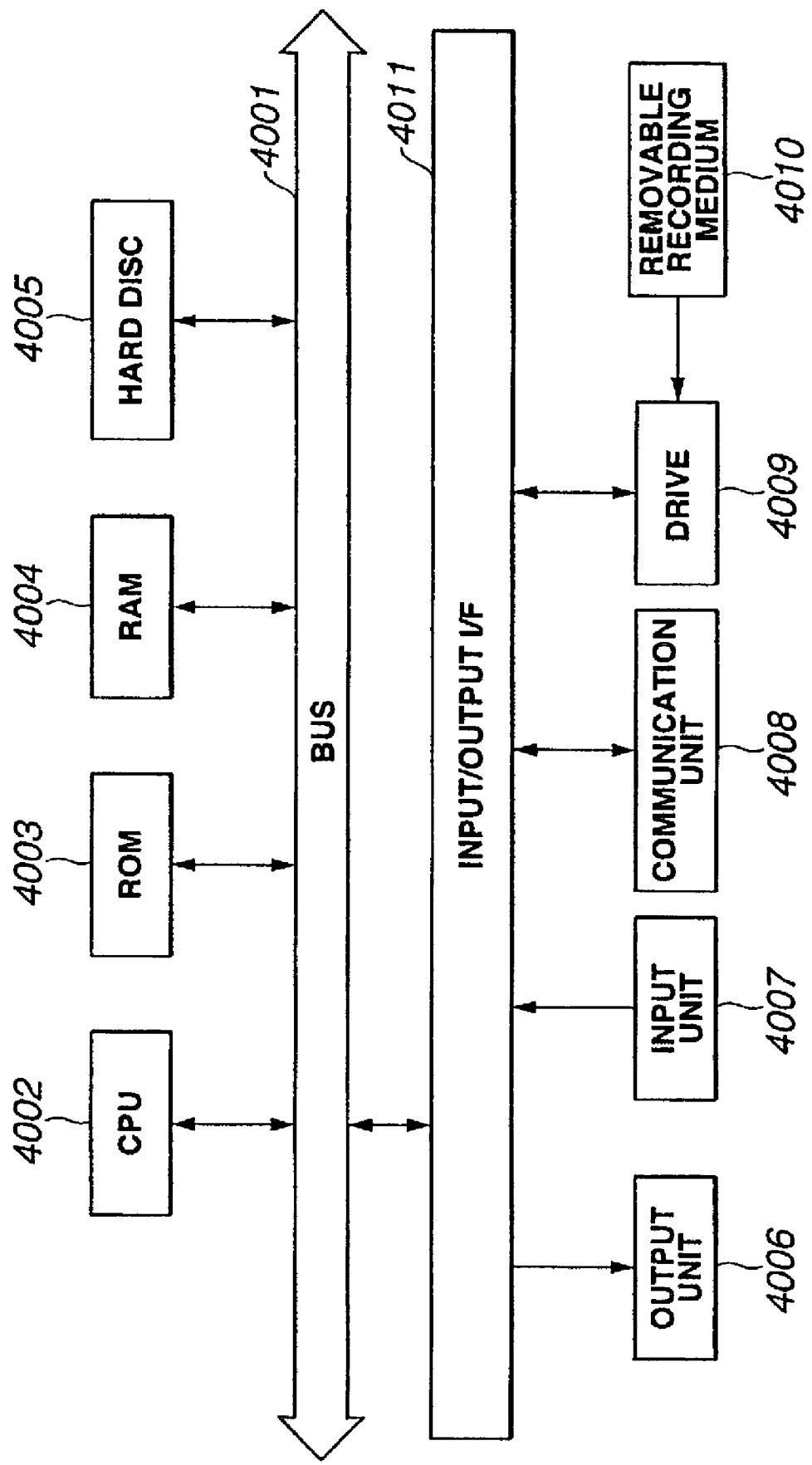
FIG. 40 is a block diagram showing the construction of the data processor which processes data by software in the information recorder/player according to the present invention.

Note that the aforementioned series of operations can be done by a hardware or by a software. Namely, the cryptography unit 650 for example can be formed from an encryption/decryption LSI and also the cryptography, namely, the encryption/decryption, by the cryptography unit 650 can be done by having a general-purpose computer or a one-chip microcomputer execute a corresponding program. For effecting the series of operations by a software, a program including the software is installed in a general-purpose computer, one-chip microcomputer or the like. FIG. 40 shows an example construction of one embodiment of a computer in which the program for the series of operations is installed.

The program can be prerecorded in a hard disc 4005 and ROM 4003 as recording media incorporated in the computer. Alternatively, the program may be stored (recorded) provisionally or permanently in a removable recording medium 4010 such as a floppy disc, CD-ROM (compact disc read-only memory), MO (magneto-optical) disc, DVD (digital versatile disc), magnetic disc, semiconductor memory or the like. Such a removable recording medium 4010 can be provided as a so-called package software.

It should be reminded that the program can be installed from the aforementioned removable recording medium 4010 to a computer, otherwise, transferred from a download site to the computer by a radio communication network over a digital broadcasting satellite or transferred to the computer over a cable via a network such as LAN (local area network), Internet or the like, the computer receives the program thus transferred by a communication unit 4008 thereof and install it into the built-in hard disc 4005.

The computer incorporates a CPU (central processing unit) 4002 as shown. The CPU 4002 is connected to an input/output interface 4011 via a bus 4001. When the CPU 4002 is supplied with an instruction from an input unit 4007 operated by the user, such as a keyboard, mouse or the like via the input/output interface 4011, it executes the program stored in a ROM (read-only memory) 4003.

Alternatively, the CPU 4002 loads, into a RAM (random-access memory) 4004 for execution, a program stored in the hard disc 4005, a program transferred from a satellite or network, received by the communication unit 4008 and installed into the hard disc 4005 or a program read from the removable recording medium 4010 set in a drive 4009 and installed into the hard disc 4005.

Thus, the CPU 4002 makes operations as in the aforementioned flow charts or operations as in the aforementioned block diagrams. The CPU 4002 outputs results of these operations from an output unit 4006 such as an LCD (liquid crystal display) or speaker, or transmits them from the communication unit 4008, or records them to the hard disc 4005, via the input/output interface 4011, as necessary.

Note that the operations or processes to describe a program which allows the computer to do a variety of operations may not always be done in the time sequence as in the flow charts but may include ones which are executed in parallel or individually (parallel processes or processes by objects, for example).

The program may be a one which can be executed by a single computer or in a decentralized manner by a plurality of computers. Further, the program may be a one which can be transferred to a remote computer for execution.

In the above, the present invention has been described concerning the example that a cryptography block formed from one-chip encryption/decryption LSI encrypts and decrypts a content. Note however that the content encryption/decryption block may also be a single software module which is to be executed by a CPU.

In the foregoing, the present invention has been described in detail concerning specific embodiments thereof. However, it will be apparent that the present invention can be modified or altered by those skilled in the art without departure from the scope and spirit thereof. That is, the embodiments of the present invention has been described by way of example and the present invention is not limited to these embodiments. The substance of the present invention is referred to the claims defined later.

INDUSTRIAL APPLICABILITY

In the information recording/playback apparatus and method according to the present invention, when the device has not the first key of a necessary generation for data recording or playback, a message for prompting to renew the key is displayed to the user, thereby permitting to accelerate the key renewal for the entire system and prevent data from illegally being copied.

In addition, in the information recording/playback apparatus and method according to the present invention, when the device has not the first key of the necessary generation for data recording or playback, a key of the necessary generation is acquired from an external device, thereby permitting to accelerate the key renewal for the entire system and prevent data from illegally being copied.

Further in the information recording/playback apparatus and method according to the present invention, the cryptography unit can be used to create a key of an older generation based on a key of a generation stored in the device, thereby permitting to prevent data from illegally being copied while maintaining the interoperability.

Further, the information recording medium according to the present invention has stored therein generation information indicating the generation of a key usable for data encryption or decryption, and an information recorder/player makes a comparison between the generation of a key stored therein and the generation information stored in the recording medium to judge whether data recording or playback can be done or not. Therefore, it is possible to prevent data from being copied with a key of an older generation, which is now invalid.

Further in the key renewing terminal and method according to the present invention, a renewed key can be acquired via a key renewing terminal provided separately to a recorder/player. For example, a device which has to renew the master key because the master key of any other device belonging to the same category has been uncovered, can establish a communication path to a key issuing institute via the key renewing terminal, and thus the terminals belonging to the same category can be supported in different manners, respectively.

Further in the information recording/playback apparatus and method according to the present invention, since renewal data for a master key is transmitted along with a key renewal block (KRB) by the tree-structural key distribution system, so a decryptable master key can be transmitted or distributed only to a device in which the key have to be renewed and thus the size of a message to be distributed can be reduced. Further, a key which is decryptable only by a specific group of devices defined by the tree structure and which cannot be decrypted by any other devices not belonging to the group, can be distributed so that the security of the key distribution or delivery can be assured.

What is claimed is:

1. An information recorder for recording information to a recording medium, the apparatus comprising:
   a cryptography means for encrypting information to be recorded to the recording medium by a cryptography with a generation-managed encryption key which is renewed to a different key for each generation; and
   a user interface for making a comparison between generation information on a device-stored generation-managed encryption key stored in a storage means of the information recorder and prerecording generation information which is recording-medium generation information prestored in the recording medium, and outputting a warning when the comparison result is that the prerecording generation information is newer than the generation information on the device-stored generation-managed encryption key.

2. The apparatus according to claim 1, wherein the device-stored generation-managed encryption key is a master key stored in common to a plurality of information recorders.

3. The apparatus according to claim 1, wherein the cryptography means includes means for renewing, when the prerecording generation information is newer than the generation information on the device-stored generation-managed encryption key, a generation-managed encryption key of a generation as young as or younger than that indicated by the prerecording generation information.

4. The apparatus according to claim 1, wherein the cryptography means includes means for creating, based on the device-stored generation-managed encryption key, a generation-managed encryption key whose generation information is older than the generation information on the device-stored generation-managed encryption key.

5. The apparatus according to claim 1, wherein:
   the cryptography means includes means for renewing, when the prerecording generation information is newer than the generation information on the device-stored generation-managed encryption key, a generation-managed encryption key of a generation as young as or younger than that indicated by the prerecording generation information; and
   the key renewing means decrypts an encrypted to-be-renewed generation-managed encryption key with a device key stored in the information recorder to create an renewed generation-managed encryption key.

6. The apparatus according to claim 5, wherein the cryptography means acquires a key table in which the encrypted to-be-renewed generation-managed encryption key and a decrypting device key identifier are correlated with each other to decrypt the encrypted to-be-renewed generation-managed encryption key with a device key identified based on the device key identifier in the key table.

7. The apparatus according to claim 5, wherein the device key is a key common to information recorders grouped by categorization into a common category.

8. The apparatus according to claim 5, wherein the device key is a key common to information recorders enclosed in the same group by grouping based on serial numbers assigned to the information recorders.

9. The apparatus according to claim 1, wherein:
   there are held a node key unique to each of nodes included in a hierarchical tree structure including a plurality of different information recorders each as a leaf and a leaf key unique to each of the information recorders; and
   the generation-managed encryption key is a key which can be renewed with at least either the node key or leaf key.

10. The apparatus according to claim 9, wherein the generation-managed encryption key is a master key common to the plurality of information recorders.

11. The apparatus according to claim 9, wherein:
    the node key can be renewed;
    there is distributed, when a node key is to be renewed, a key renewal block (KRB) derived from encryption of the renewed node key with at least either a node key or leaf key on a lower stage of the tree structure to an information recorder at a leaf where the node key has to be renewed; and
    the cryptography means in the information recorder receives renewal data for the generation-managed encryption key encrypted with the renewed node key, encrypts the key renewal block (KRB) to acquire the renewed node key, and acquires renewal data for the generation-managed encryption key based on the thus-acquired renewed node key.

12. The apparatus according to claim 9, wherein:
    the key renewal block (KRB) is stored in a recording medium; and
    the cryptography means encrypts the key renewal block (KRB) read from the recording medium.

13. The apparatus according to claim 9, wherein:
the generation-managed encryption key has a generation number as renewal information correlated therewith; and
the cryptography means stores, as a recording generation number into the recording medium, a generation number of the generation-managed encryption key having been used for storing encrypted data into the recording medium.

14. An information recorder for recording information to a recording medium, the apparatus comprising:
a cryptography means for encrypting information to be recorded to the recording medium by a cryptography with a generation-managed encryption key which is renewed to a different key for each generation; and
a key acquiring means for making a comparison between generation information on a device-stored generation-managed encryption key stored in a storage means of the information recorder and prerecording generation information which is recording-medium generation information prestored in the recording medium, and acquiring a generation-managed encryption key of a generation as young as or younger than that indicated by the prerecording generation information when the comparison result is that the prerecording generation information is newer than the generation information on the device-stored generation-managed encryption key.

15. The apparatus according to claim 14, wherein the key acquiring means includes a communication interface capable of receiving data via a network.

16. The apparatus according to claim 14, wherein the key acquiring means includes a communication modem capable of receiving data via a telephone line.

17. The apparatus according to claim 14, wherein the key acquiring means includes an I/C card interface capable of receiving data via an IC card.

18. The apparatus according to claim 14, wherein:
the cryptography means makes a mutual authentication with a key serving means when the key acquiring means is going to acquire the generation-managed encryption key; and
the key acquiring means effects the acquisition of the generation-managed key only when the mutual authentication with the key serving means has successfully been made.

19. The apparatus according to claim 14, wherein the device-stored generation-managed encryption key is a master key common to a plurality of information recorders.

20. The apparatus according to claim 14, wherein the cryptography means includes means for renewing, when the prerecording generation information is newer than the generation information on the device-stored generation-managed encryption key, a generation-managed encryption key of a generation as young as or younger than that indicated by the prerecording generation information.

21. The apparatus according to claim 14, wherein the cryptography means includes a key creating means for creating, based on the device-stored generation-managed encryption key, a generation-managed encryption key whose generation information is older than the generation information on the device-stored generation-managed encryption key.

22. The apparatus according to claim 14, wherein:
the cryptography means includes means for renewing, when the prerecording generation information is newer than the generation information on the device-stored generation-managed encryption key, a generation-managed encryption key of a generation as young as or younger than that indicated by the prerecording generation information; and
the key renewing means decrypts an encrypted to-be-renewed generation-managed encryption key with a device key stored in the information recorder to create an renewed generation-managed encryption key.

23. The apparatus according to claim 22, wherein the cryptography means acquires a key table in which the encrypted to-be-renewed generation-managed encryption key and a decrypting device key identifier are correlated with each other to decrypt the encrypted to-be-renewed generation-managed encryption key with a device key identified based on the device key identifier in the key table.

24. The apparatus according to claim 22, wherein the device key is a key common to information recorders grouped by categorization into a common category.

25. The apparatus according to claim 22, wherein the device key is a key common to information recorders enclosed in the same group by grouping based on serial numbers assigned to the information recorders.

26. The apparatus according to claim 14, wherein:
there are held a node key unique to each of nodes included in a hierarchical tree structure including a plurality of different information recorders each as a leaf and a leaf key unique to each of the information recorders; and
the generation-managed encryption key is a key which can be renewed with at least either the node key or leaf key.

27. The apparatus according to claim 26, wherein the generation-managed encryption key is a master key common to the plurality of information recorders.

28. The apparatus according to claim 26, wherein:
the node key can be renewed;
there is distributed, when a node key is to be renewed, a key renewal block (KRB) derived from encryption of the renewed node key with at least either a node key or leaf key on a lower stage of the tree structure to an information recorder at a leaf where the node key has to be renewed; and
the cryptography means in the information recorder receives renewal data for the generation-managed encryption key encrypted with the renewed node key, encrypts the key renewal block (KRB) to acquire the renewed node key, and acquires renewal data for the generation-managed encryption key based on the thus-acquired renewed node key.

29. The apparatus according to claim 26, wherein:
the key renewal block (KRB) is stored in a recording medium; and
the cryptography means encrypts the key renewal block (KRB) read from the recording medium.

30. The apparatus according to claim 26, wherein:
the generation-managed encryption key has a generation number as renewal information correlated therewith; and
the cryptography means stores, as a recording generation number into the recording medium, a generation number of the generation-managed encryption key having been used for storing encrypted data into the recording medium.

31. An information recorder for recording information to a recording medium, the apparatus comprising:
a cryptography means for encrypting information to be recorded to the recording medium by a cryptography with a generation-managed encryption key which is renewed to a different key for each generation; and a key renewing terminal connecting interface for connection of a key renewing terminal which makes a comparison between generation information on a device-stored generation-managed encryption key stored in a storage means of the information recorder and prerecording generation information which is recording-medium generation information prestored in the recording medium, and acquires a generation-managed encryption key of a generation as young as or younger than that indicated by the prerecording generation information when the comparison result is that the prerecording generation information is newer than the generation information on the device-stored generation-managed encryption key.

32. The apparatus according to claim 31, wherein:

a mutual authentication with the key renewing terminal is effected to acquire the generation-managed encryption key from the key renewing terminal; and the acquisition of the generation-managed encryption key is effected only when the mutual authentication with the key renewing terminal has successfully been made.

33. The apparatus according to claim 31, wherein:

there are held a node key unique to each of nodes included in a hierarchical tree structure including a plurality of different information recorders each as a leaf and a leaf key unique to each of the information recorders; and the generation-managed encryption key is a key which can be renewed with at least either the node key or leaf key.

34. The apparatus according to claim 33, wherein the generation-managed encryption key is a master key common to the plurality of information recorders.

35. The apparatus according to claim 33, wherein:

the node key can be renewed;

there is distributed, when a node key is to be renewed, a key renewal block (KRB) derived from encryption of the renewed node key with at least either a node key or leaf key on a lower stage of the tree structure to an information recorder at a leaf where the node key has to be renewed; and the cryptography means in the information recorder receives renewal data for the generation-managed encryption key encrypted with the renewed node key, encrypts the key renewal block (KRB) to acquire the renewed node key, and acquires renewal data for the generation-managed encryption key based on the thus-acquired renewed node key.

36. The apparatus according to claim 33, wherein:

the key renewal block (KRB) is stored in a recording medium; and the cryptography means encrypts the key renewal block (KRB) read from the recording medium.

37. The apparatus according to claim 33, wherein:

the generation-managed encryption key has a generation number as renewal information correlated therewith; and the cryptography means stores, as a recording generation number into the recording medium, a generation number of the generation-managed encryption key having been used for storing encrypted data into the recording medium.

38. An information player for playing back information from a recording medium, the apparatus comprising:

a cryptography means for decrypting information read from the recording medium by a cryptography with a generation-managed encryption key which is renewed to a different key for each generation; and a user interface for making a comparison between generation information on a device-stored generation-managed decryption key stored in a storage means of the information player and recording generation information which is generation information having been used for recording the information to the recording medium, and outputting a warning when the comparison result is that the recording generation information is newer than the generation information on the device-stored generation-managed decryption key.

39. The apparatus according to claim 38, wherein the cryptography means does not make any information decryption when a comparison made between the recording generation information which is generation information having been used for recording the information to the recording medium and prerecording generation information which is recording medium generation information prestored in the recording medium shows that the prerecording generation information is newer than the recording generation information.

40. The apparatus according to claim 38, wherein the device-stored generation-managed decryption key is a master key stored in common to a plurality of information players.

41. The apparatus according to claim 38, wherein the cryptography means includes means for renewing, when the prerecording generation information is newer than the generation information on the device-stored generation-managed decryption key, a generation-managed decryption key of a generation as young as or younger than that indicated by the prerecording generation information.

42. The apparatus according to claim 38, wherein the cryptography means includes a key creating means for creating, based on the device-stored generation-managed decryption key, a generation-managed decryption key whose generation information is older than the generation information on the device-stored generation-managed decryption key.

43. The apparatus according to claim 38, wherein the cryptography means includes means for renewing, when the recording generation information is newer than the generation information on the device-stored generation-managed encryption key, a generation-managed encryption key of a generation as young as or younger than that indicated by the prerecording generation information; and the key renewing means decrypts an encrypted to-be-renewed generation-managed encryption key with a device key stored in the information player to create an renewed generation-managed encryption key.

44. The apparatus according to claim 43, wherein the cryptography means acquires a key table in which the encrypted to-be-renewed generation-managed encryption key and a decrypting device key identifier are correlated with each other to decrypt the encrypted to-be-renewed generation-managed encryption key with a device key identified based on the device key identifier in the key table.

45. The apparatus according to claim 43, wherein the device key is a key common to information players grouped by categorization into a common category.

46. The apparatus according to claim 43, wherein the device key is a key common to information players enclosed in the same group by grouping based on serial numbers assigned to the information players.

47. The apparatus according to claim 38, wherein:
there are held a node key unique to each of nodes included in a hierarchical tree structure including a plurality of different information players each as a leaf and a leaf key unique to each of the information players; and
the generation-managed encryption key is a key which can be renewed with at least either the node key or leaf key.

48. The apparatus according to claim 47, wherein the generation-managed encryption key is a master key common to the plurality of information players.

49. The apparatus according to claim 47, wherein:
the node key can be renewed;
there is distributed, when a node key is to be renewed, a key renewal block (KRB) derived from encryption of the renewed node key with at least either a node key or leaf key on a lower stage of the tree structure to an information player at a leaf where the node key has to be renewed; and
the cryptography means in the information player receives renewal data for the generation-managed decryption key encrypted with the renewed node key, encrypts the key renewal block (KRB) to acquire the renewed node key, and acquires renewal data for the generation-managed decryption key based on the thus-acquired renewed node key.

50. The apparatus according to claim 47, wherein:
the key renewal block (KRB) is stored in a recording medium; and
the cryptography means encrypts the key renewal block (KRB) read from the recording medium.

51. The apparatus according to claim 47, wherein:
the generation-managed decryption key has a generation number as renewal information correlated therewith; and
for decryption of encrypted data read from the recording medium, the cryptography means reads, from the recording medium, a generation number of the generation-managed encryption key having been used for encrypting the data and decrypts the encrypted data with a generation-managed decryption key corresponding to the thus-read generation number.

52. An information player for playing back information from a recording medium, the apparatus comprising:
a cryptography means for decrypting information read from the recording medium by a cryptography with a generation-managed decryption key which is renewed to a different key for each generation; and
a key acquiring means for making a comparison between generation information on a device-stored generation-managed decryption key stored in a storage means of the information player and recording generation information which is generation information having been used for recording the information, and acquiring a generation-managed decryption key of a generation as young as or younger than that indicated by the recording generation information when the comparison result is that the recording generation information is newer than the generation information on the device-stored generation-managed decryption key.

53. The apparatus according to claim 52, wherein the cryptography means does not make any information decryption when a comparison made between the recording generation information which is generation information having been used for recording the information to the recording medium and prerecording generation information which is recording medium generation information prestored in the recording medium shows that the prerecording generation information is newer than the recording generation information.

54. The apparatus according to claim 52, wherein the key acquiring means includes a communication interface capable of receiving data via a network.

55. The apparatus according to claim 52, wherein the key acquiring means includes a communication modem capable of receiving data via a telephone line.

56. The apparatus according to claim 52, wherein the key acquiring means includes an I/C card interface capable of receiving data via an IC card.

57. The apparatus according to claim 52, wherein:
the cryptography means makes a mutual authentication with a key serving means when the key acquiring means is going to acquire the generation-managed decryption key; and
the key acquiring means effects the acquisition of the generation-managed key only when the mutual authentication with the key serving means has successfully been made.

58. The apparatus according to claim 52, wherein the device-stored generation-managed decryption key is a master key common to a plurality of information players.

59. The apparatus according to claim 52, wherein the cryptography means includes means for renewing, when the recording generation information is newer than the generation information on the device-stored generation-managed decryption key, a generation-managed decryption key of a generation as young as or younger than that indicated by the recording generation information.

60. The apparatus according to claim 52, wherein the cryptography means includes a key creating means for creating, based on the device-stored generation-managed encryption key, a generation-managed decryption key whose generation information is older than the generation information on the device-stored generation-managed decryption key.

61. The apparatus according to claim 52, wherein:
the cryptography means includes means for renewing, when the recording generation information is newer than the generation information on the device-stored generation-managed decryption key, a generation-managed encryption key of a generation as young as or younger than that indicated by the recording generation information; and
the key renewing means decrypts an encrypted to-be-renewed generation-managed decryption key with a device key stored in the information player to create an renewed generation-managed encryption key.

62. The apparatus according to claim 61, wherein the cryptography means acquires a key table in which the encrypted to-be-renewed generation-managed encryption key and a decrypting device key identifier are correlated with each other to decrypt the encrypted to-be-renewed generation-managed encryption key with a device key identified based on the device key identifier in the key table.

63. The apparatus according to claim 61, wherein the device key is a key common to information players grouped by categorization into a common category.

64. The apparatus according to claim 61, wherein the device key is a key common to information players enclosed in the same group by grouping based on serial numbers assigned to the information players.

65. The apparatus according to claim 52, wherein:
there are provided a node key unique to each of nodes included in a hierarchical tree structure including a plurality of different information players each as a leaf and a leaf key unique to each of the information players; and the generation-managed decryption key is a key which can be renewed with at least either the node key or leaf key.

66. The apparatus according to claim 65, wherein the generation-managed decryption key is a master key common to the plurality of information players.

67. The apparatus according to claim 65, wherein:

the node key can be renewed;

there is distributed, when a node key is to be renewed, a key renewal block (KRB) derived from decryption of the renewed node key with at least either a node key or leaf key on a lower stage of the tree structure to an information player at a leaf where the node key has to be renewed; and the cryptography means in the information player receives renewal data for the generation-managed decryption key encrypted with the renewed node key, encrypts the key renewal block (KRB) to acquire the renewed node key, and acquires renewal data for the generation-managed decryption key based on the thus-acquired renewed node key.

68. The apparatus according to claim 65, wherein:

the key renewal block (KRB) is stored in a recording medium; and the cryptography means encrypts the key renewal block (KRB) read from the recording medium.

69. The apparatus according to claim 65, wherein:

the generation-managed decryption key has a generation number as renewal information correlated therewith; and for decryption of encrypted data read from the recording medium, the cryptography means reads, from the recording medium, a generation number of the generation-managed encryption key having been used for encrypting the data and decrypts the encrypted data with a generation-managed decryption key corresponding to the thus-read generation number.

70. An information player for playing back information from a recording medium, the apparatus comprising:

a cryptography means for decrypting information read from the recording medium by a cryptography with a generation-managed decryption key which is renewed to a different key for each generation; and a key renewing terminal connecting interface for connection of a key renewing terminal which makes a comparison between generation information on a device-stored generation-managed encryption key stored in a storage means of the information player and recording generation information which is generation information having been used for recording the information to the recording medium and acquires a generation-managed decryption key of a generation as young as or younger than that indicated by the generation information on the device-stored generation-managed decryption key when the comparison result is that the recording generation information is newer than the generation information on the device-stored generation-managed decryption key.

71. The apparatus according to claim 70, wherein:

a mutual authentication with a key serving means is effected when the key acquiring means is going to acquire the generation-managed decryption key; and the acquisition of the generation-managed key is effected only when the mutual authentication with the key serving means has successfully been made.

72. The apparatus according to claim 70, wherein:

there are held a node key unique to each of nodes included in a hierarchical tree structure including a plurality of different information players each as a leaf and a leaf key unique to each of the information players; and the generation-managed decryption key is a key which can be renewed with at least either the node key or leaf key.

73. The apparatus according to claim 72, wherein the generation-managed decryption key is a master key common to the plurality of information players.

74. The apparatus according to claim 72, wherein the node key can be renewed, there is distributed, when a node key is to be renewed, a key renewal block (KRB) derived from decryption of the renewed node key with at least either a node key or leaf key on a lower stage of the tree structure to an information player at a leaf where the node key has to be renewed; and the cryptography means receives renewal data for the generation-managed decryption key encrypted with the renewed node key, encrypts the key renewal block (KRB) to acquire the renewed node key, and acquires renewal data for the generation-managed decryption key based on the thus-acquired renewed node key.

75. The apparatus according to claim 72, wherein:

the key renewal block (KRB) is stored in a recording medium; and the cryptography means encrypts the key renewal block (KRB) read from the recording medium.

76. The apparatus according to claim 72, wherein:

the generation-managed decryption key has a generation number as renewal information correlated therewith; and for decryption of encrypted data read from the recording medium, the cryptography means reads, from the recording medium, a generation number of the generation-managed encryption key having been used for encrypting the data and decrypts the encrypted data with a generation-managed decryption key corresponding to the thus-read generation number.

77. An information recording method for recording information to a recording medium, the method comprising the steps of:

encrypting information to be recorded to the recording medium by a cryptography with a generation-managed encryption key which is renewed to a different key for each generation;

making a comparison between generation information on a device-stored generation-managed encryption key stored in a storage means of an information recorder and prerecording generation information which is recording-medium generation information prestored in the recording medium; and outputting a warning when the comparison result is that the prerecording generation information is newer than the generation information on the device-stored generation-managed encryption key.

78. An information recording method for recording information to a recording medium, the method comprising the steps of:

encrypting information to be recorded to the recording medium by a cryptography with a generation-managed encryption key which is renewed to a different key for each generation; and making a comparison between generation information on a device-stored generation-managed encryption key stored in a storage means of the information recorder and prerecording generation information which is recording-medium generation information prestored in the recording medium; and acquiring a generation-managed encryption key of a generation as young as or younger than that indicated by the prerecording generation information when the comparison result is that the prerecording generation information is newer than the generation information on the device-stored generation-managed encryption key.

79. The method according to claim 78, wherein the key acquiring step further includes the steps of:

renewing the generation-managed encryption key with at least either a node key unique to each of nodes included in a hierarchical tree structure including a plurality of different information recorders each as a leaf or a leaf key unique to each of the information recorders; and encrypting data to be recorded into the recording medium with the generation-managed encryption key renewed in the renewing step.

80. The method according to claim 79, wherein the generation-managed encryption key is a master key common to the plurality of information recorders.

81. The method according to claim 79, wherein:

the node key can be renewed;

there is distributed, when a node key is to be renewed, a key renewal block (KRB) derived from encryption of the renewed node key with at least either a node key or leaf key on a lower stage of the tree structure to an information recorder at a leaf where the node key has to be renewed; and the renewing step further including the steps of:

acquiring a renewed node key by encryption of the key renewal block (KRB); and calculating renewal data for the generation-managed encryption key based on the thus-acquired renewed node key.

82. The method according to claim 79, wherein:

the generation-managed encryption key has a generation number as renewal information correlated therewith; and the encrypting step further includes the step of:

storing, as a recording generation number into the recording medium, a generation number of the generation-managed encryption key having been used for storing encrypted data into the recording medium.

83. An information playback method for playing back information from a recording medium, the method including the steps of:

decrypting information read from the recording medium by a cryptography with a generation-managed encryption key which is renewed to a different key for each generation;

making a comparison between generation information on a device-stored generation-managed decryption key stored in a storage means of the information player and recording generation information which is generation information having been used for recording the information to the recording medium; and outputting a warning when the comparison result is that the recording generation information is newer than the generation information on the device-stored generation-managed decryption key.

84. An information playback method for playing back information from a recording medium, the method including:

decrypting information read from the recording medium by a cryptography with a generation-managed decryption key which is renewed to a different key for each generation;

making a comparison between generation information on a device-stored generation-managed decryption key stored in a storage means of an information recorder/player and recording generation information which is generation information having been used for recording the information; and acquiring a generation-managed decryption key of a generation as young as or younger than that indicated by the recording generation information when the comparison result is that the recording generation information is newer than the generation information on the device-stored generation-managed decryption key.

85. The method according to claim 84, wherein the key acquiring step further includes the steps of:

renewing the generation-managed decryption key with at least either a node key unique to each of nodes included in a hierarchical tree structure including a plurality of different information players each as a leaf or a leaf key unique to each of the information players; and decrypting data to be recorded into the recording medium with the generation-managed decryption key renewed in the renewing step.

86. The method according to claim 85, wherein the generation-managed decryption key is a master key common to the plurality of information players.

87. The method according to claim 85, wherein:

the node key can be renewed;

there is distributed, when a node key is to be renewed, a key renewal block (KRB) derived from encryption of the renewed node key with at least either a node key or leaf key on a lower stage of the tree structure to an information player at a leaf where the node key has to be renewed; and the renewing step further including the steps of:

acquiring a renewed node key by encryption of the key renewal block (KRB); and calculating renewal data for the generation-managed decryption key based on the thus-acquired renewed node key.

88. The method according to claim 85, wherein:

the generation-managed decryption key has a generation number as renewal information correlated therewith; and the decrypting step further includes the step of:

reading a generation number of the generation-managed encryption key having been used for encrypting the data from the recording medium; and decrypting the encrypted data read from the recording medium with a generation-managed decryption key corresponding to the thus-read generation number.

89. An information recording medium to which information can be recorded, the medium having stored therein:

prerecording generation information as generation information on a key allowed as an encryption key usable for writing encrypted data to the information recording medium or a decryption key usable for decrypting data read from the information recording medium.

90. The information recording medium according to claim 89, wherein the prerecording generation information is recorded in an unrewritable area of the information recording medium.

91. A key renewing terminal for serving a renewed generation-managed key to an information recorder or player having a cryptography means for encrypting information to be recorded to a recording medium or an information recorder or player having a cryptography means for decrypting information read from a recording medium, each by a cryptography with a generation-managed key which can be renewed to a different key for each generation, the apparatus comprising:
an interface connectable to the information recorder or player;
means for communications with outside; and
means for controlling each of acquisition of a device-unique identifier from the information recorder or player via the interface, transmission of the device-unique identifier via the communications means, and transfer of the renewed generation-managed key to the information recorder or player via the interface.

92. A key renewing terminal for serving a renewed generation-managed key to an information recorder or player having a cryptography means for encrypting information to be recorded to a recording medium or an information recorder or player having a cryptography means for decrypting information read from a recording medium, each by a cryptography with a generation-managed key which can be renewed to a different key for each generation, the apparatus comprising:
an interface connectable to the information recorder or player;
a storage means having stored therein a key table in which a generation-managed key encrypted with a device-unique encryption key is correlated with an identifier unique to the information recorder or player; and
means for controlling each of acquisition of the device-unique identifier from the information recorder or player via the interface, acquisition, based on the device-unique identifier, of an encrypted generation-managed key corresponding to the device-unique identifier from the storage means, and transfer of the renewed generation-managed key to the information recorder or player via the interface.

93. The medium according to claim 92, wherein:
a mutual authentication is effected with the information recorder or player; and
the generation-managed key is served to the information recorder or player only when the mutual authentication has successfully be made.

94. A generation-managed key renewing method for serving a renewed generation-managed key to an information recorder or player having a cryptography means for encrypting information to be recorded to a recording medium or an information recorder or player having a cryptography means for decrypting information read from a recording medium, each by a cryptography with a generation-managed key which can be renewed to a different key for each generation, the method comprising the steps of:
connecting a key renewing terminal including an interface connectable to the information recorder or player and means for communications with outside to the information recorder or player;
acquiring a device-unique identifier from the information recorder or player via the interface;
transmitting the device-unique identifier via the communications means;
receiving the renewed generation-managed key via the communications means; and
transferring the renewed generation-managed key to the information recorder or player via the interface.

95. A generation-managed key renewing method for serving a renewed generation-managed key to an information recorder or player having a cryptography means for encrypting information to be recorded to a recording medium or an information recorder or player having a cryptography means for decrypting information read from a recording medium, each by a cryptography with a generation-managed key which can be renewed to a different key for each generation, the method comprising the steps of:
connecting a key renewing terminal including an interface connectable to the information recorder or player and a storage means having stored therein a key table in which a generation-managed key encrypted with an encryption key unique to a device-unique key is correlated with a device-unique identifier of the information recorder or player to the information recorder or player;
acquiring the device-unique identifier from the information recorder or player via the interface;
acquiring, based on the device-unique identifier, an encrypted generation-managed key corresponding to the device-unique key from the storage means; and
transferring a renewed generation-managed key to the information recorder or player via the interface.

96. The method according to claim 95, wherein:
a mutual authentication is effected with the information recorder or player; and
the renewed generation-managed key is served to the information recorder or player only when the mutual authentication has successfully be made.

97. A program serving medium for serving a computer program under which information is recorded to a recording medium in a computer system, the computer program comprising the steps of:
making a comparison between generation information on a device-stored generation-managed encryption key stored in a storage means of an information recorder and prerecording generation information which is recording-medium generation information prestored in the recording medium;
encrypting information to be stored into the recording medium by a cryptography with a generation-managed encryption key which can be renewed to a different key for each generation; and
effecting at least either outputting of a warning or acquisition of a generation-managed encryption key of a generation as young as or younger than that indicated by the generation information on the device-stored generation-managed encryption key when the comparison result is that the prerecording generation information is newer than the generation information on the device-stored generation-managed encryption key.

98. The medium according to claim 97, wherein the computer program further including the step of
renewing the generation-managed encryption key by encryption of encrypted data read from the recording medium with at least either a node key unique to each of nodes included in a hierarchical tree structure including a plurality of different information recorders each as a leaf or a leaf key unique to each of the information recorders.

99. A program serving medium for serving a computer program under which information is recorded to a recording medium in a computer system, the computer program comprising the steps of:
- making a comparison between generation information on a device-stored generation-managed encryption key stored in a storage means of an information player and recording generation information which is generation information having been used for recording the information to the recording medium;
- decrypting information read from the recording medium by a cryptography with a generation-managed decryption key which can be renewed to a different key for each generation; and
- effecting at least either outputting of a warning or acquisition of a generation-managed encryption key of a generation as young as or younger than that indicated by the generation information on the device-stored generation-managed decryption key when the comparison result is that the recording generation information is newer than the generation information on the device-stored generation-managed decryption key.

100. The medium according to claim 99, wherein the computer program further including the step of
- renewing the generation-managed decryption key by decryption of encrypted data read from the recording medium with at least either a node key unique to each of nodes included in a hierarchical tree structure including a plurality of different information players each as a leaf or a leaf key unique to each of the information players.

* * * * *